United States Patent
Volvovski et al.

(10) Patent No.: US 12,143,373 B2
(45) Date of Patent: Nov. 12, 2024

(54) EFFICIENT STORAGE OF DATA IN A DISPERSED STORAGE NETWORK

(71) Applicant: Pure Storage, Inc., Mountain View, CA (US)

(72) Inventors: Ilya Volvovski, Chicago, IL (US); S. Christopher Gladwin, Chicago, IL (US); Gary W. Grube, Barrington Hills, IL (US); Timothy W. Markison, Mesa, AZ (US); Jason K. Resch, Chicago, IL (US); Thomas Franklin Shirley, Jr., Wauwatosa, WI (US); Greg Dhuse, Chicago, IL (US); Manish Motwani, Chicago, IL (US); Andrew Baptist, Mt. Pleasant, WI (US); Wesley Leggette, Chicago, IL (US)

(73) Assignee: PURE STORAGE, INC., Santa Clara, CA (US)

( * ) Notice: Subject to any disclaimer, the term of this patent is extended or adjusted under 35 U.S.C. 154(b) by 0 days.

(21) Appl. No.: 17/380,227

(22) Filed: Jul. 20, 2021

(65) Prior Publication Data

US 2021/0367932 A1 Nov. 25, 2021

Related U.S. Application Data

(63) Continuation of application No. 16/124,666, filed on Sep. 7, 2018, now abandoned, which is a
(Continued)

(51) Int. Cl.
*H04L 12/70* (2013.01)
*G06F 3/06* (2006.01)
(Continued)

(52) U.S. Cl.
CPC ........ *H04L 63/0457* (2013.01); *G06F 3/0608* (2013.01); *G06F 3/0619* (2013.01);
(Continued)

(58) Field of Classification Search
CPC ............... H04L 63/0457; H04L 9/0861; H04L 9/0894; G06F 3/0608; G06F 3/0619; G06F 3/0641; G06F 3/067; G06F 11/1076
(Continued)

(56) References Cited

U.S. PATENT DOCUMENTS 4,092,732 A 5/1978 Ouchi
5,454,101 A 9/1995 Mackay
(Continued)

OTHER PUBLICATIONS

Chung; An Automatic Data Segmentation Method for 3D Measured Data Points; National Taiwan University, pp. 1-8; 1998.
(Continued)

*Primary Examiner* — El Hadji M Sall
*Assistant Examiner* — Elizabeth Kassa
(74) *Attorney, Agent, or Firm* — GARLICK & MARKISON; Harry S. Tyson, Jr.

(57) ABSTRACT

A data segment is encrypted to produce an encrypted data segment, and a data tag associated with the data segment is generated. The encrypted data segment is encoded to generate a set of encoded data slices. At least a read-threshold number of encoded data slices are required to reconstruct the encrypted data segment. A set of write slice requests, which includes the set of encoded data slices and the data tag, is transmitted to a DSN memory. A determination is made, based on the data tag, whether a first encoded data slice of the set of encoded data slices is a duplicate of a second encoded data slice already stored within the DSN memory.
(Continued)

If it is a duplicate, rather of storing the first encoded data slice, a reference to a location of the second encoded data slice is stored.

14 Claims, 52 Drawing Sheets

Related U.S. Application Data continuation-in-part of application No. 14/172,140, filed on Feb. 4, 2014, now Pat. No. 10,075,523.

(60) Provisional application No. 61/807,288, filed on Apr. 1, 2013.

(51) Int. Cl.
| | | |
|---|---|---|
| G06F 11/10 | (2006.01) | |
| H04L 9/08 | (2006.01) | |
| H04L 9/40 | (2022.01) | |
| H04L 41/0806 | (2022.01) | |
| H04L 67/12 | (2022.01) | |
| H04W 48/08 | (2009.01) | |

(52) U.S. Cl.
CPC ............ *G06F 3/0641* (2013.01); *G06F 3/067* (2013.01); *G06F 11/1076* (2013.01); *H04L 9/0861* (2013.01); *H04L 9/0894* (2013.01)

(58) Field of Classification Search
USPC ........................................................ 713/171
See application file for complete search history.

(56) References Cited

U.S. PATENT DOCUMENTS

| | | | |
|---|---|---|---|
| 5,485,474 A | 1/1996 | Rabin | |
| 5,721,919 A * | 2/1998 | Morel | G06F 9/4488 |
| | | | 707/999.203 |
| 5,774,643 A | 6/1998 | Lubbers | |
| 5,802,364 A | 9/1998 | Senator | |
| 5,809,285 A | 9/1998 | Hilland | |
| 5,890,156 A | 3/1999 | Rekieta | |
| 5,987,622 A | 11/1999 | Lo Verso | |
| 5,991,414 A | 11/1999 | Garay | |
| 6,012,159 A | 1/2000 | Fischer | |
| 6,058,454 A | 5/2000 | Gerlach | |
| 6,128,277 A | 10/2000 | Bruck | |
| 6,175,571 B1 | 1/2001 | Haddock | |
| 6,192,472 B1 | 2/2001 | Garay | |
| 6,256,688 B1 | 7/2001 | Suetaka | |
| 6,272,658 B1 | 8/2001 | Steele | |
| 6,301,604 B1 | 10/2001 | Nojima | |
| 6,356,949 B1 | 3/2002 | Katsandres | |
| 6,366,995 B1 | 4/2002 | Vilkov | |
| 6,374,336 B1 | 4/2002 | Peters | |
| 6,415,373 B1 | 7/2002 | Peters | |
| 6,418,539 B1 | 7/2002 | Walker | |
| 6,449,688 B1 | 9/2002 | Peters | |
| 6,567,948 B2 | 5/2003 | Steele | |
| 6,571,282 B1 | 5/2003 | Bowman-Amuah | |
| 6,609,223 B1 | 8/2003 | Wolfgang | |
| 6,718,361 B1 | 4/2004 | Basani | |
| 6,760,808 B2 | 7/2004 | Peters | |
| 6,785,768 B2 | 8/2004 | Peters | |
| 6,785,783 B2 | 8/2004 | Buckland | |
| 6,826,711 B2 | 11/2004 | Moulton | |
| 6,879,596 B1 | 4/2005 | Dooply | |
| 7,003,688 B1 | 2/2006 | Pittelkow | |
| 7,024,451 B2 | 4/2006 | Jorgenson | |
| 7,024,609 B2 | 4/2006 | Wolfgang | |
| 7,080,101 B1 | 7/2006 | Watson | |
| 7,103,824 B2 | 9/2006 | Halford | |
| 7,103,915 B2 | 9/2006 | Redlich | |
| 7,111,115 B2 | 9/2006 | Peters | |
| 7,140,044 B2 | 11/2006 | Redlich | |
| 7,146,644 B2 | 12/2006 | Redlich | |
| 7,171,493 B2 | 1/2007 | Shu | |
| 7,222,133 B1 | 5/2007 | Raipurkar | |
| 7,240,236 B2 | 7/2007 | Cutts | |
| 7,272,613 B2 | 9/2007 | Sim | |
| 7,636,724 B2 | 12/2009 | de la Torre | |
| 8,200,923 B1 * | 6/2012 | Healey | G06F 3/0641 |
| | | | 711/108 |
| 8,204,868 B1 * | 6/2012 | Wu | G06F 16/1748 |
| | | | 707/693 |
| 8,458,144 B2 * | 6/2013 | Maydew | G06F 16/1748 |
| | | | 707/692 |
| 8,572,055 B1 * | 10/2013 | Wu | G06F 11/1458 |
| | | | 711/216 |
| 8,650,228 B2 * | 2/2014 | Wideman | G06F 16/1727 |
| | | | 711/E12.001 |
| 8,762,338 B2 * | 6/2014 | Christiaens | G06F 16/86 |
| | | | 707/649 |
| 8,886,605 B1 * | 11/2014 | Wu | G06F 16/137 |
| | | | 707/639 |
| 2002/0062422 A1 | 5/2002 | Butterworth | |
| 2002/0166079 A1 | 11/2002 | Ulrich | |
| 2003/0018927 A1 | 1/2003 | Gadir | |
| 2003/0037261 A1 | 2/2003 | Meffert | |
| 2003/0065617 A1 | 4/2003 | Watkins | |
| 2003/0084020 A1 | 5/2003 | Shu | |
| 2004/0024963 A1 | 2/2004 | Talagala | |
| 2004/0122917 A1 | 6/2004 | Menon | |
| 2004/0215998 A1 | 10/2004 | Buxton | |
| 2004/0228493 A1 | 11/2004 | Ma | |
| 2005/0002531 A1 | 1/2005 | Michaelsen | |
| 2005/0100022 A1 | 5/2005 | Ramprashad | |
| 2005/0114594 A1 | 5/2005 | Corbett | |
| 2005/0125593 A1 | 6/2005 | Karpoff | |
| 2005/0131993 A1 | 6/2005 | Fatula, Jr. | |
| 2005/0132070 A1 | 6/2005 | Redlich | |
| 2005/0144382 A1 | 6/2005 | Schmisseur | |
| 2005/0229069 A1 | 10/2005 | Hassner | |
| 2006/0047907 A1 | 3/2006 | Shiga | |
| 2006/0136448 A1 | 6/2006 | Cialini | |
| 2006/0156059 A1 | 7/2006 | Kitamura | |
| 2006/0224603 A1 | 10/2006 | Correll, Jr. | |
| 2007/0079081 A1 | 4/2007 | Gladwin | |
| 2007/0079082 A1 | 4/2007 | Gladwin | |
| 2007/0079083 A1 | 4/2007 | Gladwin | |
| 2007/0088970 A1 | 4/2007 | Buxton | |
| 2007/0174192 A1 | 7/2007 | Gladwin | |
| 2007/0214285 A1 | 9/2007 | Au | |
| 2007/0234110 A1 | 10/2007 | Soran | |
| 2007/0283167 A1 | 12/2007 | Venters, III | |
| 2008/0005141 A1 * | 1/2008 | Zheng | G06F 16/1752 |
| 2008/0043108 A1 * | 2/2008 | Jung | H04N 23/667 |
| | | | 386/E5.072 |
| 2008/0120310 A1 * | 5/2008 | Khoury | G06F 16/487 |
| | | | 707/E17.031 |
| 2009/0094251 A1 | 4/2009 | Gladwin | |
| 2009/0094318 A1 | 4/2009 | Gladwin | |
| 2009/0193223 A1 | 7/2009 | Saliba | |
| 2010/0023524 A1 | 1/2010 | Gladwin | |
| 2010/0037118 A1 * | 2/2010 | Saliba | G06F 3/0641 |
| | | | 714/752 |
| 2010/0082672 A1 * | 4/2010 | Kottomtharayil | G06F 11/1451 |
| | | | 711/E12.001 |
| 2010/0268692 A1 | 10/2010 | Resch | |
| 2010/0268877 A1 | 10/2010 | Resch | |
| 2011/0016091 A1 * | 1/2011 | Prahlad | G06F 11/1453 |
| | | | 707/654 |
| 2011/0029524 A1 | 2/2011 | Baptist | |
| 2011/0029742 A1 * | 2/2011 | Grube | G06F 11/10 |
| | | | 711/E12.001 |
| 2011/0082841 A1 * | 4/2011 | Christiaens | G06F 16/2365 |
| | | | 719/315 |
| 2011/0093439 A1 * | 4/2011 | Guo | G06F 11/1464 |
| | | | 711/E12.001 |
| 2011/0099154 A1 * | 4/2011 | Maydew | G06F 16/1748 |
| | | | 707/E17.01 |

(56) References Cited

U.S. PATENT DOCUMENTS

| | | | |
|---|---|---|---|
| 2011/0125771 A1* | 5/2011 | Gladwin | H04L 63/0428 709/219 |
| 2011/0161680 A1 | 5/2011 | Grube | |
| 2011/0138144 A1 | 6/2011 | Tamura | |
| 2011/0167221 A1 | 7/2011 | Pangal | |
| 2011/0218973 A1* | 9/2011 | Pendlebury | G06F 16/152 707/E17.005 |
| 2011/0225209 A1 | 9/2011 | Volvovski | |
| 2011/0307457 A1 | 12/2011 | Ishii | |
| 2011/0314346 A1 | 12/2011 | Vas | |
| 2013/0163888 A1* | 6/2013 | Montalvo | G06F 16/48 382/225 |
| 2013/0232503 A1 | 9/2013 | Volvovski | |
| 2013/0290280 A1* | 10/2013 | Prahlad | G06F 16/1748 707/692 |
| 2014/0123316 A1 | 5/2014 | Leggette | |
| 2014/0270530 A1* | 9/2014 | Dwan | G06V 10/50 382/190 |

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

Satran, et al.; Internet Small Computer Systems Interface (ISCSI); IETF Network Working Group; RFC 3720; Apr. 2004; pp. 1-257.

Sciberras; Lightweight Directory Access Protocol (LDAP): Schema for User Applications; IETF Network Working Group; RFC 4519; Jun. 2006; pp. 1-33.

Sermersheim; Lightweight Directory Access Protocol (LDAP): The Protocol; IETF Network Working Group; RFC 4511; Jun. 2006; pp. 1-68.

Shamir; How to Share a Secret; Communications of the ACM; vol. 22, No. 11; Nov. 1979; pp. 612-613.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Wildi; Java iSCSi Initiator; Master Thesis; Department of Computer and Information Science, University of Konstanz; Feb. 2007; 60 pgs.

Xin, et al.; Evaluation of Distributed Recovery in Large-Scale Storage Systems; 13th IEEE International Symposium on High Performance Distributed Computing; Jun. 2004; pp. 172-181.

Zeilenga; Lightweight Directory Access Protocol (LDAP): Directory Information Models; IETF Network Working Group; RFC 4512; Jun. 2006; pp. 1-49.

Zeilenga; Lightweight Directory Access Protocol (LDAP): Internationalized String Preparation; IETF Network Working Group; RFC 4518; Jun. 2006; pp. 1-14.

Zeilenga; Lightweight Directory Access Protocol (LDAP): String Representation of Distinguished Names; IETF Network Working Group; RFC 4514; Jun. 2006; pp. 1-15.

Zeilenga; Lightweight Directory Access Protocol (LDAP): Technical Specification Road Map; IETF Network Working Group; RFC 4510; Jun. 2006; pp. 1-8.

* cited by examiner

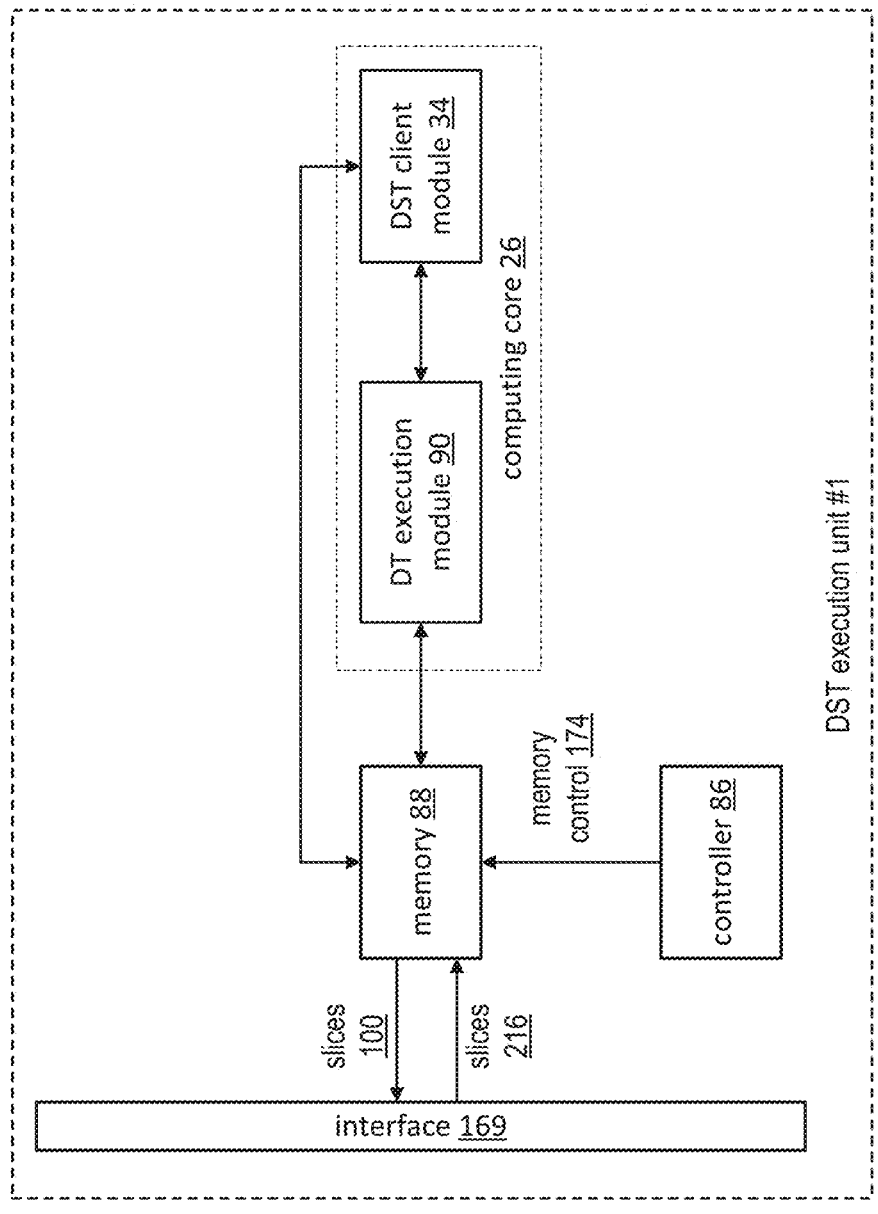
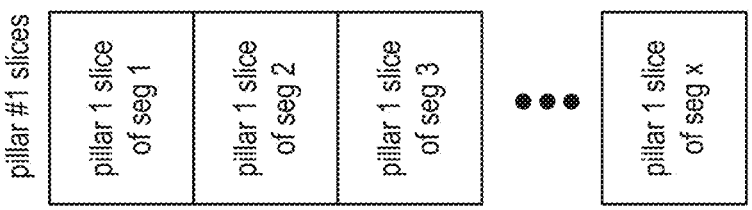
FIG. 24

DST allocation info 242: data partition info 320; data ID; No. of partitions; Addr. info for each partition; format conversion indication

| task 326 | task ordering 328 | task execution info 322 | | | intermediate result info 324 | | |
|---|---|---|---|---|---|---|---|
| | | data partition 330 | set of DT EX mods 332 | Name 334 | interm. result processing 336 | scratch pad storage 338 | intermediate result storage 340 |
| 1_1 | none | 2_1 - 2_z | 1_1, 2_1, 3_1, 4_1, & 5_1 | R1-1 | DST unit 1 | DST unit 1 | DST units 1-5 |
| 1_2 | none | 2_1 - 2_4 | 1_1, 2_1, 3_1, 4_1, & 5_1 | R1-2 | DST unit 1 | DST unit 1 | DST units 1-5 |
| 1_3 | none | 2_1 - 2_4<br>2_5 - 2_z | 1_1, 2_1, 3_1, 4_1, & 5_1<br>1_2, 2_2, 3_2, 4_2, & 5_2 | R1-3 | DST unit 2 | DST unit 2 | DST units 2-6 |
| 1_4 | after 1_3 | R1-3_1 - R1-3_4<br>R1-3_5 - R1-3_z | 1_1, 2_1, 3_1, 4_1, & 5_1<br>1_2, 2_2, 6_1, 7_1, & 7_2 | R1_4 | DST unit 3 | DST unit 3 | DST units 3-7 |
| 1_5 | after 1_4 | R1-4_1 - R1-4_z &<br>2_1 - 2_z | 1_1, 2_1, 3_1, 4_1, & 5_1 | R1-5 | DST unit 1 | DST unit 1 | DST units 1-5 |
| 1_6 | after 1_1 & 1_5 | R1-1_1 - R1-1_z &<br>R1-5_1 - R1-5_z | 1_2, 2_2, 6_1, 7_1, & 7_2 | R1-6 | DST unit 2 | DST unit 2 | DST units 2-6 |
| 1_7 | after 1_2 & 1_5 | R1-2_1 - R1-2_z &<br>R1-5_1 - R1-5_z | 1_2, 2_2, 3_2, 4_2, & 5_2 | R1-7 | DST unit 3 | DST unit 3 | DST units 3-7 |
| 2 | none | 2_1 - 2_z | 3_1, 4_1, 5_1, 6_1, & 7_1 | R2 | DST unit 7 | DST unit 7 | DST units 7, 1-4 |
| 3_1 | none (same as 1_3) | use R1_3 | | R1-1 | | | |
| 3_2 | after 3_1 | R1-3_1 - R1-3_z | 1_2, 2_2, 3_2, 4_2, & 5_2 | R3-2 | DST unit 5 | DST unit 5 | DST units 5,6, 1-3 |

FIG. 32

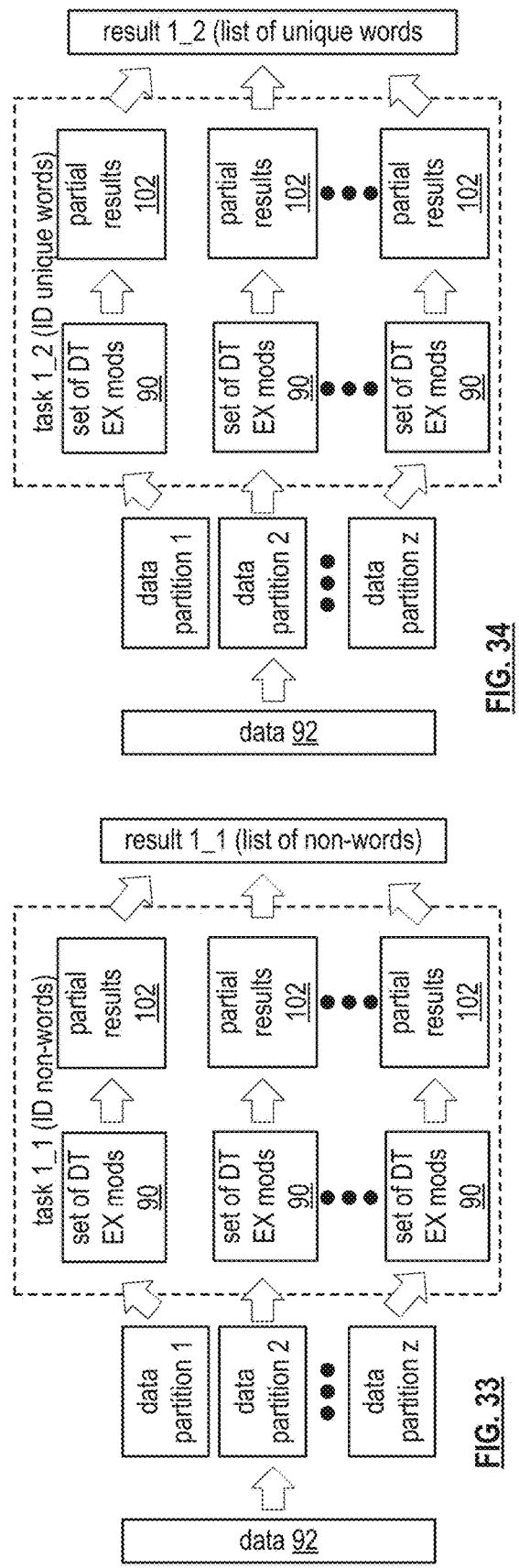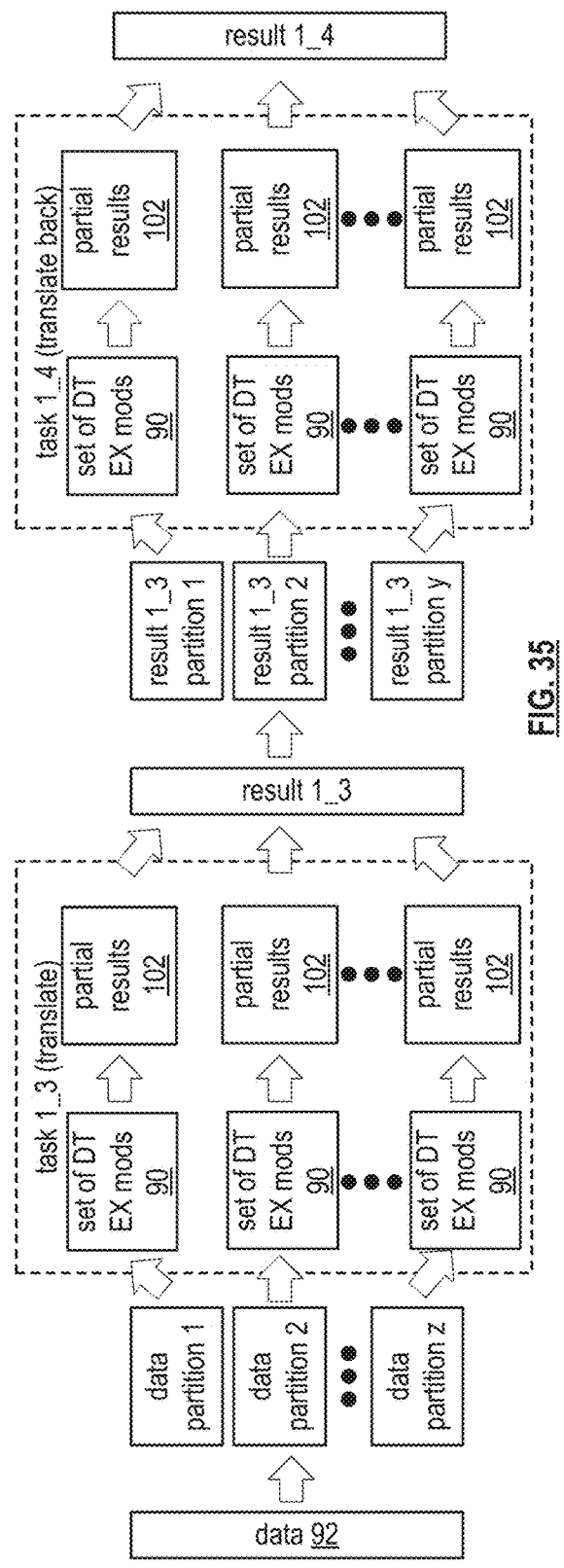

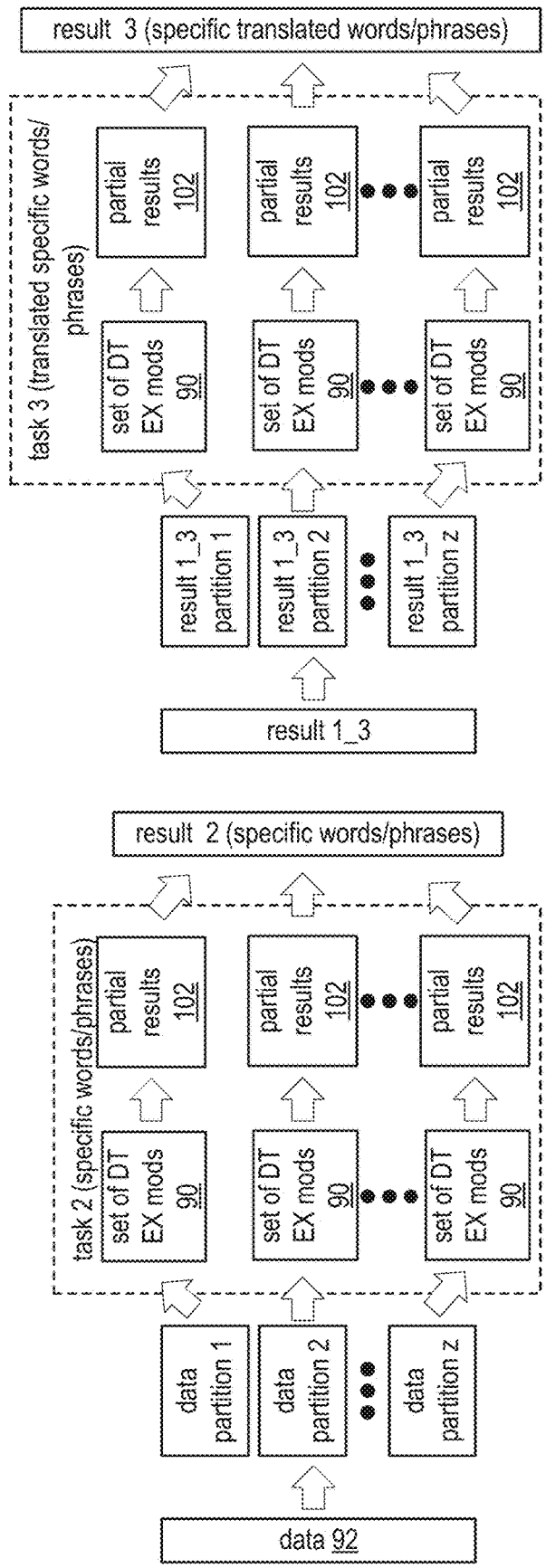
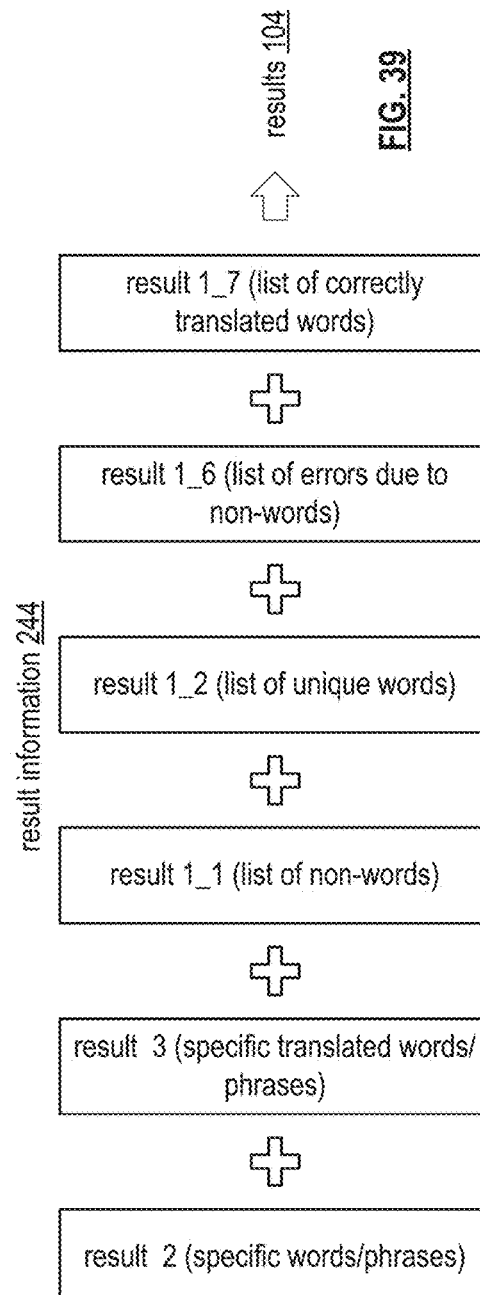

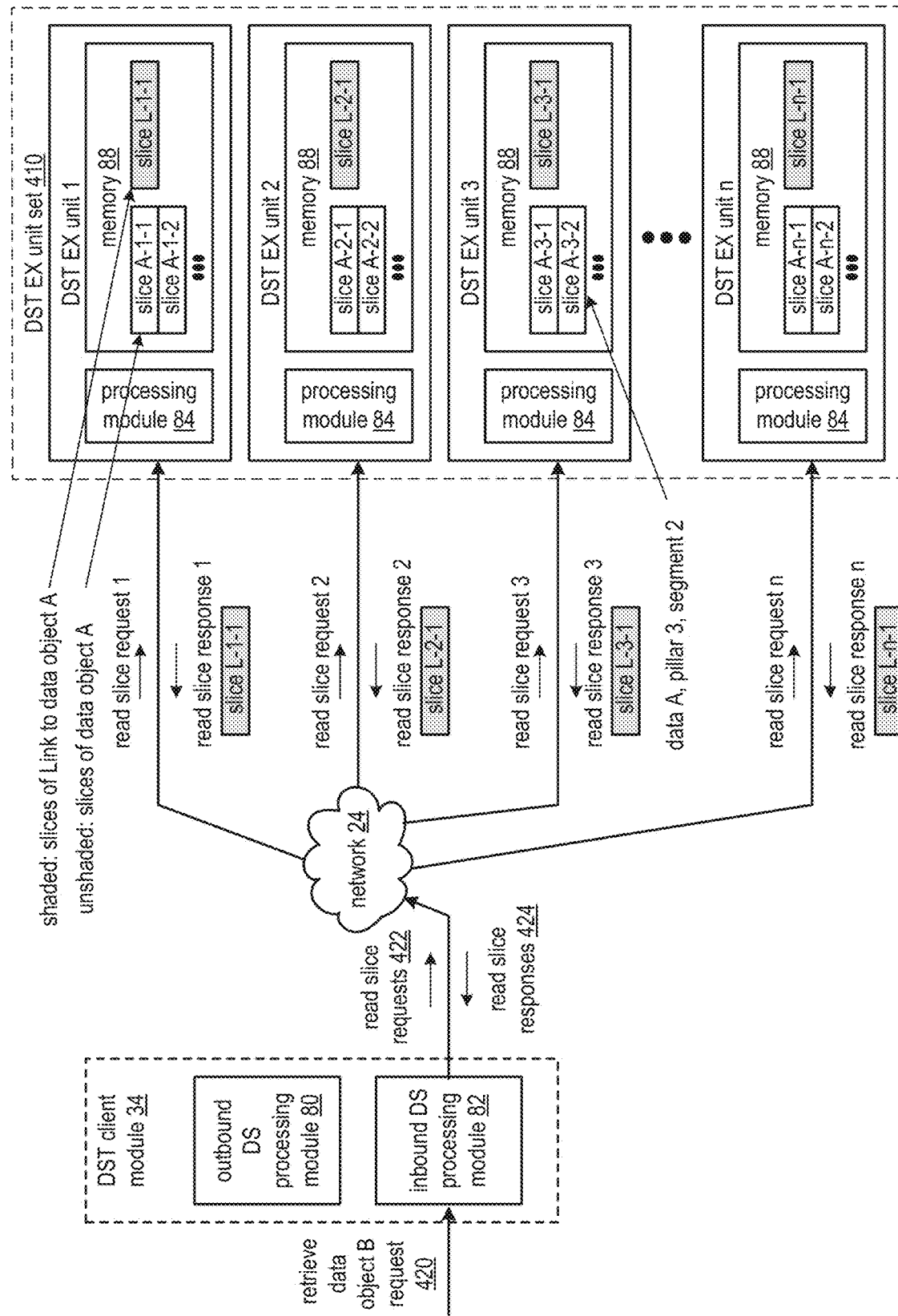

EFFICIENT STORAGE OF DATA IN A DISPERSED STORAGE NETWORK

CROSS REFERENCE TO RELATED PATENTS

This application claims priority pursuant to 35 U.S.C. § 120 as a continuation of U.S. Utility application Ser. No. 16/124,666, entitled "DE-DUPLICATION OF DATA STREAMS", filed Sep. 7, 2018, which is a continuation-in-part of U.S. Utility application Ser. No. 14/172,140, entitled "EFFICIENT STORAGE OF DATA IN A DISPERSED STORAGE NETWORK", filed Feb. 4, 2014, now U.S. Pat. No. 10,075,523 on Sep. 11, 2018, which claims priority pursuant to 35 U.S.C. § 119(e) to U.S. Provisional Application No. 61/807,288, entitled "DE-DUPLICATING DATA STORED IN A DISPERSED STORAGE NETWORK", filed Apr. 1, 2013, all of which are hereby incorporated herein by reference in their entirety and made part of the present U.S. Utility Patent Application for all purposes.

STATEMENT REGARDING FEDERALLY SPONSORED RESEARCH OR DEVELOPMENT—NOT APPLICABLE

INCORPORATION-BY-REFERENCE OF MATERIAL SUBMITTED ON A COMPACT DISC—NOT APPLICABLE

BACKGROUND

Technical Field

This invention relates generally to computer networks and more particularly to dispersed storage of data and distributed task processing of data.

Description of Related Art

Computing devices are known to communicate data, process data, and/or store data. Such computing devices range from wireless smart phones, laptops, tablets, personal computers (PC), work stations, video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc., on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 24 is a schematic block diagram of an example of a storage operation of a DST execution unit in accordance with the present invention;

FIG. 32 is a diagram of an example of DST allocation information for the example of FIG. 30 in accordance with the present invention;

FIGS. 33-38 are schematic block diagrams of the DSTN module performing the example of FIG. 30 in accordance with the present invention;

FIG. 39 is a diagram of an example of combining result information into final results for the example of FIG. 30 in accordance with the present invention;

FIGS. 42A-42D are schematic block diagrams of another embodiment of a dispersed storage system illustrating an example of storing and retrieving data in accordance with the present invention;

DETAILED DESCRIPTION OF THE INVENTION

Figure 1:
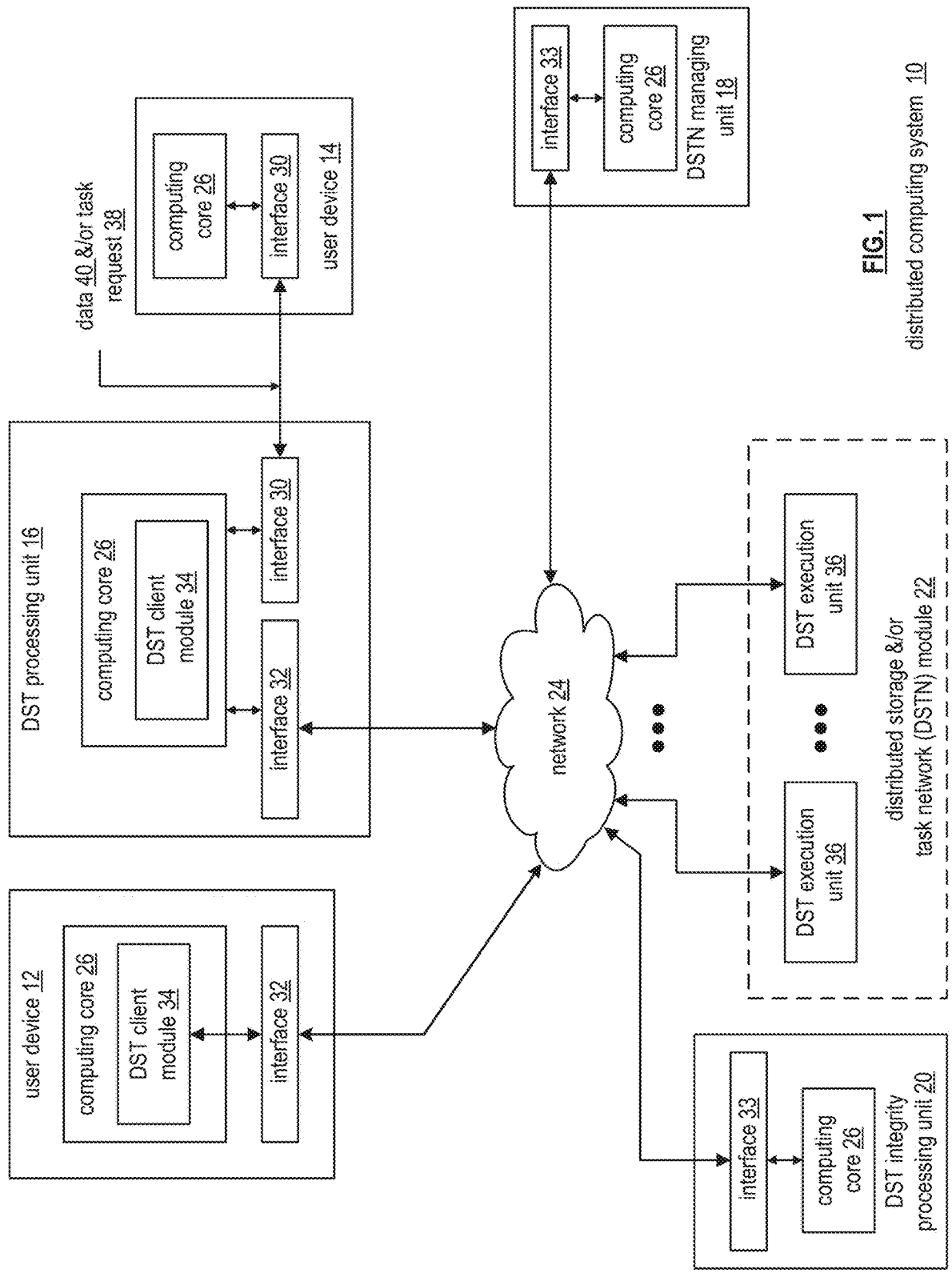
FIG. 1 is a schematic block diagram of an embodiment of a distributed computing system in accordance with the present invention.

FIG. 1 is a schematic block diagram of an embodiment of a distributed computing system 10 that includes a user device 12 and/or a user device 14, a distributed storage and/or task (DST) processing unit 16, a distributed storage and/or task network (DSTN) managing unit 18, a DST integrity processing unit 20, and a distributed storage and/or task network (DSTN) module 22. The components of the distributed computing system 10 are coupled via a network 24, which may include one or more wireless and/or wire lined communication systems; one or more private intranet systems and/or public interne systems; and/or one or more local area networks (LAN) and/or wide area networks (WAN).

The DSTN module 22 includes a plurality of distributed storage and/or task (DST) execution units 36 that may be located at geographically different sites (e.g., one in Chicago, one in Milwaukee, etc.). Each of the DST execution units is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc.

Each of the user devices 12-14, the DST processing unit 16, the DSTN managing unit 18, and the DST integrity processing unit 20 include a computing core 26 and may be a portable computing device and/or a fixed computing device. A portable computing device may be a social networking device, a gaming device, a cell phone, a smart phone, a personal digital assistant, a digital music player, a digital video player, a laptop computer, a handheld computer, a tablet, a video game controller, and/or any other portable device that includes a computing core. A fixed computing device may be a personal computer (PC), a computer server, a cable set-top box, a satellite receiver, a television set, a printer, a fax machine, home entertainment equipment, a video game console, and/or any type of home or office computing equipment. User device 12 and DST processing unit 16 are configured to include a DST client module 34.

With respect to interfaces, each interface 30, 32, and 33 includes software and/or hardware to support one or more communication links via the network 24 indirectly and/or directly. For example, interfaces 30 support a communication link (e.g., wired, wireless, direct, via a LAN, via the network 24, etc.) between user device 14 and the DST processing unit 16. As another example, interface 32 supports communication links (e.g., a wired connection, a wireless connection, a LAN connection, and/or any other type of connection to/from the network 24) between user device 12 and the DSTN module 22 and between the DST processing unit 16 and the DSTN module 22. As yet another example, interface 33 supports a communication link for each of the DSTN managing unit 18 and DST integrity processing unit 20 to the network 24.

The distributed computing system 10 is operable to support dispersed storage (DS) error encoded data storage and retrieval, to support distributed task processing on received data, and/or to support distributed task processing on stored data. In general and with respect to DS error encoded data storage and retrieval, the distributed computing system 10 supports three primary operations: storage management, data storage and retrieval (an example of which will be discussed with reference to FIGS. 20-26), and data storage integrity verification. In accordance with these three primary functions, data can be encoded, distributedly stored in physically different locations, and subsequently retrieved in a reliable and secure manner. Such a system is tolerant of a significant number of failures (e.g., up to a failure level, which may be greater than or equal to a pillar width minus a decode threshold minus one) that may result from individual storage device failures and/or network equipment failures without loss of data and without the need for a redundant or backup copy. Further, the system allows the data to be stored for an indefinite period of time without data loss and does so in a secure manner (e.g., the system is very resistant to attempts at hacking the data).

The second primary function (i.e., distributed data storage and retrieval) begins and ends with a user device 12-14. For instance, if a second type of user device 14 has data 40 to store in the DSTN module 22, it sends the data 40 to the DST processing unit 16 via its interface 30. The interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data 40.

To support storage management, the DSTN managing unit 18 performs DS management services. One such DS management service includes the DSTN managing unit 18 establishing distributed data storage parameters (e.g., vault creation, distributed storage parameters, security parameters, billing information, user profile information, etc.) for a user device 12-14 individually or as part of a group of user devices. For example, the DSTN managing unit 18 coordinates creation of a vault (e.g., a virtual memory block) within memory of the DSTN module 22 for a user device, a group of devices, or for public access and establishes per vault dispersed storage (DS) error encoding parameters for a vault. The DSTN managing unit 18 may facilitate storage of DS error encoding parameters for each vault of a plurality of vaults by updating registry information for the distributed computing system 10. The facilitating includes storing updated registry information in one or more of the DSTN module 22, the user device 12, the DST processing unit 16, and the DST integrity processing unit 20.

The DS error encoding parameters (e.g., or dispersed storage error coding parameters) include data segmenting information (e.g., how many segments data (e.g., a file, a group of files, a data block, etc.) is divided into), segment security information (e.g., per segment encryption, compression, integrity checksum, etc.), error coding information (e.g., pillar width, decode threshold, read threshold, write threshold, etc.), slicing information (e.g., the number of encoded data slices that will be created for each data segment); and slice security information (e.g., per encoded data slice encryption, compression, integrity checksum, etc.).

The DSTN managing module 18 creates and stores user profile information (e.g., an access control list (ACL)) in local memory and/or within memory of the DSTN module 22. The user profile information includes authentication information, permissions, and/or the security parameters. The security parameters may include encryption/decryption scheme, one or more encryption keys, key generation scheme, and/or data encoding/decoding scheme.

The DSTN managing unit 18 creates billing information for a particular user, a user group, a vault access, public vault access, etc. For instance, the DSTN managing unit 18 tracks the number of times a user accesses a private vault and/or public vaults, which can be used to generate a per-access billing information. In another instance, the DSTN managing unit 18 tracks the amount of data stored and/or retrieved by a user device and/or a user group, which can be used to generate a per-data-amount billing information.

Another DS management service includes the DSTN managing unit 18 performing network operations, network administration, and/or network maintenance. Network operations includes authenticating user data allocation requests (e.g., read and/or write requests), managing creation of vaults, establishing authentication credentials for user devices, adding/deleting components (e.g., user devices, DST execution units, and/or DST processing units) from the distributed computing system 10, and/or establishing authentication credentials for DST execution units 36. Network administration includes monitoring devices and/or units for failures, maintaining vault information, determining device and/or unit activation status, determining device and/or unit loading, and/or determining any other system level operation that affects the performance level of the system 10. Network maintenance includes facilitating replacing, upgrading, repairing, and/or expanding a device and/or unit of the system 10.

To support data storage integrity verification within the distributed computing system 10, the DST integrity processing unit 20 performs rebuilding of 'bad' or missing encoded data slices. At a high level, the DST integrity processing unit 20 performs rebuilding by periodically attempting to retrieve/list encoded data slices, and/or slice names of the encoded data slices, from the DSTN module 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in memory of the DSTN module 22. Note that the DST integrity processing unit 20 may be a separate unit as shown, it may be included in the DSTN module 22, it may be included in the DST processing unit 16, and/or distributed among the DST execution units 36.

To support distributed task processing on received data, the distributed computing system 10 has two primary operations: DST (distributed storage and/or task processing) management and DST execution on received data (an example of which will be discussed with reference to FIGS. 3-19). With respect to the storage portion of the DST management, the DSTN managing unit 18 functions as previously described. With respect to the tasking processing of the DST management, the DSTN managing unit 18 performs distributed task processing (DTP) management services. One such DTP management service includes the DSTN managing unit 18 establishing DTP parameters (e.g., user-vault affiliation information, billing information, user-task information, etc.) for a user device 12-14 individually or as part of a group of user devices.

Another DTP management service includes the DSTN managing unit 18 performing DTP network operations, network administration (which is essentially the same as described above), and/or network maintenance (which is essentially the same as described above). Network operations includes, but is not limited to, authenticating user task processing requests (e.g., valid request, valid user, etc.), authenticating results and/or partial results, establishing DTP authentication credentials for user devices, adding/deleting components (e.g., user devices, DST execution units, and/or DST processing units) from the distributed computing system, and/or establishing DTP authentication credentials for DST execution units.

To support distributed task processing on stored data, the distributed computing system 10 has two primary operations: DST (distributed storage and/or task) management and DST execution on stored data. With respect to the DST execution on stored data, if the second type of user device 14 has a task request 38 for execution by the DSTN module 22, it sends the task request 38 to the DST processing unit 16 via its interface 30. An example of DST execution on stored data will be discussed in greater detail with reference to FIGS. 27-39. With respect to the DST management, it is substantially similar to the DST management to support distributed task processing on received data.

Figure 2:
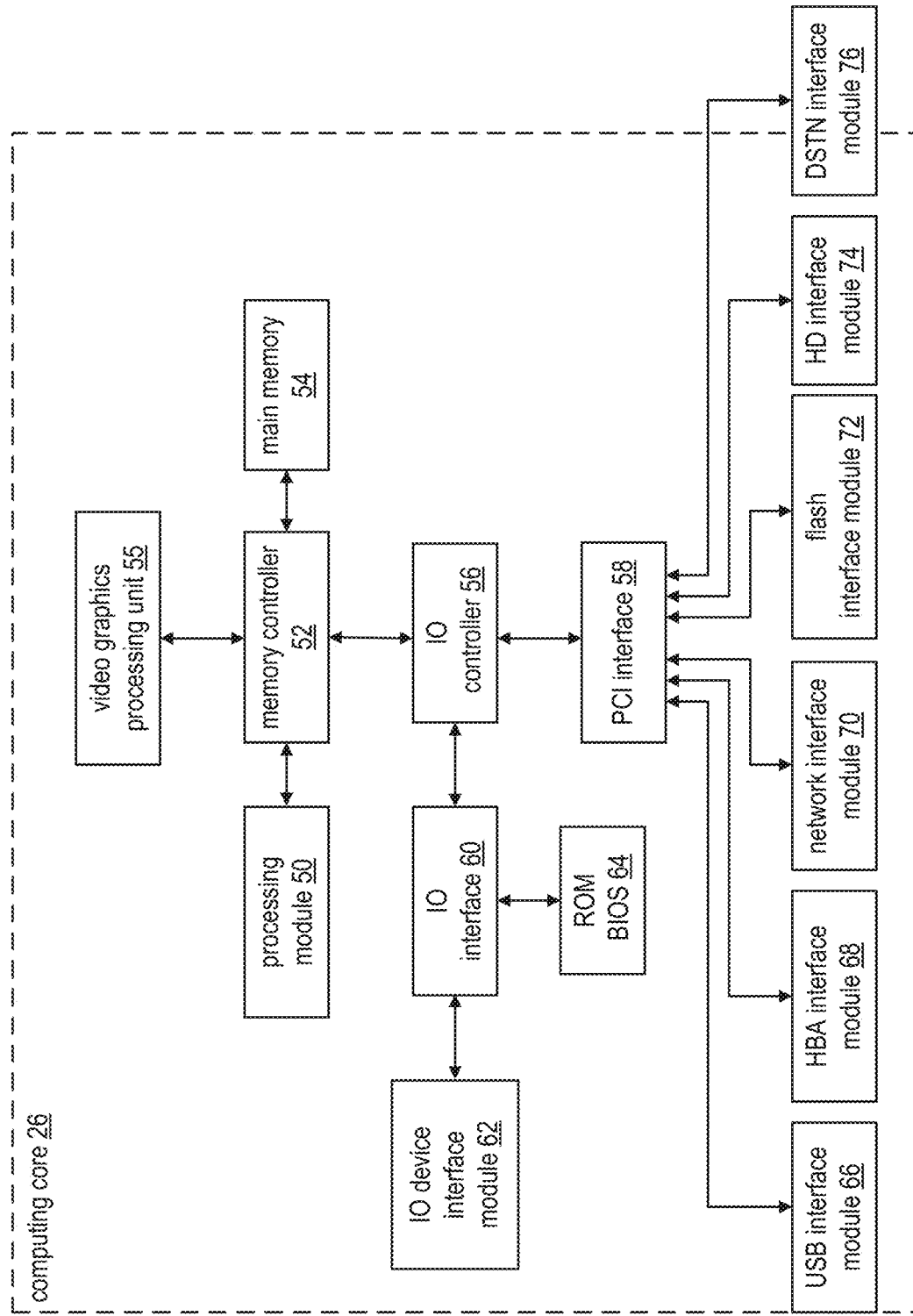
FIG. 2 is a schematic block diagram of an embodiment of a computing core in accordance with the present invention.

FIG. 2 is a schematic block diagram of an embodiment of a computing core 26 that includes a processing module 50, a memory controller 52, main memory 54, a video graphics processing unit 55, an input/output (TO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSTN interface module 76.

The DSTN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSTN interface module 76 and/or the network interface module 70 may function as the interface 30 of the user device 14 of FIG. 1. Further note that the IO device interface module 62 and/or the memory interface modules may be collectively or individually referred to as IO ports.

Figure 3:
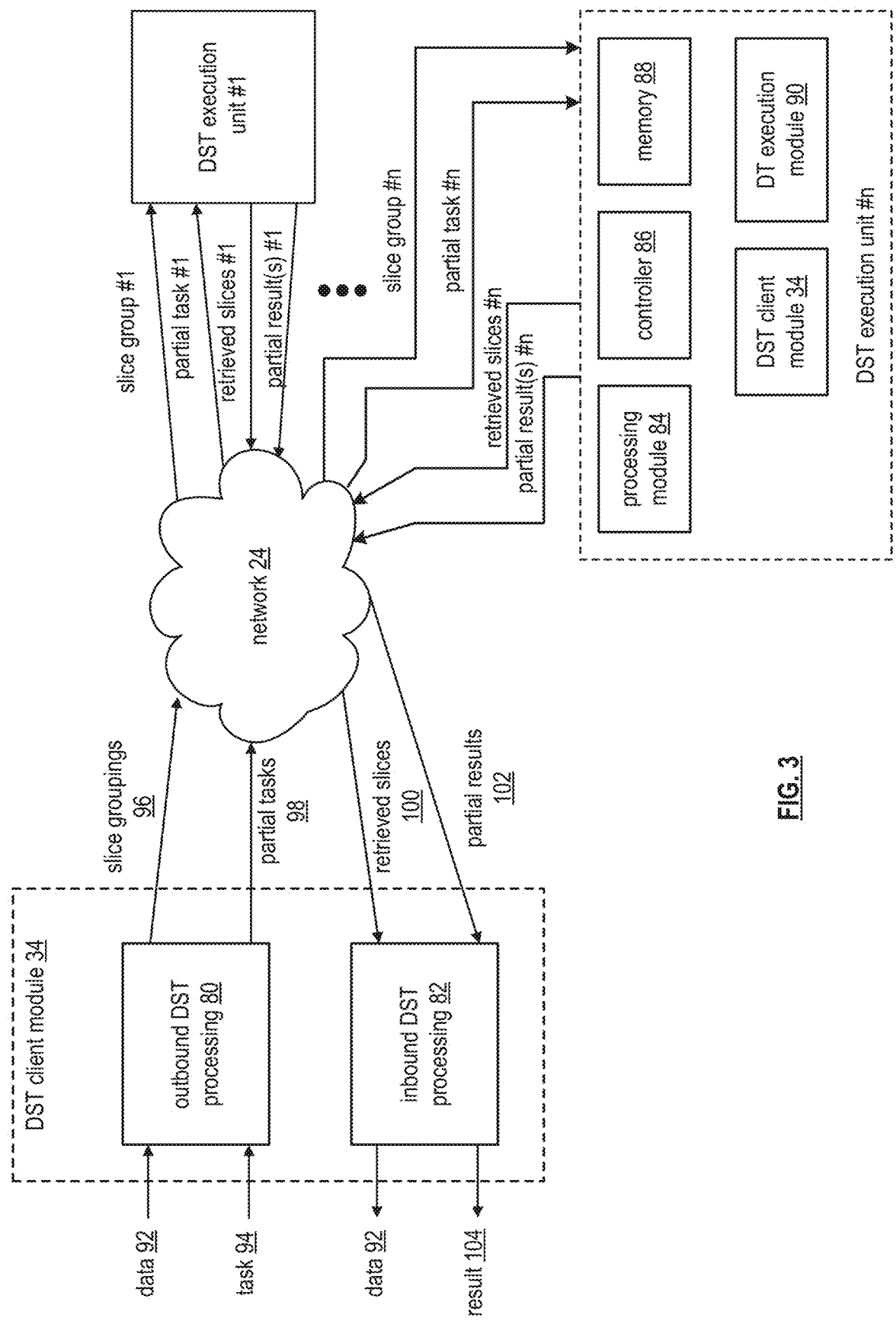
FIG. 3 is a diagram of an example of a distributed storage and task processing in accordance with the present invention.

FIG. 3 is a diagram of an example of the distributed computing system performing a distributed storage and task processing operation. The distributed computing system includes a DST (distributed storage and/or task) client module 34 (which may be in user device 14 and/or in DST processing unit 16 of FIG. 1), a network 24, a plurality of DST execution units 1-*n* that includes two or more DST execution units 36 of FIG. 1 (which form at least a portion of DSTN module 22 of FIG. 1), a DST managing module (not shown), and a DST integrity verification module (not shown). The DST client module 34 includes an outbound DST processing section 80 and an inbound DST processing section 82. Each of the DST execution units 1-*n* includes a controller 86, a processing module 84, memory 88, a DT (distributed task) execution module 90, and a DST client module 34.

In an example of operation, the DST client module 34 receives data 92 and one or more tasks 94 to be performed upon the data 92. The data 92 may be of any size and of any content, where, due to the size (e.g., greater than a few Terra-Bytes), the content (e.g., secure data, etc.), and/or task(s) (e.g., MIPS intensive), distributed processing of the task(s) on the data is desired. For example, the data 92 may be one or more digital books, a copy of a company's emails, a large-scale Internet search, a video security file, one or more entertainment video files (e.g., television programs, movies, etc.), data files, and/or any other large amount of data (e.g., greater than a few Terra-Bytes).

Within the DST client module 34, the outbound DST processing section 80 receives the data 92 and the task(s) 94. The outbound DST processing section 80 processes the data 92 to produce slice groupings 96. As an example of such processing, the outbound DST processing section 80 partitions the data 92 into a plurality of data partitions. For each data partition, the outbound DST processing section 80 dispersed storage (DS) error encodes the data partition to produce encoded data slices and groups the encoded data slices into a slice grouping 96. In addition, the outbound DST processing section 80 partitions the task 94 into partial tasks 98, where the number of partial tasks 98 may correspond to the number of slice groupings 96.

The outbound DST processing section 80 then sends, via the network 24, the slice groupings 96 and the partial tasks 98 to the DST execution units 1-*n* of the DSTN module 22 of FIG. 1. For example, the outbound DST processing section 80 sends slice group 1 and partial task 1 to DST execution unit 1. As another example, the outbound DST processing section 80 sends slice group #n and partial task #n to DST execution unit #n.

Each DST execution unit performs its partial task 98 upon its slice group 96 to produce partial results 102. For example, DST execution unit #1 performs partial task #1 on slice group #1 to produce a partial result #1, for results. As a more specific example, slice group #1 corresponds to a data partition of a series of digital books and the partial task #1 corresponds to searching for specific phrases, recording where the phrase is found, and establishing a phrase count. In this more specific example, the partial result #1 includes information as to where the phrase was found and includes the phrase count.

Upon completion of generating their respective partial results 102, the DST execution units send, via the network 24, their partial results 102 to the inbound DST processing section 82 of the DST client module 34. The inbound DST processing section 82 processes the received partial results 102 to produce a result 104. Continuing with the specific example of the preceding paragraph, the inbound DST processing section 82 combines the phrase count from each of the DST execution units 36 to produce a total phrase count. In addition, the inbound DST processing section 82 combines the 'where the phrase was found' information from each of the DST execution units 36 within their respective data partitions to produce 'where the phrase was found' information for the series of digital books.

In another example of operation, the DST client module 34 requests retrieval of stored data within the memory of the DST execution units 36 (e.g., memory of the DSTN module). In this example, the task 94 is retrieve data stored in the memory of the DSTN module. Accordingly, the outbound DST processing section 80 converts the task 94 into a plurality of partial tasks 98 and sends the partial tasks 98 to the respective DST execution units 1-*n*.

In response to the partial task 98 of retrieving stored data, a DST execution unit 36 identifies the corresponding encoded data slices 100 and retrieves them. For example, DST execution unit #1 receives partial task #1 and retrieves, in response thereto, retrieved slices #1. The DST execution units 36 send their respective retrieved slices 100 to the inbound DST processing section 82 via the network 24.

The inbound DST processing section 82 converts the retrieved slices 100 into data 92. For example, the inbound DST processing section 82 de-groups the retrieved slices 100 to produce encoded slices per data partition. The inbound DST processing section 82 then DS error decodes the encoded slices per data partition to produce data partitions. The inbound DST processing section 82 de-partitions the data partitions to recapture the data 92.

Figure 4:
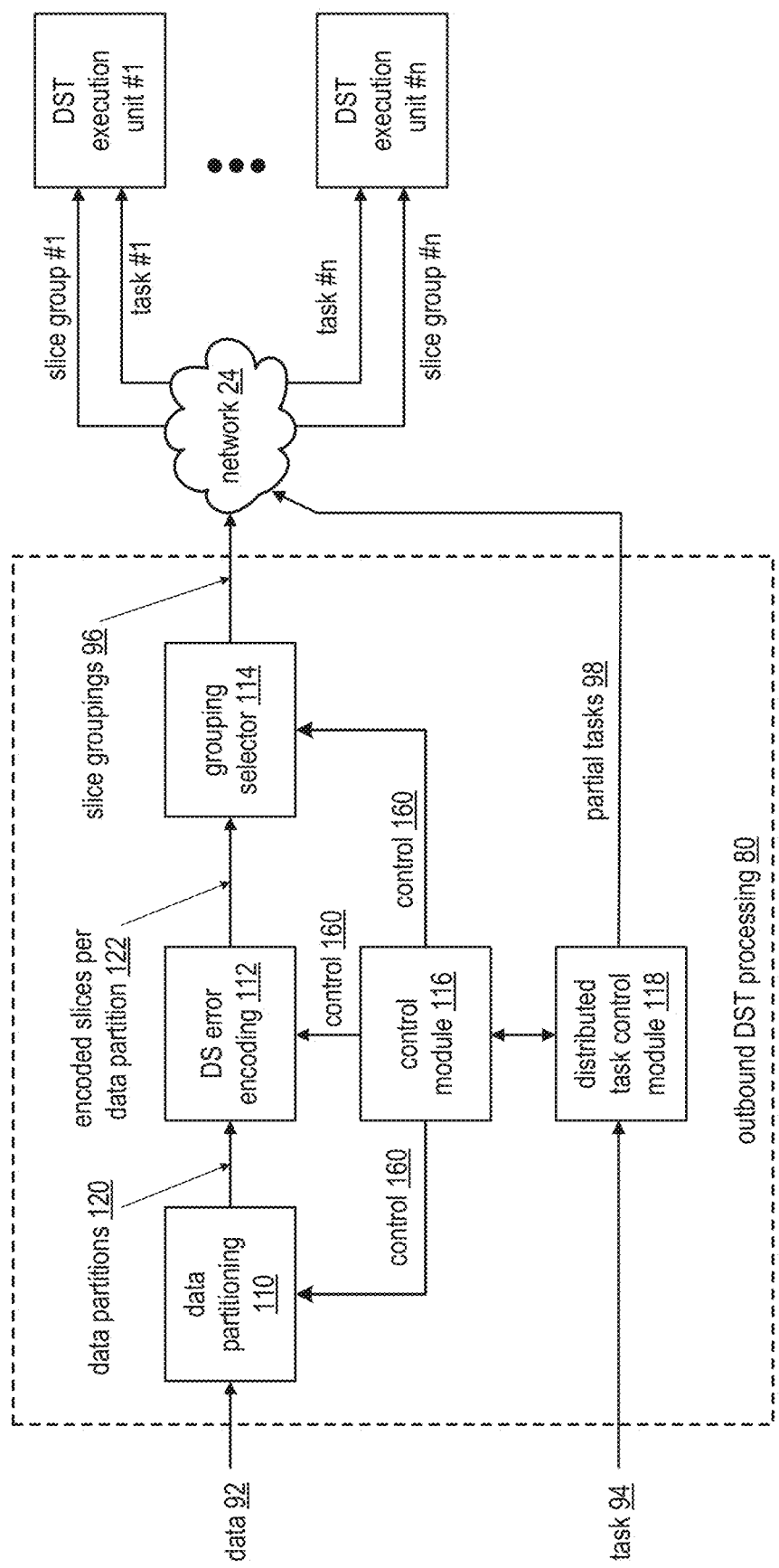
FIG. 4 is a schematic block diagram of an embodiment of an outbound distributed storage and/or task (DST) processing in accordance with the present invention.

FIG. 4 is a schematic block diagram of an embodiment of an outbound distributed storage and/or task (DST) processing section 80 of a DST client module 34 FIG. 1 coupled to a DSTN module 22 of a FIG. 1 (e.g., a plurality of n DST execution units 36) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 partitions data 92 into a plurality of data partitions 120. The number of partitions and the size of the partitions may be selected by the control module 116 via control 160 based on the data 92 (e.g., its size, its content, etc.), a corresponding task 94 to be performed (e.g., simple, complex, single step, multiple steps, etc.), DS encoding parameters (e.g., pillar width, decode threshold, write threshold, segment security parameters, slice security parameters, etc.), capabilities of the DST execution units 36 (e.g., processing resources, availability of processing recourses, etc.), and/or as may be inputted by a user, system administrator, or other operator (human or automated). For example, the data partitioning module 110 partitions the data 92 (e.g., 100 Terra-Bytes) into 100,000 data segments, each being 1 Giga-Byte in size. Alternatively, the data partitioning module 110 partitions the data 92 into a plurality of data segments, where some of data segments are of a different size, are of the same size, or a combination thereof.

The DS error encoding module 112 receives the data partitions 120 in a serial manner, a parallel manner, and/or a combination thereof. For each data partition 120, the DS error encoding module 112 DS error encodes the data partition 120 in accordance with control information 160 from the control module 116 to produce encoded data slices 122. The DS error encoding includes segmenting the data partition into data segments, segment security processing (e.g., encryption, compression, watermarking, integrity check (e.g., CRC), etc.), error encoding, slicing, and/or per slice security processing (e.g., encryption, compression, watermarking, integrity check (e.g., CRC), etc.). The control information 160 indicates which steps of the DS error encoding are active for a given data partition and, for active steps, indicates the parameters for the step. For example, the control information 160 indicates that the error encoding is active and includes error encoding parameters (e.g., pillar width, decode threshold, write threshold, read threshold, type of error encoding, etc.).

The group selecting module 114 groups the encoded slices 122 of a data partition into a set of slice groupings 96. The number of slice groupings corresponds to the number of DST execution units 36 identified for a particular task 94. For example, if five DST execution units 36 are identified for the particular task 94, the group selecting module groups the encoded slices 122 of a data partition into five slice groupings 96. The group selecting module 114 outputs the slice groupings 96 to the corresponding DST execution units 36 via the network 24.

The distributed task control module 118 receives the task 94 and converts the task 94 into a set of partial tasks 98. For example, the distributed task control module 118 receives a task to find where in the data (e.g., a series of books) a phrase occurs and a total count of the phrase usage in the data. In this example, the distributed task control module 118 replicates the task 94 for each DST execution unit 36 to produce the partial tasks 98. In another example, the distributed task control module 118 receives a task to find where in the data a first phrase occurs, wherein in the data a second phrase occurs, and a total count for each phrase usage in the data. In this example, the distributed task control module 118 generates a first set of partial tasks 98 for finding and counting the first phase and a second set of partial tasks for finding and counting the second phrase. The distributed task control module 118 sends respective first and/or second partial tasks 98 to each DST execution unit 36.

Figure 5:
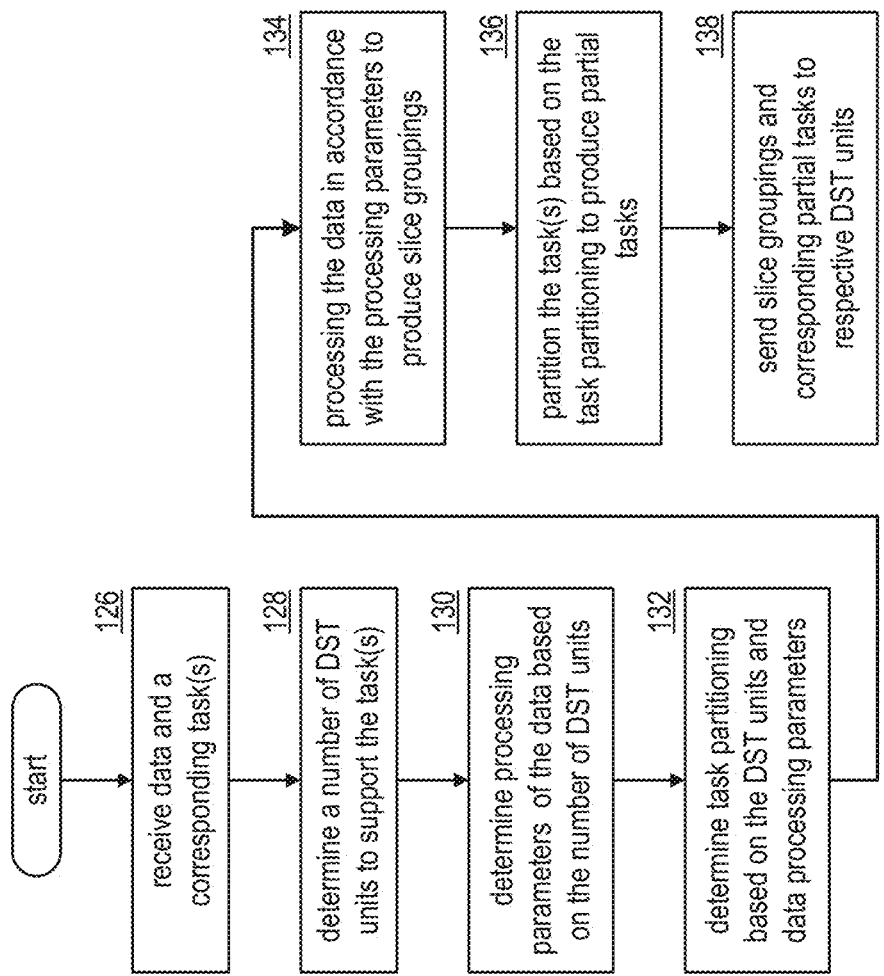
FIG. 5 is a logic diagram of an example of a method for outbound DST processing in accordance with the present invention.

FIG. 5 is a logic diagram of an example of a method for outbound distributed storage and task (DST) processing that begins at step 126 where a DST client module receives data and one or more corresponding tasks. The method continues at step 128 where the DST client module determines a number of DST units to support the task for one or more data partitions. For example, the DST client module may determine the number of DST units to support the task based on the size of the data, the requested task, the content of the data, a predetermined number (e.g., user indicated, system administrator determined, etc.), available DST units, capability of the DST units, and/or any other factor regarding distributed task processing of the data. The DST client module may select the same DST units for each data partition, may select different DST units for the data partitions, or a combination thereof.

The method continues at step 130 where the DST client module determines processing parameters of the data based on the number of DST units selected for distributed task processing. The processing parameters include data partitioning information, DS encoding parameters, and/or slice grouping information. The data partitioning information includes a number of data partitions, size of each data partition, and/or organization of the data partitions (e.g., number of data blocks in a partition, the size of the data blocks, and arrangement of the data blocks). The DS encoding parameters include segmenting information, segment security information, error encoding information (e.g., dispersed storage error encoding function parameters including one or more of pillar width, decode threshold, write threshold, read threshold, generator matrix), slicing information, and/or per slice security information. The slice grouping information includes information regarding how to arrange the encoded data slices into groups for the selected DST units. As a specific example, if the DST client module determines that five DST units are needed to support the task, then it determines that the error encoding parameters include a pillar width of five and a decode threshold of three.

The method continues at step 132 where the DST client module determines task partitioning information (e.g., how to partition the tasks) based on the selected DST units and data processing parameters. The data processing parameters include the processing parameters and DST unit capability information. The DST unit capability information includes the number of DT (distributed task) execution units, execution capabilities of each DT execution unit (e.g., MIPS capabilities, processing resources (e.g., quantity and capability of microprocessors, CPUs, digital signal processors, co-processor, microcontrollers, arithmetic logic circuitry, and/or and the other analog and/or digital processing circuitry), availability of the processing resources, memory information (e.g., type, size, availability, etc.)), and/or any information germane to executing one or more tasks.

The method continues at step 134 where the DST client module processes the data in accordance with the processing parameters to produce slice groupings. The method continues at step 136 where the DST client module partitions the task based on the task partitioning information to produce a set of partial tasks. The method continues at step 138 where the DST client module sends the slice groupings and the corresponding partial tasks to respective DST units.

Figure 6:
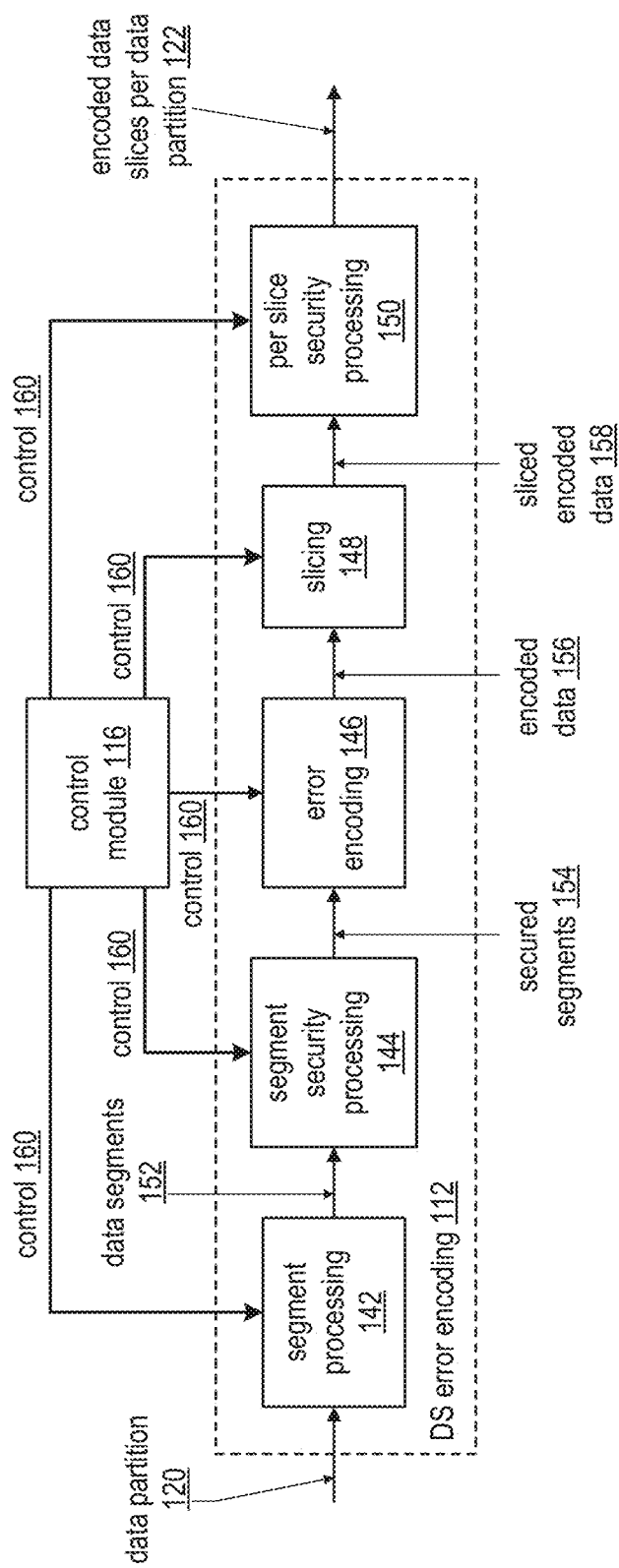
FIG. 6 is a schematic block diagram of an embodiment of a dispersed error encoding in accordance with the present invention.

FIG. 6 is a schematic block diagram of an embodiment of the dispersed storage (DS) error encoding module 112 of an outbound distributed storage and task (DST) processing section. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives a data partition 120 from a data partitioning module and receives segmenting information as the control information 160 from the control module 116. The segmenting information indicates how the segment processing module 142 is to segment the data partition 120. For example, the segmenting information indicates how many rows to segment the data based on a decode threshold of an error encoding scheme, indicates how many columns to segment the data into based on a number and size of data blocks within the data partition 120, and indicates how many columns to include in a data segment 152. The segment processing module 142 segments the data 120 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., cyclic redundancy check (CRC), etc.), and/or any other type of digital security. For example, when the segment security processing module 144 is enabled, it may compress a data segment 152, encrypt the compressed data segment, and generate a CRC value for the encrypted data segment to produce a secure data segment 154. When the segment security processing module 144 is not enabled, it passes the data segments 152 to the error encoding module 146 or is bypassed such that the data segments 152 are provided to the error encoding module 146.

The error encoding module 146 encodes the secure data segments 154 in accordance with error correction encoding parameters received as control information 160 from the control module 116. The error correction encoding parameters (e.g., also referred to as dispersed storage error coding parameters) include identifying an error correction encoding scheme (e.g., forward error correction algorithm, a Reed-Solomon based algorithm, an online coding algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment 154 to produce an encoded data segment 156.

The slicing module 148 slices the encoded data segment 156 in accordance with the pillar width of the error correction encoding parameters received as control information 160. For example, if the pillar width is five, the slicing module 148 slices an encoded data segment 156 into a set of five encoded data slices. As such, for a plurality of data segments 156 for a given data partition, the slicing module outputs a plurality of sets of encoded data slices 158.

The per slice security processing module 150, when enabled by the control module 116, secures each encoded data slice 158 based on slice security information received as control information 160 from the control module 116. The slice security information includes data compression, encryption, watermarking, integrity check (e.g., CRC, etc.), and/or any other type of digital security. For example, when the per slice security processing module 150 is enabled, it compresses an encoded data slice 158, encrypts the compressed encoded data slice, and generates a CRC value for the encrypted encoded data slice to produce a secure encoded data slice 122. When the per slice security processing module 150 is not enabled, it passes the encoded data slices 158 or is bypassed such that the encoded data slices 158 are the output of the DS error encoding module 112. Note that the control module 116 may be omitted and each module stores its own parameters.

Figure 7:
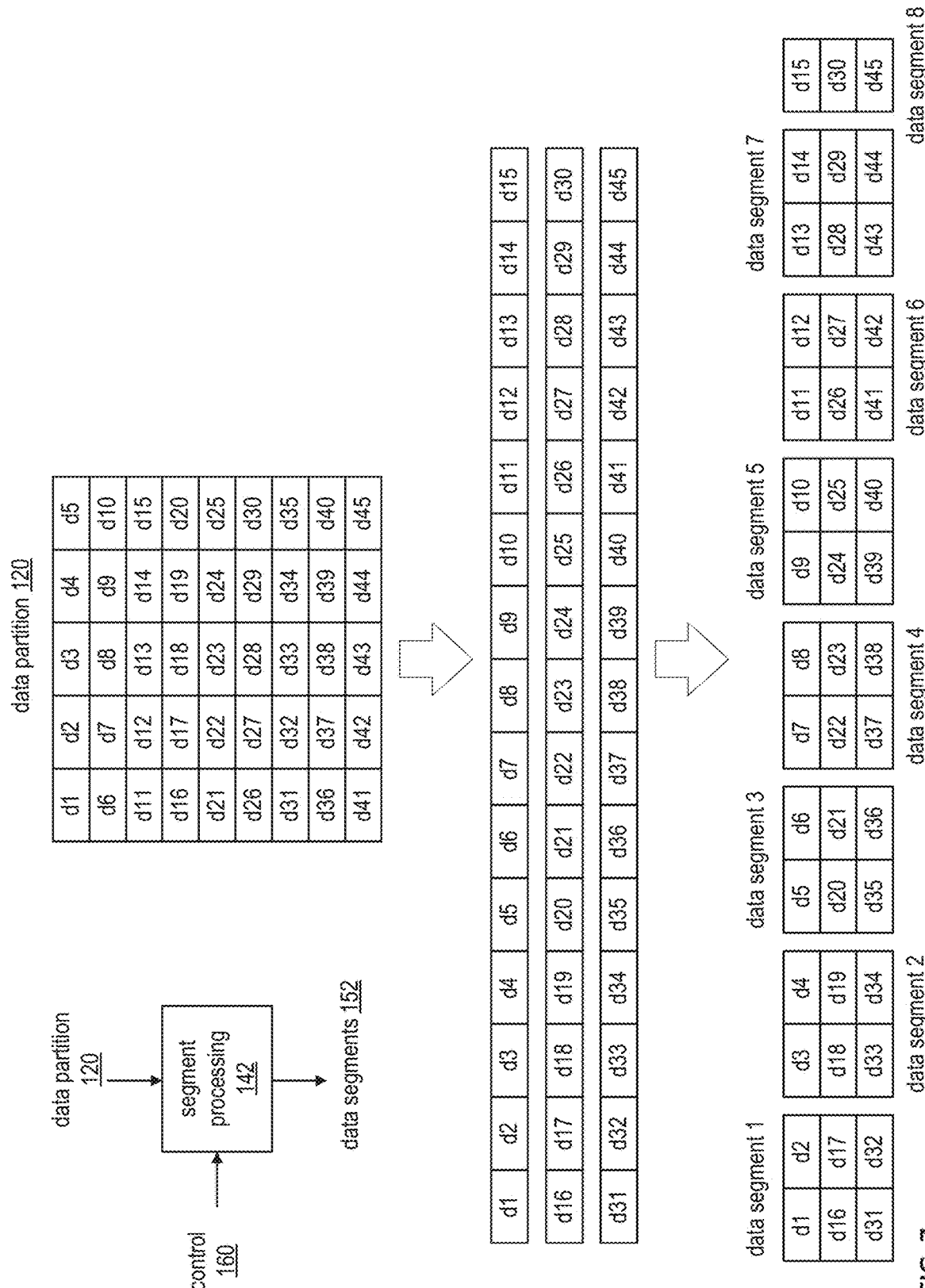
FIG. 7 is a diagram of an example of a segment processing of the dispersed error encoding in accordance with the present invention.

FIG. 7 is a diagram of an example of a segment processing of a dispersed storage (DS) error encoding module. In this example, a segment processing module 142 receives a data partition 120 that includes 45 data blocks (e.g., d1-d45), receives segmenting information (i.e., control information 160) from a control module, and segments the data partition 120 in accordance with the control information 160 to produce data segments 152. Each data block may be of the same size as other data blocks or of a different size. In addition, the size of each data block may be a few bytes to megabytes of data. As previously mentioned, the segmenting information indicates how many rows to segment the data partition into, indicates how many columns to segment the data partition into, and indicates how many columns to include in a data segment.

In this example, the decode threshold of the error encoding scheme is three; as such the number of rows to divide the data partition into is three. The number of columns for each row is set to 15, which is based on the number and size of data blocks. The data blocks of the data partition are arranged in rows and columns in a sequential order (i.e., the first row includes the first 15 data blocks; the second row includes the second 15 data blocks; and the third row includes the last 15 data blocks).

With the data blocks arranged into the desired sequential order, they are divided into data segments based on the segmenting information. In this example, the data partition is divided into 8 data segments; the first 7 include 2 columns of three rows and the last includes 1 column of three rows. Note that the first row of the 8 data segments is in sequential order of the first 15 data blocks; the second row of the 8 data segments in sequential order of the second 15 data blocks;

and the third row of the 8 data segments in sequential order of the last 15 data blocks. Note that the number of data blocks, the grouping of the data blocks into segments, and size of the data blocks may vary to accommodate the desired distributed task processing function.

Figure 8:
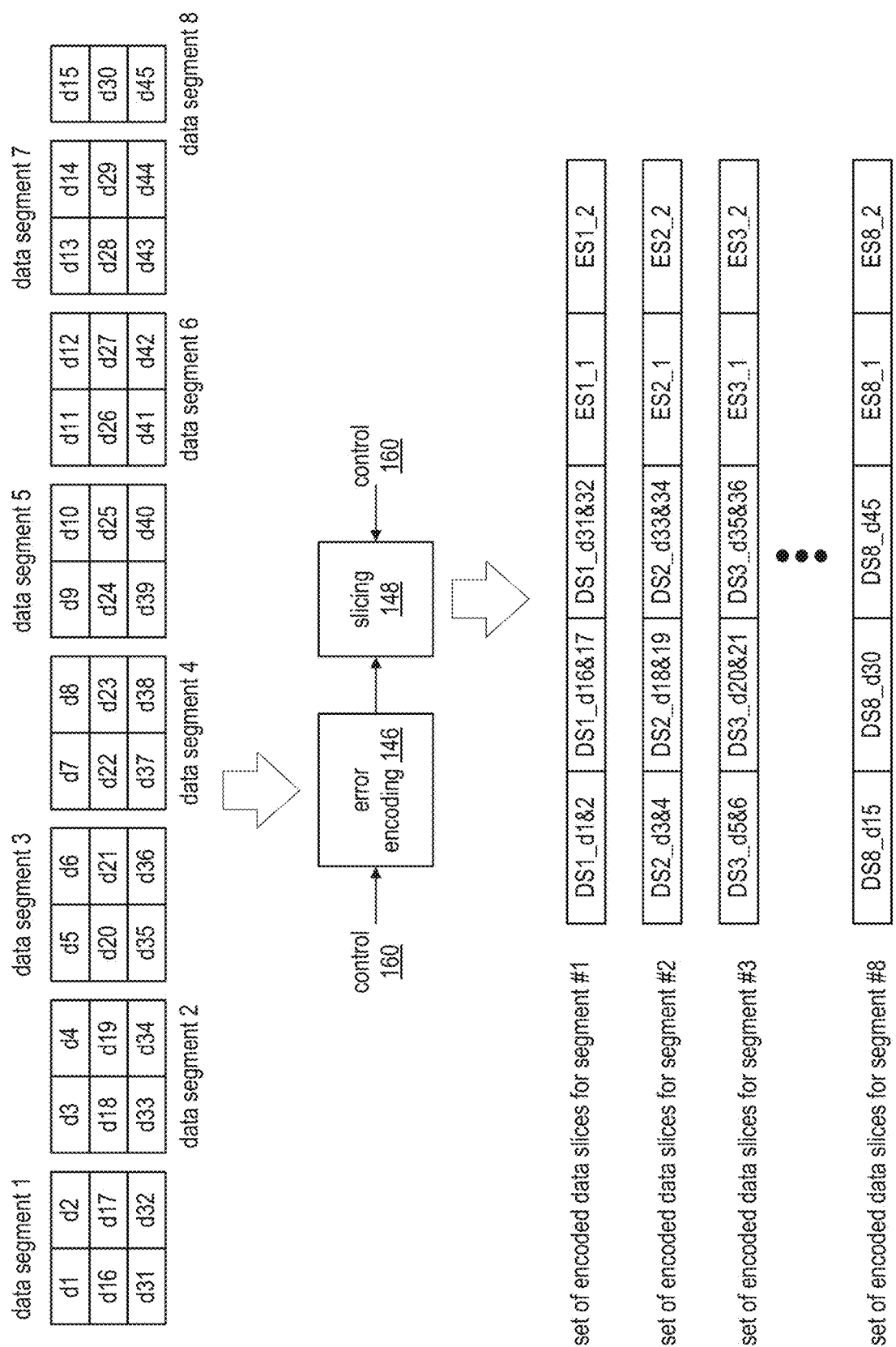
FIG. 8 is a diagram of an example of error encoding and slicing processing of the dispersed error encoding in accordance with the present invention.

FIG. 8 is a diagram of an example of error encoding and slicing processing of the dispersed error encoding processing the data segments of FIG. 7. In this example, data segment 1 includes 3 rows with each row being treated as one word for encoding. As such, data segment 1 includes three words for encoding: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

In operation, an error encoding module 146 and a slicing module 148 convert each data segment into a set of encoded data slices in accordance with error correction encoding parameters as control information 160. More specifically, when the error correction encoding parameters indicate a unity matrix Reed-Solomon based encoding algorithm, 5 pillars, and decode threshold of 3, the first three encoded data slices of the set of encoded data slices for a data segment are substantially similar to the corresponding word of the data segment. For instance, when the unity matrix Reed-Solomon based encoding algorithm is applied to data segment 1, the content of the first encoded data slice (DS1_d1&2) of the first set of encoded data slices (e.g., corresponding to data segment 1) is substantially similar to content of the first word (e.g., d1 & d2); the content of the second encoded data slice (DS1_d16&17) of the first set of encoded data slices is substantially similar to content of the second word (e.g., d16 & d17); and the content of the third encoded data slice (DS1_d31&32) of the first set of encoded data slices is substantially similar to content of the third word (e.g., d31 & d32).

The content of the fourth and fifth encoded data slices (e.g., ES1_1 and ES1_2) of the first set of encoded data slices include error correction data based on the first-third words of the first data segment. With such an encoding and slicing scheme, retrieving any three of the five encoded data slices allows the data segment to be accurately reconstructed.

The encoding and slices of data segments 2-7 yield sets of encoded data slices similar to the set of encoded data slices of data segment 1. For instance, the content of the first encoded data slice (DS2_d3&4) of the second set of encoded data slices (e.g., corresponding to data segment 2) is substantially similar to content of the first word (e.g., d3 & d4); the content of the second encoded data slice (DS2_d18&19) of the second set of encoded data slices is substantially similar to content of the second word (e.g., d18 & d19); and the content of the third encoded data slice (DS2_d33&34) of the second set of encoded data slices is substantially similar to content of the third word (e.g., d33 & d34). The content of the fourth and fifth encoded data slices (e.g., ES1_1 and ES1_2) of the second set of encoded data slices includes error correction data based on the first-third words of the second data segment.

Figure 9:
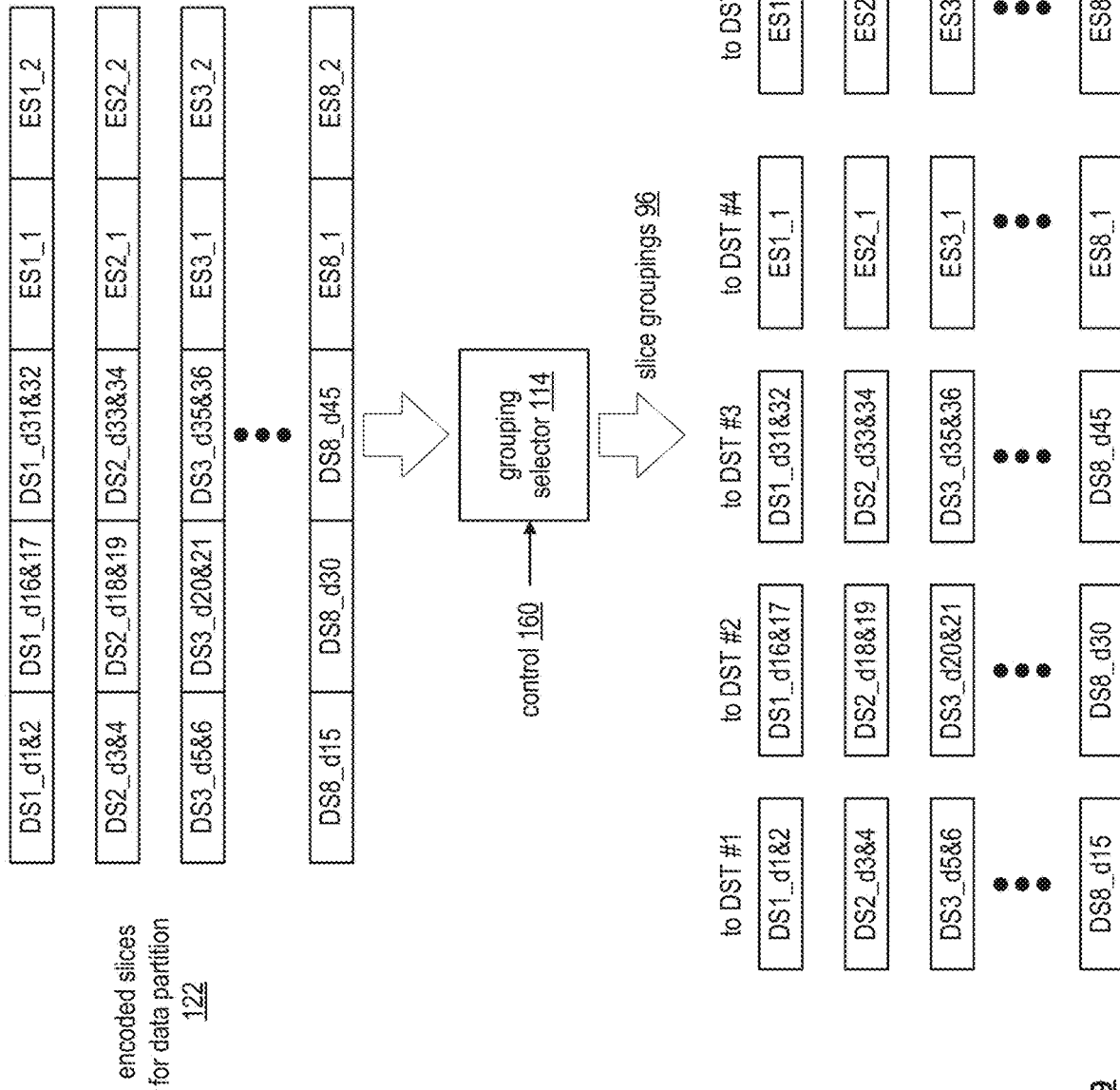
FIG. 9 is a diagram of an example of grouping selection processing of the outbound DST processing in accordance with the present invention.

FIG. 9 is a diagram of an example of grouping selection processing of an outbound distributed storage and task (DST) processing in accordance with group selection information as control information 160 from a control module. Encoded slices for data partition 122 are grouped in accordance with the control information 160 to produce slice groupings 96. In this example, a grouping selection module 114 organizes the encoded data slices into five slice groupings (e.g., one for each DST execution unit of a distributed storage and task network (DSTN) module). As a specific example, the grouping selection module 114 creates a first slice grouping for a DST execution unit #1, which includes first encoded slices of each of the sets of encoded slices. As such, the first DST execution unit receives encoded data slices corresponding to data blocks 1-15 (e.g., encoded data slices of contiguous data).

The grouping selection module 114 also creates a second slice grouping for a DST execution unit #2, which includes second encoded slices of each of the sets of encoded slices. As such, the second DST execution unit receives encoded data slices corresponding to data blocks 16-30. The grouping selection module 114 further creates a third slice grouping for DST execution unit #3, which includes third encoded slices of each of the sets of encoded slices. As such, the third DST execution unit receives encoded data slices corresponding to data blocks 31-45.

The grouping selection module 114 creates a fourth slice grouping for DST execution unit #4, which includes fourth encoded slices of each of the sets of encoded slices. As such, the fourth DST execution unit receives encoded data slices corresponding to first error encoding information (e.g., encoded data slices of error coding (EC) data). The grouping selection module 114 further creates a fifth slice grouping for DST execution unit #5, which includes fifth encoded slices of each of the sets of encoded slices. As such, the fifth DST execution unit receives encoded data slices corresponding to second error encoding information.

Figure 10:
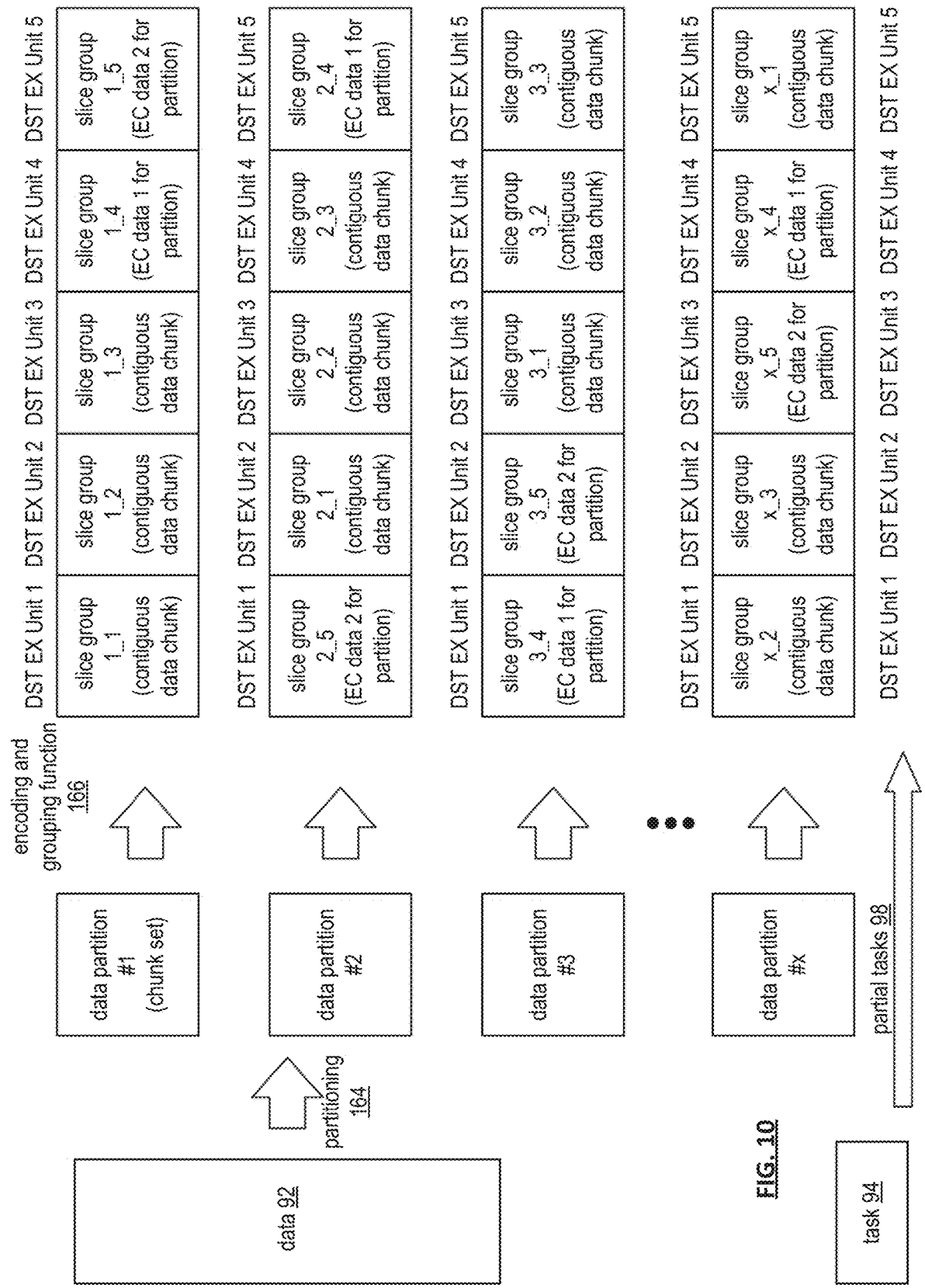
FIG. 10 is a diagram of an example of converting data into slice groups in accordance with the present invention.

FIG. 10 is a diagram of an example of converting data 92 into slice groups that expands on the preceding figures. As shown, the data 92 is partitioned in accordance with a partitioning function 164 into a plurality of data partitions (1-x, where x is an integer greater than 4). Each data partition (or chunkset of data) is encoded and grouped into slice groupings as previously discussed by an encoding and grouping function 166. For a given data partition, the slice groupings are sent to distributed storage and task (DST) execution units. From data partition to data partition, the ordering of the slice groupings to the DST execution units may vary.

For example, the slice groupings of data partition #1 is sent to the DST execution units such that the first DST execution receives first encoded data slices of each of the sets of encoded data slices, which corresponds to a first continuous data chunk of the first data partition (e.g., refer to FIG. 9), a second DST execution receives second encoded data slices of each of the sets of encoded data slices, which corresponds to a second continuous data chunk of the first data partition, etc.

For the second data partition, the slice groupings may be sent to the DST execution units in a different order than it was done for the first data partition. For instance, the first slice grouping of the second data partition (e.g., slice group 2_1) is sent to the second DST execution unit; the second slice grouping of the second data partition (e.g., slice group 2_2) is sent to the third DST execution unit; the third slice grouping of the second data partition (e.g., slice group 2_3) is sent to the fourth DST execution unit; the fourth slice grouping of the second data partition (e.g., slice group 2_4, which includes first error coding information) is sent to the fifth DST execution unit; and the fifth slice grouping of the second data partition (e.g., slice group 2_5, which includes second error coding information) is sent to the first DST execution unit.

The pattern of sending the slice groupings to the set of DST execution units may vary in a predicted pattern, a random pattern, and/or a combination thereof from data partition to data partition. In addition, from data partition to data partition, the set of DST execution units may change. For example, for the first data partition, DST execution units 1-5 may be used; for the second data partition, DST execution units 6-10 may be used; for the third data partition, DST execution units 3-7 may be used; etc. As is also shown, the task is divided into partial tasks that are sent to the DST execution units in conjunction with the slice groupings of the data partitions.

Figure 11:
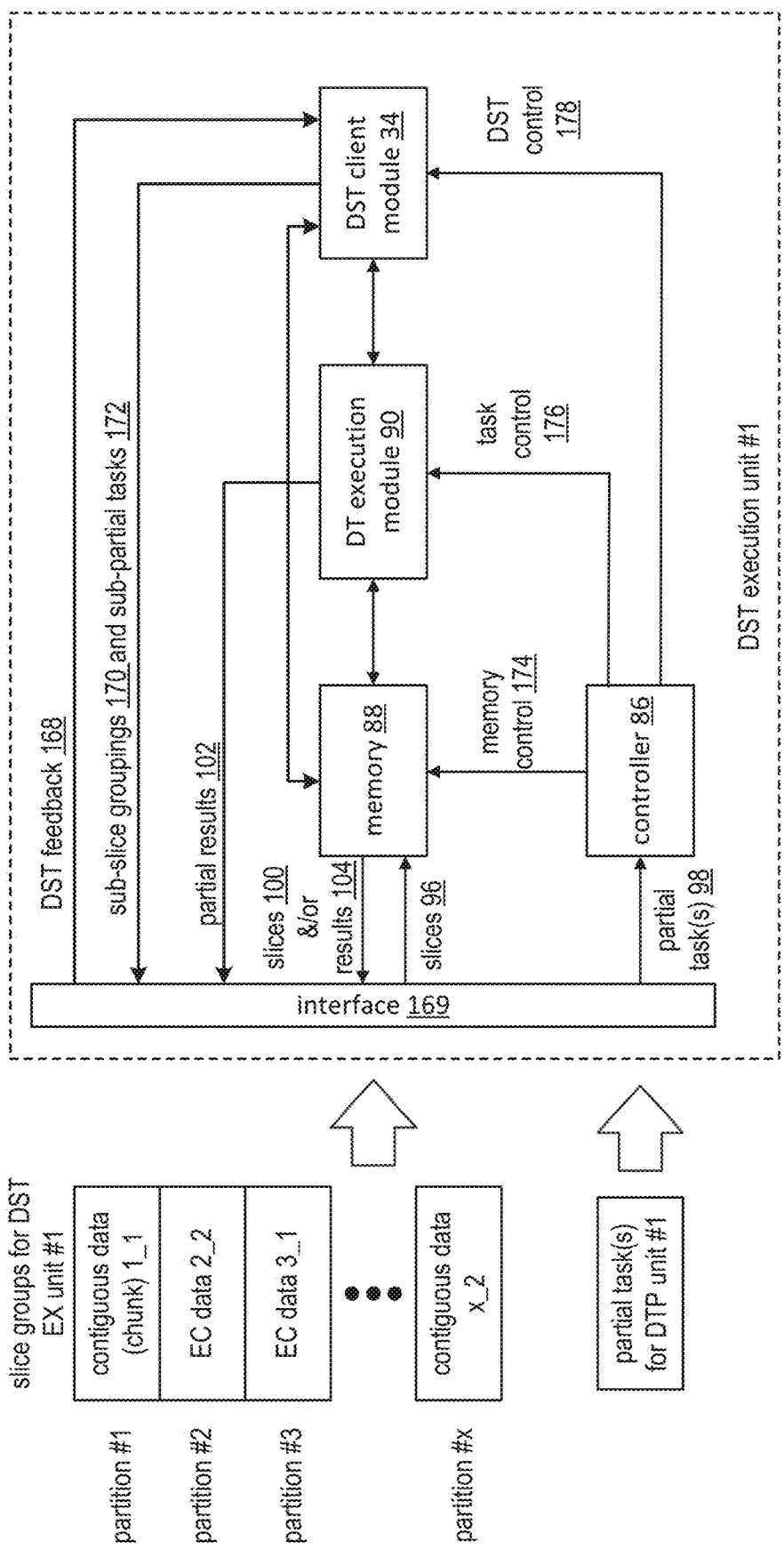
FIG. 11 is a schematic block diagram of an embodiment of a DST execution unit in accordance with the present invention.

FIG. 11 is a schematic block diagram of an embodiment of a DST (distributed storage and/or task) execution unit that includes an interface 169, a controller 86, memory 88, one or more DT (distributed task) execution modules 90, and a DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a slice group, the DST execution module receives a slice grouping 96 (e.g., slice group #1) via interface 169. The slice grouping 96 includes, per partition, encoded data slices of contiguous data or encoded data slices of error coding (EC) data. For slice group #1, the DST execution module receives encoded data slices of contiguous data for partitions #1 and #x (and potentially others between 3 and x) and receives encoded data slices of EC data for partitions #2 and #3 (and potentially others between 3 and x). Examples of encoded data slices of contiguous data and encoded data slices of error coding (EC) data are discussed with reference to FIG. 9. The memory 88 stores the encoded data slices of slice groupings 96 in accordance with memory control information 174 it receives from the controller 86.

The controller 86 (e.g., a processing module, a CPU, etc.) generates the memory control information 174 based on a partial task(s) 98 and distributed computing information (e.g., user information (e.g., user ID, distributed computing permissions, data access permission, etc.), vault information (e.g., virtual memory assigned to user, user group, temporary storage for task processing, etc.), task validation information, etc.). For example, the controller 86 interprets the partial task(s) 98 in light of the distributed computing information to determine whether a requestor is authorized to perform the task 98, is authorized to access the data, and/or is authorized to perform the task on this particular data. When the requestor is authorized, the controller 86 determines, based on the task 98 and/or another input, whether the encoded data slices of the slice grouping 96 are to be temporarily stored or permanently stored. Based on the foregoing, the controller 86 generates the memory control information 174 to write the encoded data slices of the slice grouping 96 into the memory 88 and to indicate whether the slice grouping 96 is permanently stored or temporarily stored.

With the slice grouping 96 stored in the memory 88, the controller 86 facilitates execution of the partial task(s) 98. In an example, the controller 86 interprets the partial task 98 in light of the capabilities of the DT execution module(s) 90. The capabilities include one or more of MIPS capabilities, processing resources (e.g., quantity and capability of microprocessors, CPUs, digital signal processors, co-processor, microcontrollers, arithmetic logic circuitry, and/or and the other analog and/or digital processing circuitry), availability of the processing resources, etc. If the controller 86 determines that the DT execution module(s) 90 have sufficient capabilities, it generates task control information 176.

The task control information 176 may be a generic instruction (e.g., perform the task on the stored slice grouping) or a series of operational codes. In the former instance, the DT execution module 90 includes a co-processor function specifically configured (fixed or programmed) to perform the desired task 98. In the latter instance, the DT execution module 90 includes a general processor topology where the controller stores an algorithm corresponding to the particular task 98. In this instance, the controller 86 provides the operational codes (e.g., assembly language, source code of a programming language, object code, etc.) of the algorithm to the DT execution module 90 for execution.

Depending on the nature of the task 98, the DT execution module 90 may generate intermediate partial results 102 that are stored in the memory 88 or in a cache memory (not shown) within the DT execution module 90. In either case, when the DT execution module 90 completes execution of the partial task 98, it outputs one or more partial results 102. The partial results may 102 also be stored in memory 88.

If, when the controller 86 is interpreting whether capabilities of the DT execution module(s) 90 can support the partial task 98, the controller 86 determines that the DT execution module(s) 90 cannot adequately support the task 98 (e.g., does not have the right resources, does not have sufficient available resources, available resources would be too slow, etc.), it then determines whether the partial task 98 should be fully offloaded or partially offloaded.

If the controller 86 determines that the partial task 98 should be fully offloaded, it generates DST control information 178 and provides it to the DST client module 34. The DST control information 178 includes the partial task 98, memory storage information regarding the slice grouping 96, and distribution instructions. The distribution instructions instruct the DST client module 34 to divide the partial task 98 into sub-partial tasks 172, to divide the slice grouping 96 into sub-slice groupings 170, and identity of other DST execution units. The DST client module 34 functions in a similar manner as the DST client module 34 of FIGS. 3-10 to produce the sub-partial tasks 172 and the sub-slice groupings 170 in accordance with the distribution instructions.

The DST client module 34 receives DST feedback 168 (e.g., sub-partial results), via the interface 169, from the DST execution units to which the task was offloaded. The DST client module 34 provides the sub-partial results to the DST execution unit, which processes the sub-partial results to produce the partial result(s) 102.

If the controller 86 determines that the partial task 98 should be partially offloaded, it determines what portion of the task 98 and/or slice grouping 96 should be processed locally and what should be offloaded. For the portion that is being locally processed, the controller 86 generates task control information 176 as previously discussed. For the portion that is being offloaded, the controller 86 generates DST control information 178 as previously discussed.

When the DST client module 34 receives DST feedback 168 (e.g., sub-partial results) from the DST executions units to which a portion of the task was offloaded, it provides the sub-partial results to the DT execution module 90. The DT execution module 90 processes the sub-partial results with the sub-partial results it created to produce the partial result(s) 102.

The memory 88 may be further utilized to retrieve one or more of stored slices 100, stored results 104, partial results 102 when the DT execution module 90 stores partial results 102 and/or results 104 and the memory 88. For example, when the partial task 98 includes a retrieval request, the controller 86 outputs the memory control 174 to the memory 88 to facilitate retrieval of slices 100 and/or results 104.

Figure 12:
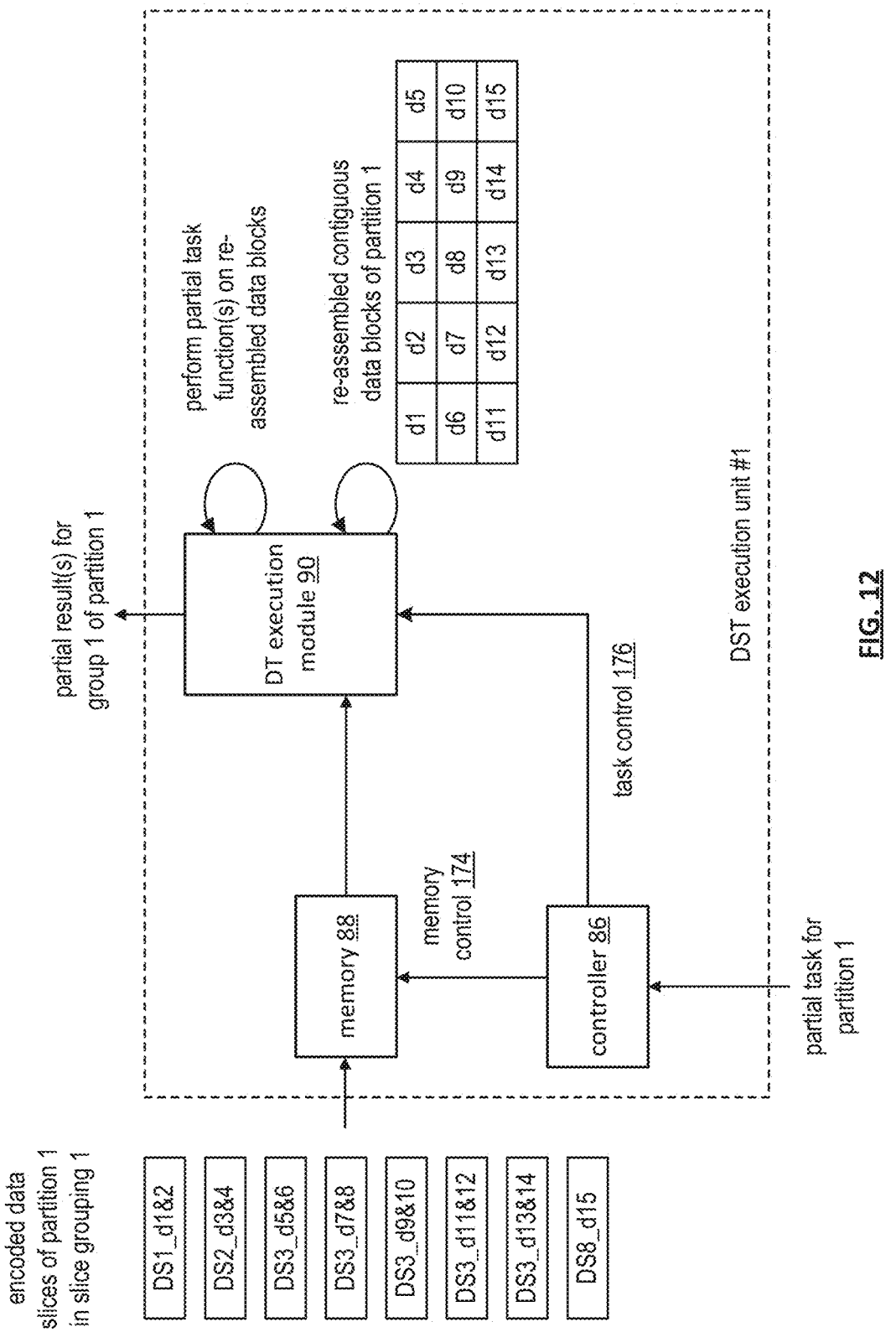
FIG. 12 is a schematic block diagram of an example of operation of a DST execution unit in accordance with the present invention.

FIG. 12 is a schematic block diagram of an example of operation of a distributed storage and task (DST) execution unit storing encoded data slices and executing a task thereon. To store the encoded data slices of a partition 1 of slice grouping 1, a controller 86 generates write commands as memory control information 174 such that the encoded slices are stored in desired locations (e.g., permanent or temporary) within memory 88.

Once the encoded slices are stored, the controller 86 provides task control information 176 to a distributed task (DT) execution module 90. As a first step executing the task in accordance with the task control information 176, the DT execution module 90 retrieves the encoded slices from memory 88. The DT execution module 90 then reconstructs contiguous data blocks of a data partition. As shown for this example, reconstructed contiguous data blocks of data partition 1 include data blocks 1-15 (e.g., d1-d15).

With the contiguous data blocks reconstructed, the DT execution module 90 performs the task on the reconstructed contiguous data blocks. For example, the task may be to search the reconstructed contiguous data blocks for a particular word or phrase, identify where in the reconstructed contiguous data blocks the particular word or phrase occurred, and/or count the occurrences of the particular word or phrase on the reconstructed contiguous data blocks. The DST execution unit continues in a similar manner for the encoded data slices of other partitions in slice grouping 1. Note that with using the unity matrix error encoding scheme previously discussed, if the encoded data slices of contiguous data are uncorrupted, the decoding of them is a relatively straightforward process of extracting the data.

If, however, an encoded data slice of contiguous data is corrupted (or missing), it can be rebuilt by accessing other DST execution units that are storing the other encoded data slices of the set of encoded data slices of the corrupted encoded data slice. In this instance, the DST execution unit having the corrupted encoded data slices retrieves at least three encoded data slices (of contiguous data and of error coding data) in the set from the other DST execution units (recall for this example, the pillar width is 5 and the decode threshold is 3). The DST execution unit decodes the retrieved data slices using the DS error encoding parameters to recapture the corresponding data segment. The DST execution unit then re-encodes the data segment using the DS error encoding parameters to rebuild the corrupted encoded data slice. Once the encoded data slice is rebuilt, the DST execution unit functions as previously described.

Figure 13:
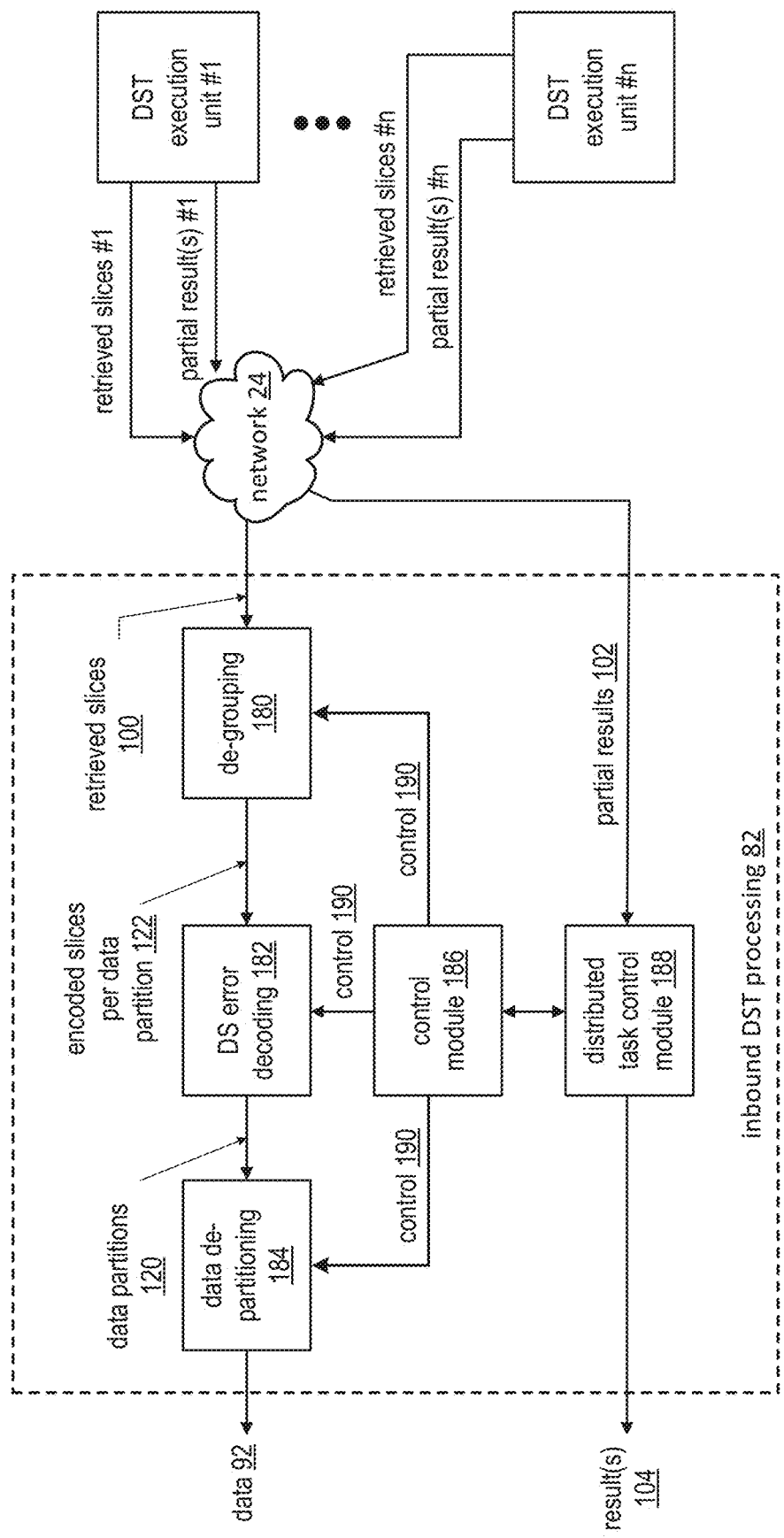
FIG. 13 is a schematic block diagram of an embodiment of an inbound distributed storage and/or task (DST) processing in accordance with the present invention.

FIG. 13 is a schematic block diagram of an embodiment of an inbound distributed storage and/or task (DST) processing section 82 of a DST client module coupled to DST execution units of a distributed storage and task network (DSTN) module via a network 24. The inbound DST processing section 82 includes a de-grouping module 180, a DS (dispersed storage) error decoding module 182, a data de-partitioning module 184, a control module 186, and a distributed task control module 188. Note that the control module 186 and/or the distributed task control module 188 may be separate modules from corresponding ones of outbound DST processing section or may be the same modules.

In an example of operation, the DST execution units have completed execution of corresponding partial tasks on the corresponding slice groupings to produce partial results 102.

The inbounded DST processing section 82 receives the partial results 102 via the distributed task control module 188. The inbound DST processing section 82 then processes the partial results 102 to produce a final result, or results 104. For example, if the task was to find a specific word or phrase within data, the partial results 102 indicate where in each of the prescribed portions of the data the corresponding DST execution units found the specific word or phrase. The distributed task control module 188 combines the individual partial results 102 for the corresponding portions of the data into a final result 104 for the data as a whole.

In another example of operation, the inbound DST processing section 82 is retrieving stored data from the DST execution units (i.e., the DSTN module). In this example, the DST execution units output encoded data slices 100 corresponding to the data retrieval requests. The de-grouping module 180 receives retrieved slices 100 and de-groups them to produce encoded data slices per data partition 122. The DS error decoding module 182 decodes, in accordance with DS error encoding parameters, the encoded data slices per data partition 122 to produce data partitions 120.

The data de-partitioning module 184 combines the data partitions 120 into the data 92. The control module 186 controls the conversion of retrieve slices 100 into the data 92 using control signals 190 to each of the modules. For instance, the control module 186 provides de-grouping information to the de-grouping module 180, provides the DS error encoding parameters to the DS error decoding module 182, and provides de-partitioning information to the data de-partitioning module 184.

Figure 14:
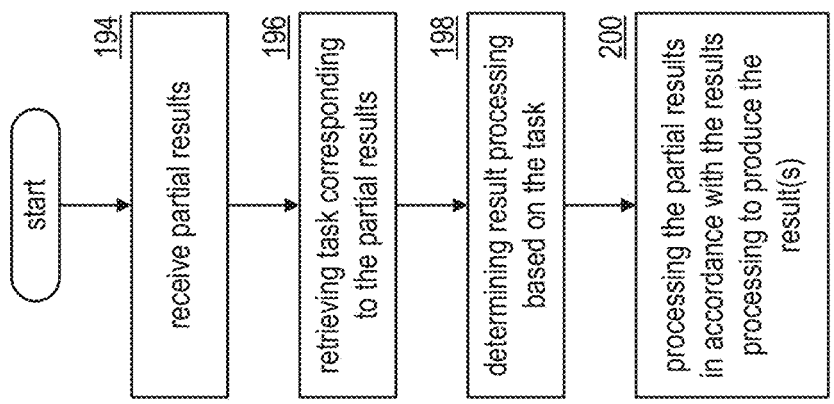
FIG. 14 is a logic diagram of an example of a method for inbound DST processing in accordance with the present invention.

FIG. 14 is a logic diagram of an example of a method that is executable by distributed storage and task (DST) client module regarding inbound DST processing. The method begins at step 194 where the DST client module receives partial results. The method continues at step 196 where the DST client module retrieves the task corresponding to the partial results. For example, the partial results include header information that identifies the requesting entity, which correlates to the requested task.

The method continues at step 198 where the DST client module determines result processing information based on the task. For example, if the task were to identify a particular word or phrase within the data, the result processing information would indicate to aggregate the partial results for the corresponding portions of the data to produce the final result. As another example, if the task were to count the occurrences of a particular word or phrase within the data, results of processing the information would indicate to add the partial results to produce the final results. The method continues at step 200 where the DST client module processes the partial results in accordance with the result processing information to produce the final result or results.

Figure 15:
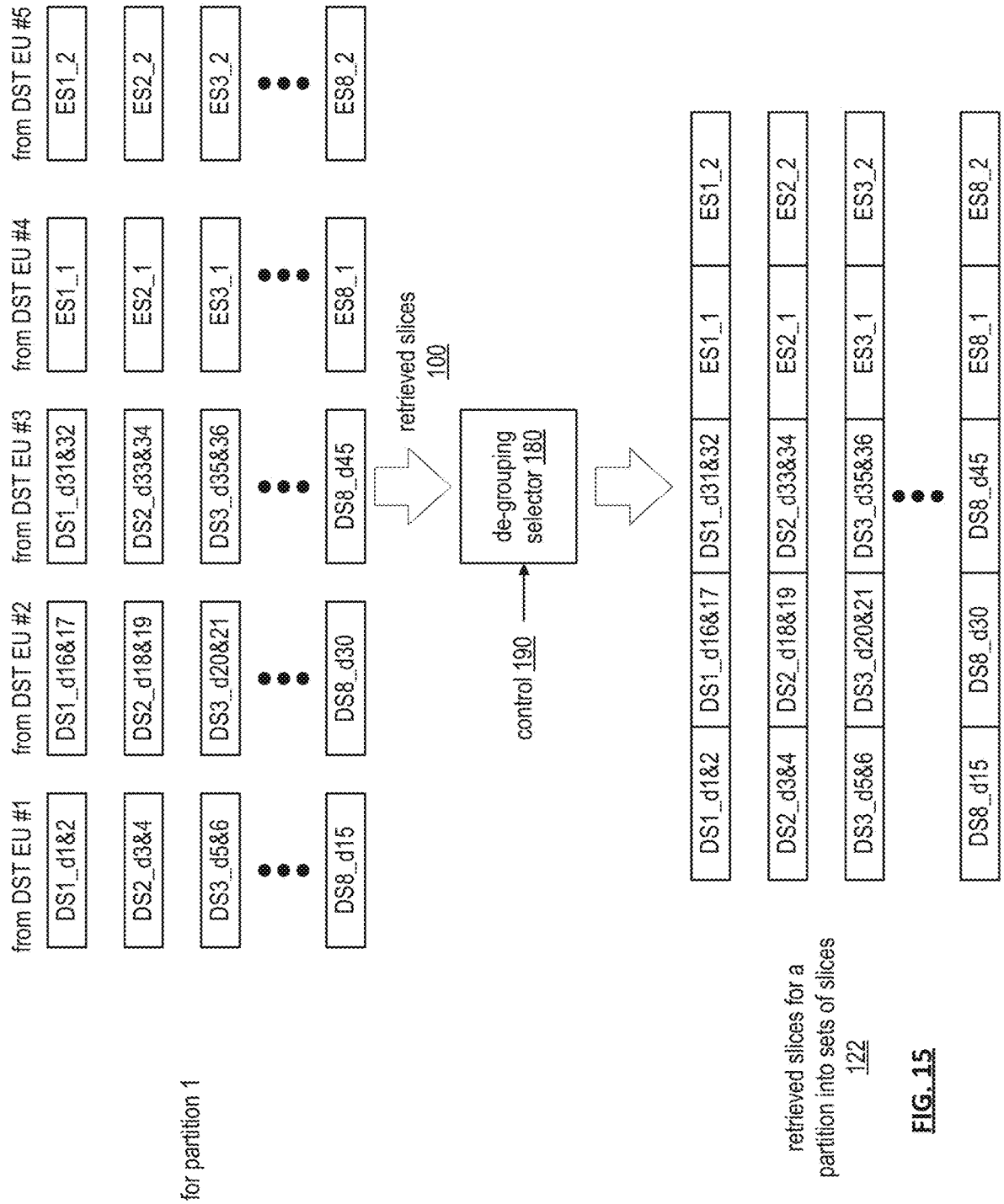
FIG. 15 is a diagram of an example of de-grouping selection processing of the inbound DST processing in accordance with the present invention.

FIG. 15 is a diagram of an example of de-grouping selection processing of an inbound distributed storage and task (DST) processing section of a DST client module. In general, this is an inverse process of the grouping module of the outbound DST processing section of FIG. 9. Accordingly, for each data partition (e.g., partition #1), the de-grouping module retrieves the corresponding slice grouping from the DST execution units (EU) (e.g., DST 1-5).

As shown, DST execution unit #1 provides a first slice grouping, which includes the first encoded slices of each of the sets of encoded slices (e.g., encoded data slices of contiguous data of data blocks 1-15); DST execution unit #2 provides a second slice grouping, which includes the second encoded slices of each of the sets of encoded slices (e.g., encoded data slices of contiguous data of data blocks 16-30);

DST execution unit #3 provides a third slice grouping, which includes the third encoded slices of each of the sets of encoded slices (e.g., encoded data slices of contiguous data of data blocks 31-45); DST execution unit #4 provides a fourth slice grouping, which includes the fourth encoded slices of each of the sets of encoded slices (e.g., first encoded data slices of error coding (EC) data); and DST execution unit #5 provides a fifth slice grouping, which includes the fifth encoded slices of each of the sets of encoded slices (e.g., first encoded data slices of error coding (EC) data).

The de-grouping module de-groups the slice groupings (e.g., received slices 100) using a de-grouping selector 180 controlled by a control signal 190 as shown in the example to produce a plurality of sets of encoded data slices (e.g., retrieved slices for a partition into sets of slices 122). Each set corresponding to a data segment of the data partition.

Figure 16:
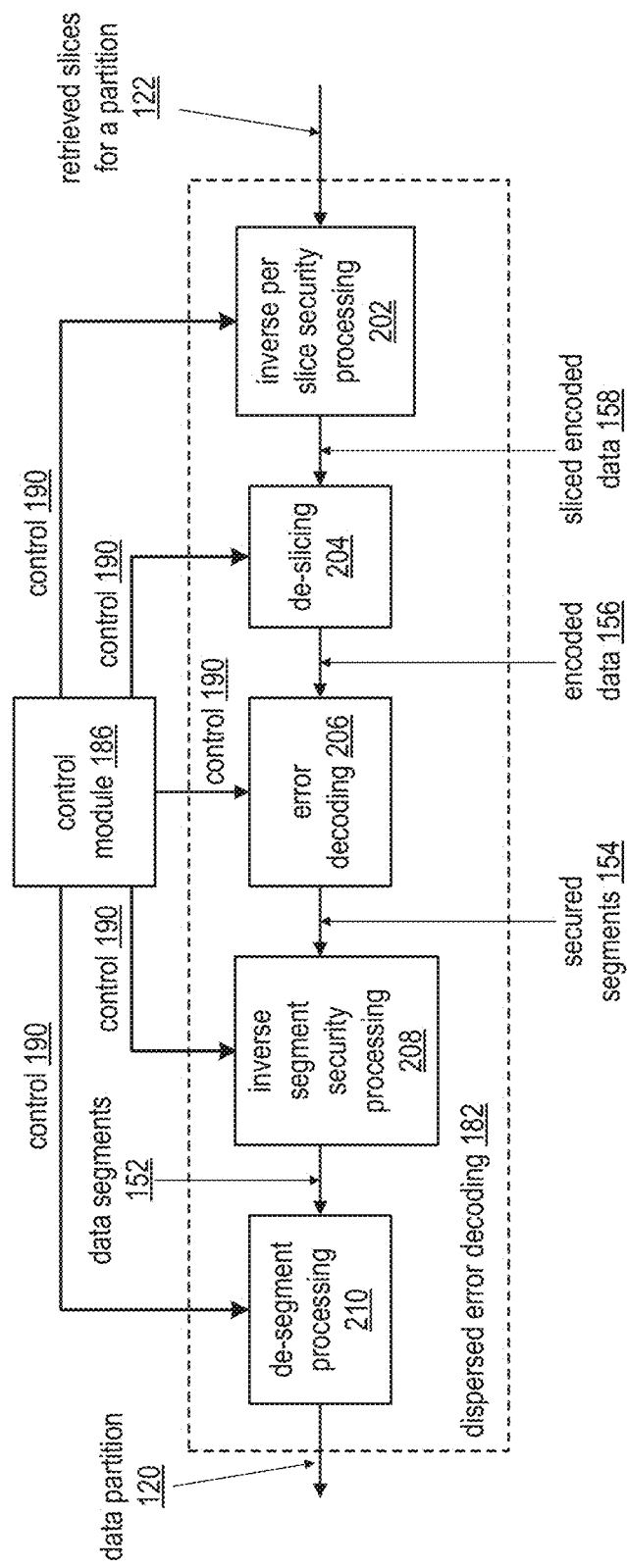
FIG. 16 is a schematic block diagram of an embodiment of a dispersed error decoding in accordance with the present invention.

FIG. 16 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, a de-segmenting processing module 210, and a control module 186.

In an example of operation, the inverse per slice security processing module 202, when enabled by the control module 186, unsecures each encoded data slice 122 based on slice de-security information received as control information 190 (e.g., the compliment of the slice security information discussed with reference to FIG. 6) received from the control module 186. The slice security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 122, it decrypts each verified encoded data slice, and decompresses each decrypted encoded data slice to produce slice encoded data 158. When the inverse per slice security processing module 202 is not enabled, it passes the encoded data slices 122 as the sliced encoded data 158 or is bypassed such that the retrieved encoded data slices 122 are provided as the sliced encoded data 158.

The de-slicing module 204 de-slices the sliced encoded data 158 into encoded data segments 156 in accordance with a pillar width of the error correction encoding parameters received as control information 190 from the control module 186. For example, if the pillar width is five, the de-slicing module 204 de-slices a set of five encoded data slices into an encoded data segment 156. The error decoding module 206 decodes the encoded data segments 156 in accordance with error correction decoding parameters received as control information 190 from the control module 186 to produce secure data segments 154. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments 154 based on segment security information received as control information 190 from the control module 186. The segment security information includes data decompression, decryption, de-watermarking, integrity check (e.g., CRC, etc.) verification, and/or any other type of digital security. For example, when the inverse segment security processing module 208 is enabled, it verifies integrity information (e.g., a CRC value) of each secure data segment 154, it decrypts each verified secured data segment, and decompresses each decrypted secure data segment to produce a data segment 152. When the inverse segment security processing module 208 is not enabled, it passes the decoded data segment 154 as the data segment 152 or is bypassed.

The de-segment processing module 210 receives the data segments 152 and receives de-segmenting information as control information 190 from the control module 186. The de-segmenting information indicates how the de-segment processing module 210 is to de-segment the data segments 152 into a data partition 120. For example, the de-segmenting information indicates how the rows and columns of data segments are to be rearranged to yield the data partition 120.

Figure 17:
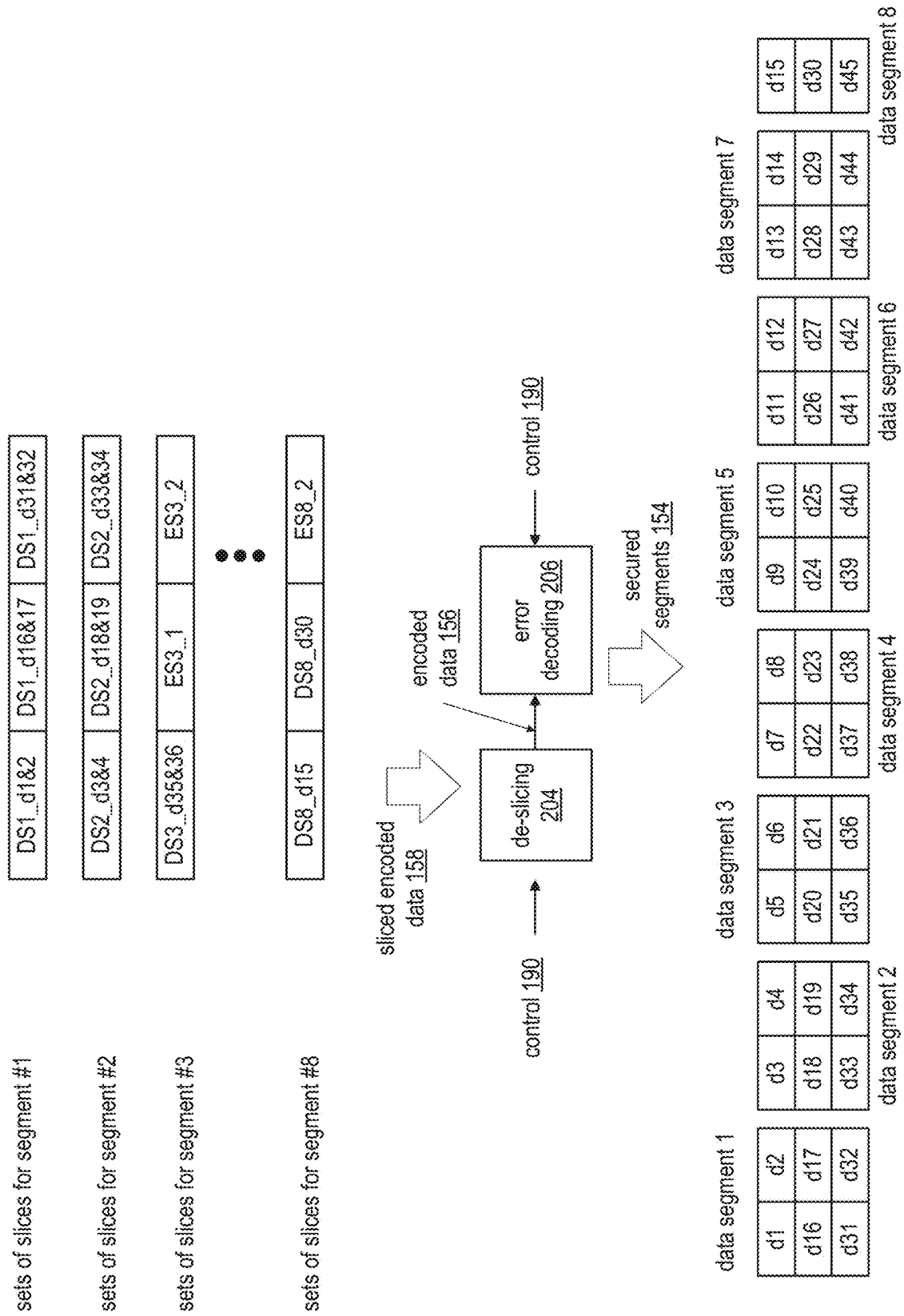
FIG. 17 is a diagram of an example of de-slicing and error decoding processing of the dispersed error decoding in accordance with the present invention.

FIG. 17 is a diagram of an example of de-slicing and error decoding processing of a dispersed error decoding module. A de-slicing module 204 receives at least a decode threshold number of encoded data slices 158 for each data segment in accordance with control information 190 and provides encoded data 156. In this example, a decode threshold is three. As such, each set of encoded data slices 158 is shown to have three encoded data slices per data segment. The de-slicing module 204 may receive three encoded data slices per data segment because an associated distributed storage and task (DST) client module requested retrieving only three encoded data slices per segment or selected three of the retrieved encoded data slices per data segment. As shown, which is based on the unity matrix encoding previously discussed with reference to FIG. 8, an encoded data slice may be a data-based encoded data slice (e.g., DS1_d1&d2) or an error code based encoded data slice (e.g., ES3_1).

An error decoding module 206 decodes the encoded data 156 of each data segment in accordance with the error correction decoding parameters of control information 190 to produce secured segments 154. In this example, data segment 1 includes 3 rows with each row being treated as one word for encoding. As such, data segment 1 includes three words: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

Figure 18:
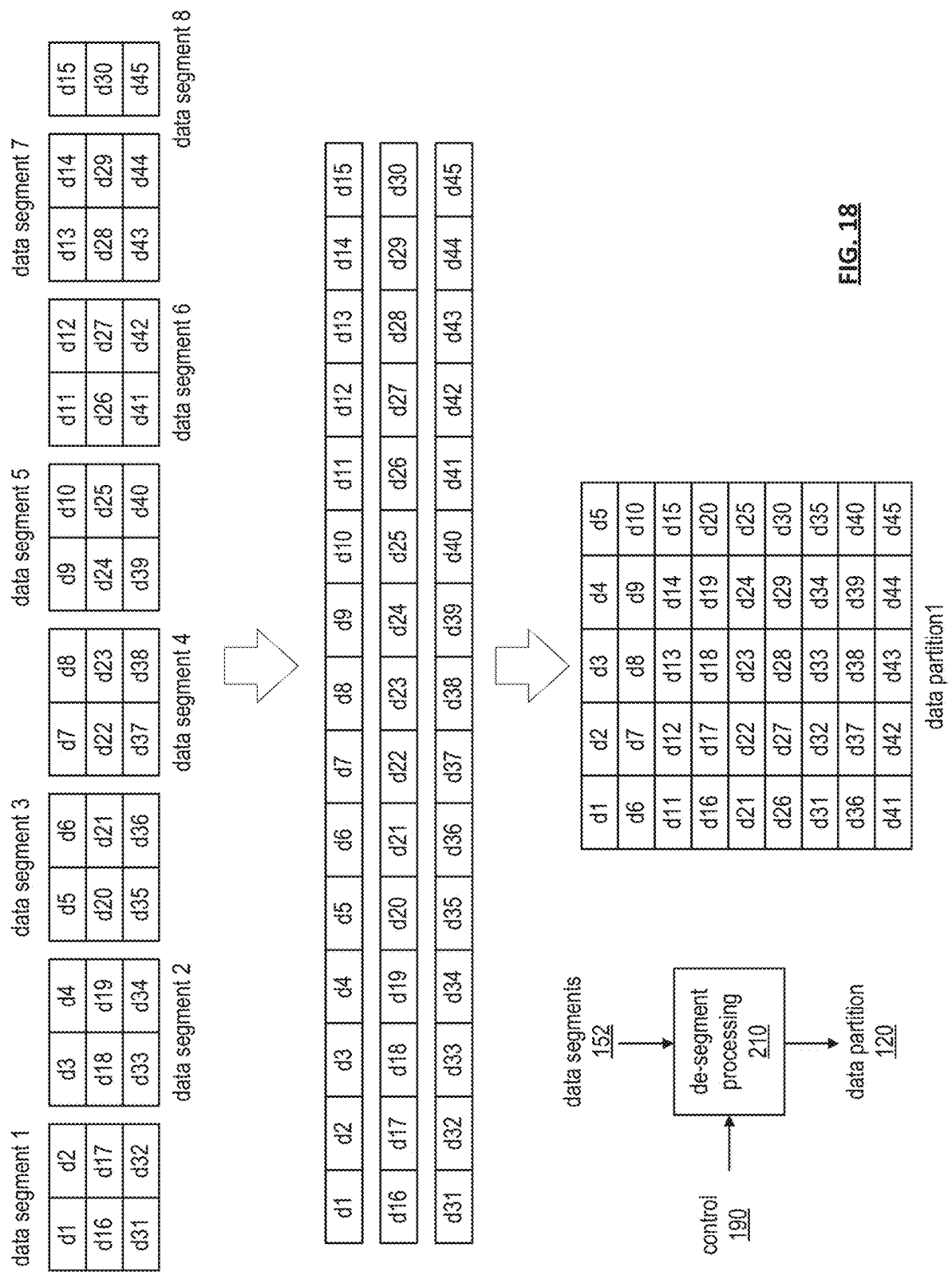
FIG. 18 is a diagram of an example of a de-segment processing of the dispersed error decoding in accordance with the present invention.

FIG. 18 is a diagram of an example of a de-segment processing of an inbound distributed storage and task (DST) processing. In this example, a de-segment processing module 210 receives data segments 152 (e.g., 1-8) and rearranges the data blocks of the data segments into rows and columns in accordance with de-segmenting information of control information 190 to produce a data partition 120. Note that the number of rows is based on the decode threshold (e.g., 3 in this specific example) and the number of columns is based on the number and size of the data blocks.

The de-segmenting module 210 converts the rows and columns of data blocks into the data partition 120. Note that each data block may be of the same size as other data blocks or of a different size. In addition, the size of each data block may be a few bytes to megabytes of data.

Figure 19:
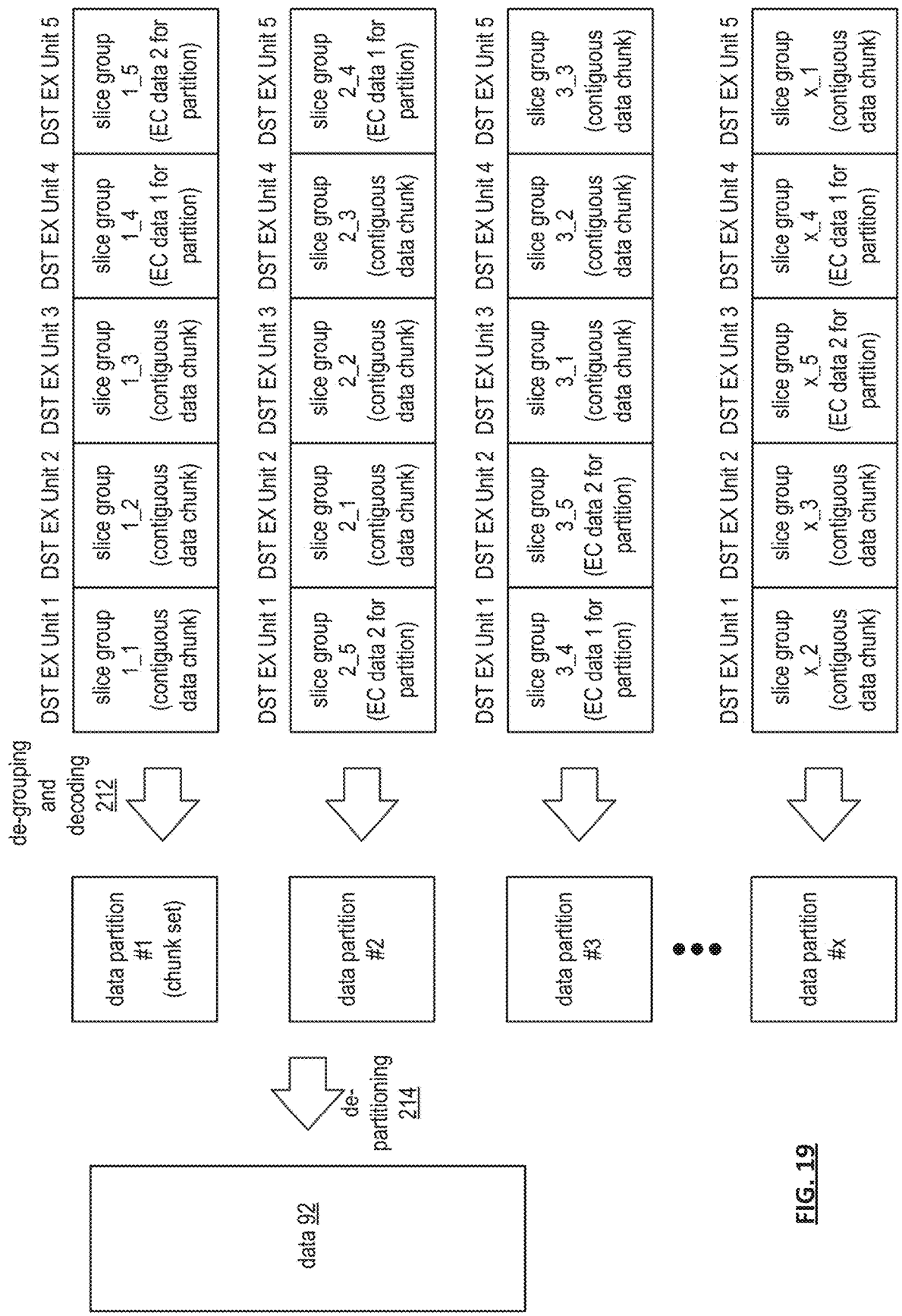
FIG. 19 is a diagram of an example of converting slice groups into data in accordance with the present invention.

FIG. 19 is a diagram of an example of converting slice groups into data 92 within an inbound distributed storage and task (DST) processing section. As shown, the data 92 is reconstructed from a plurality of data partitions (1-x, where x is an integer greater than 4). Each data partition (or chunk set of data) is decoded and re-grouped using a de-grouping and decoding function 212 and a de-partition function 214 from slice groupings as previously discussed. For a given data partition, the slice groupings (e.g., at least a decode threshold per data segment of encoded data slices) are received from DST execution units. From data partition to data partition, the ordering of the slice groupings received from the DST execution units may vary as discussed with reference to FIG. 10.

Figure 20:
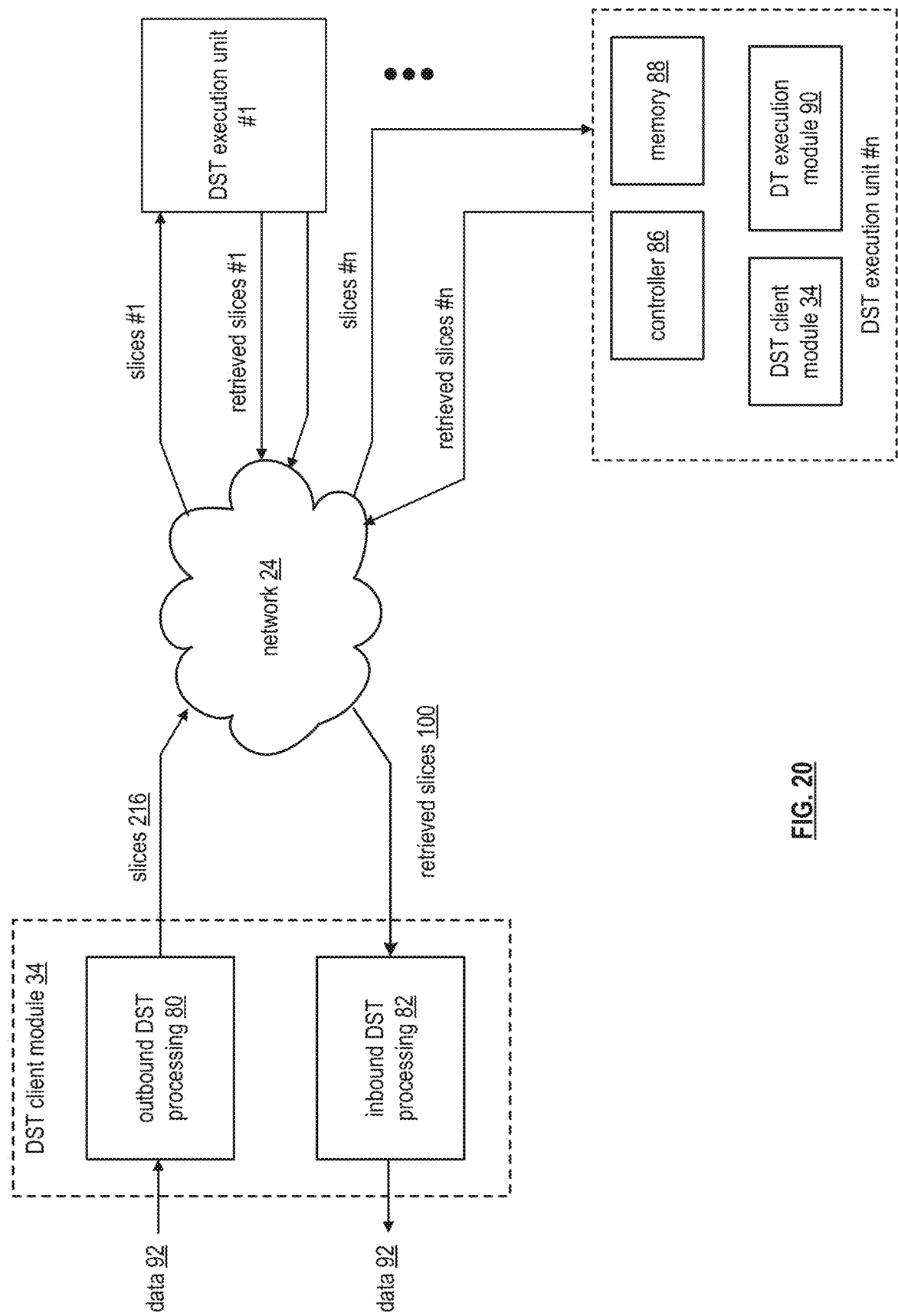
FIG. 20 is a diagram of an example of a distributed storage within the distributed computing system in accordance with the present invention.

FIG. 20 is a diagram of an example of a distributed storage and/or retrieval within the distributed computing system. The distributed computing system includes a plurality of distributed storage and/or task (DST) processing client modules 34 (one shown) coupled to a distributed storage and/or task processing network (DSTN) module, or multiple DSTN modules, via a network 24. The DST client module 34 includes an outbound DST processing section 80 and an inbound DST processing section 82. The DSTN module includes a plurality of DST execution units. Each DST execution unit includes a controller 86, memory 88, one or more distributed task (DT) execution modules 90, and a DST client module 34.

In an example of data storage, the DST client module 34 has data 92 that it desires to store in the DSTN module. The data 92 may be a file (e.g., video, audio, text, graphics, etc.), a data object, a data block, an update to a file, an update to a data block, etc. In this instance, the outbound DST processing module 80 converts the data 92 into encoded data slices 216 as will be further described with reference to FIGS. 21-23. The outbound DST processing module 80 sends, via the network 24, to the DST execution units for storage as further described with reference to FIG. 24.

In an example of data retrieval, the DST client module 34 issues a retrieve request to the DST execution units for the desired data 92. The retrieve request may address each DST executions units storing encoded data slices of the desired data, address a decode threshold number of DST execution units, address a read threshold number of DST execution units, or address some other number of DST execution units. In response to the request, each addressed DST execution unit retrieves its encoded data slices 100 of the desired data and sends them to the inbound DST processing section 82, via the network 24.

When, for each data segment, the inbound DST processing section 82 receives at least a decode threshold number of encoded data slices 100, it converts the encoded data slices 100 into a data segment. The inbound DST processing section 82 aggregates the data segments to produce the retrieved data 92.

Figure 21:
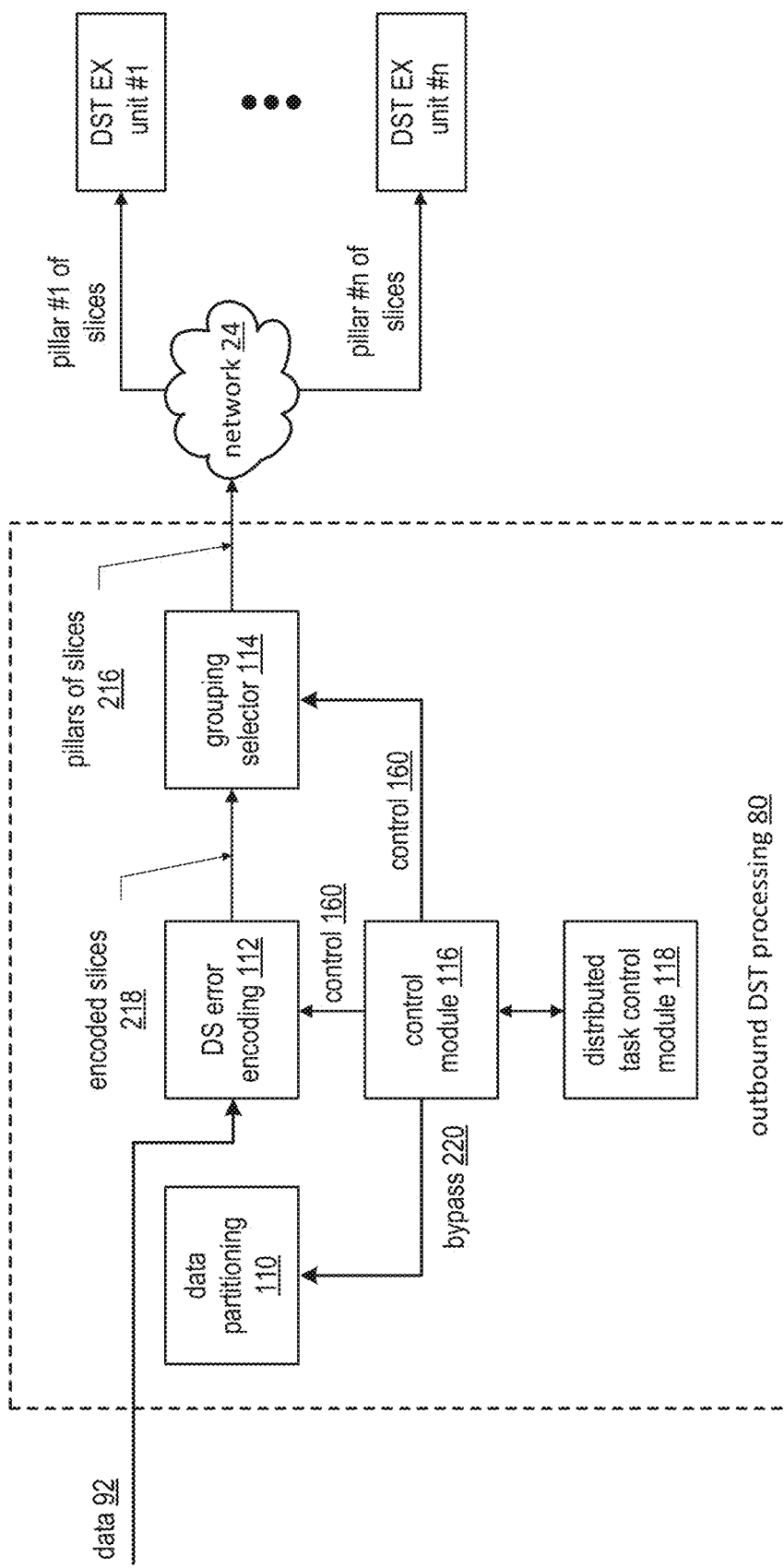
FIG. 21 is a schematic block diagram of an example of operation of outbound distributed storage and/or task (DST) processing for storing data in accordance with the present invention.

FIG. 21 is a schematic block diagram of an embodiment of an outbound distributed storage and/or task (DST) processing section 80 of a DST client module coupled to a distributed storage and task network (DSTN) module (e.g., a plurality of DST execution units) via a network 24. The outbound DST processing section 80 includes a data partitioning module 110, a dispersed storage (DS) error encoding module 112, a group selection module 114, a control module 116, and a distributed task control module 118.

In an example of operation, the data partitioning module 110 is by-passed such that data 92 is provided directly to the DS error encoding module 112. The control module 116 coordinates the by-passing of the data partitioning module 110 by outputting a bypass 220 message to the data partitioning module 110.

The DS error encoding module 112 receives the data 92 in a serial manner, a parallel manner, and/or a combination thereof. The DS error encoding module 112 DS error encodes the data in accordance with control information 160 from the control module 116 to produce encoded data slices 218. The DS error encoding includes segmenting the data 92 into data segments, segment security processing (e.g., encryption, compression, watermarking, integrity check (e.g., CRC, etc.)), error encoding, slicing, and/or per slice security processing (e.g., encryption, compression, watermarking, integrity check (e.g., CRC, etc.)). The control information 160 indicates which steps of the DS error encoding are active for the data 92 and, for active steps, indicates the parameters for the step. For example, the control information 160 indicates that the error encoding is active and includes error encoding parameters (e.g., pillar width, decode threshold, write threshold, read threshold, type of error encoding, etc.).

The group selecting module 114 groups the encoded slices 218 of the data segments into pillars of slices 216. The number of pillars corresponds to the pillar width of the DS error encoding parameters. In this example, the distributed task control module 118 facilitates the storage request.

Figure 22:
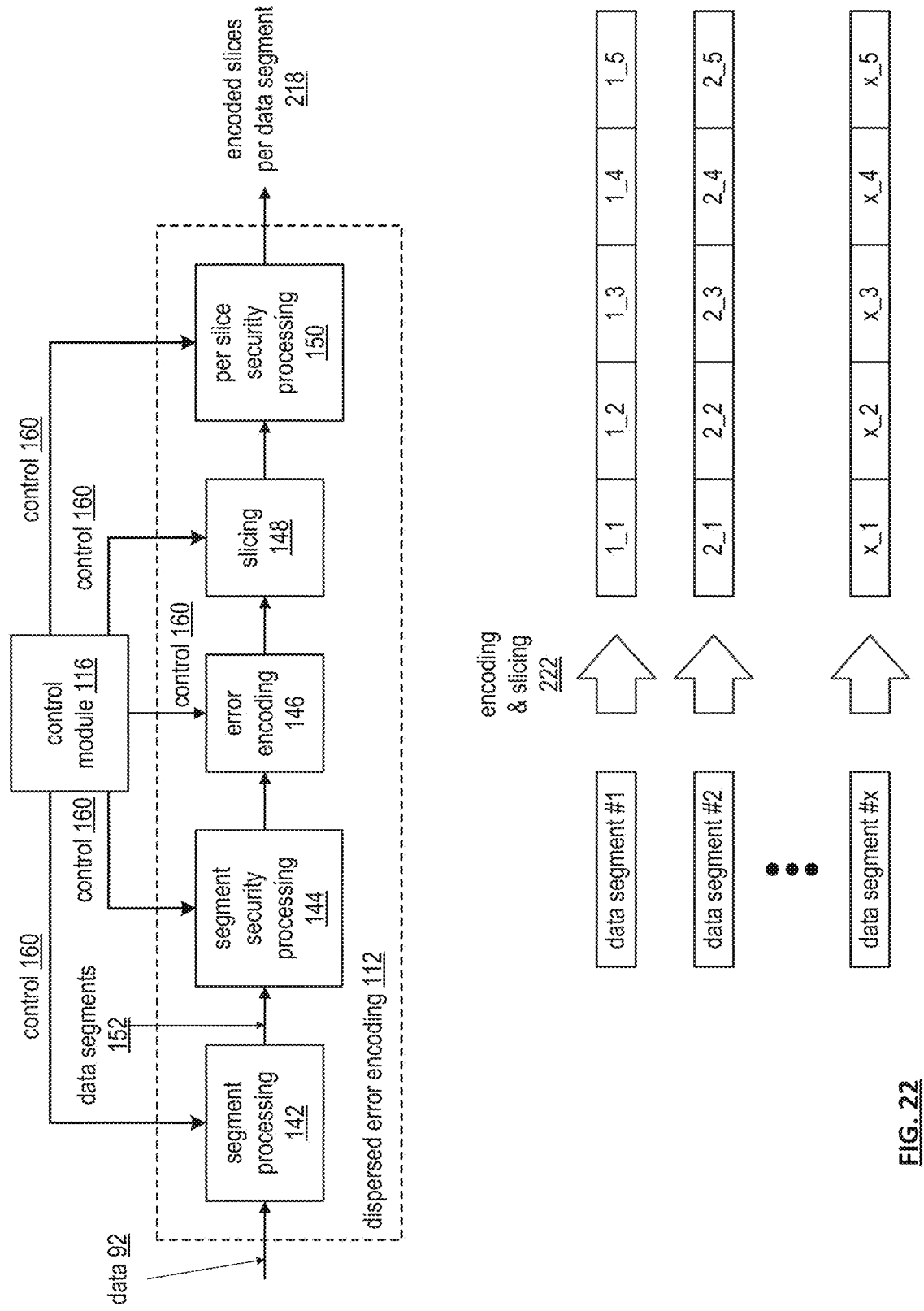
FIG. 22 is a schematic block diagram of an example of a dispersed error encoding for the example of FIG. 21 in accordance with the present invention.

FIG. 22 is a schematic block diagram of an example of a dispersed storage (DS) error encoding module 112 for the example of FIG. 21. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives data 92 and receives segmenting information as control information 160 from the control module 116. The segmenting information indicates how the segment processing module is to segment the data. For example, the segmenting information indicates the size of each data segment. The segment processing module 142 segments the data 92 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., CRC, etc.), and/or any other type of digital security. For example, when the segment security processing module 144 is enabled, it compresses a data segment 152, encrypts the compressed data segment, and generates a CRC value for the encrypted data segment to produce a secure data segment. When the segment security processing module 144 is not enabled, it passes the data segments 152 to the error encoding module 146 or is bypassed such that the data segments 152 are provided to the error encoding module 146.

The error encoding module 146 encodes the secure data segments in accordance with error correction encoding parameters received as control information 160 from the control module 116. The error correction encoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment to produce an encoded data segment.

The slicing module 148 slices the encoded data segment in accordance with a pillar width of the error correction encoding parameters. For example, if the pillar width is five, the slicing module slices an encoded data segment into a set of five encoded data slices. As such, for a plurality of data segments, the slicing module 148 outputs a plurality of sets of encoded data slices as shown within encoding and slicing function 222 as described.

The per slice security processing module 150, when enabled by the control module 116, secures each encoded data slice based on slice security information received as control information 160 from the control module 116. The slice security information includes data compression, encryption, watermarking, integrity check (e.g., CRC, etc.), and/or any other type of digital security. For example, when the per slice security processing module 150 is enabled, it may compress an encoded data slice, encrypt the compressed encoded data slice, and generate a CRC value for the encrypted encoded data slice to produce a secure encoded data slice tweaking. When the per slice security processing module 150 is not enabled, it passes the encoded data slices or is bypassed such that the encoded data slices 218 are the output of the DS error encoding module 112.

Figure 23:
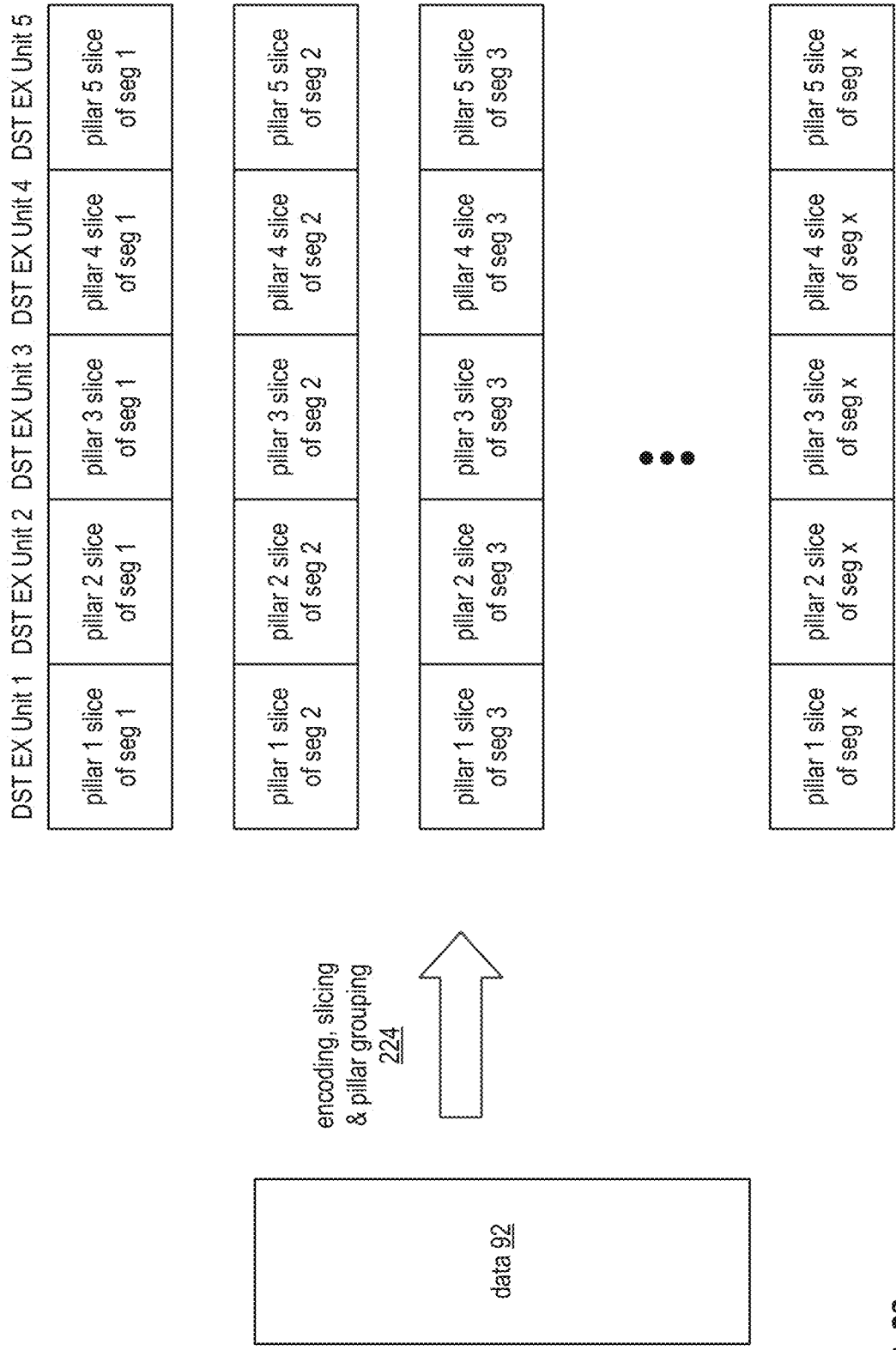
FIG. 23 is a diagram of an example of converting data into pillar slice groups for storage in accordance with the present invention.

FIG. 23 is a diagram of an example of converting data 92 into pillar slice groups utilizing encoding, slicing and pillar grouping function 224 for storage in memory of a distributed storage and task network (DSTN) module. As previously discussed the data 92 is encoded and sliced into a plurality of sets of encoded data slices; one set per data segment. The grouping selection module organizes the sets of encoded data slices into pillars of data slices. In this example, the DS error encoding parameters include a pillar width of 5 and a decode threshold of 3. As such, for each data segment, 5 encoded data slices are created.

The grouping selection module takes the first encoded data slice of each of the sets and forms a first pillar, which may be sent to the first DST execution unit. Similarly, the grouping selection module creates the second pillar from the second slices of the sets; the third pillar from the third slices of the sets; the fourth pillar from the fourth slices of the sets; and the fifth pillar from the fifth slices of the set.

FIG. 24 is a schematic block diagram of an embodiment of a distributed storage and/or task (DST) execution unit that includes an interface 169, a controller 86, memory 88, one or more distributed task (DT) execution modules 90, and a DST client module 34. A computing core 26 may be utilized to implement the one or more DT execution modules 90 and the DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a pillar of slices 216, the DST execution unit receives, via interface 169, a pillar of slices 216 (e.g., pillar #1 slices). The memory 88 stores the encoded data slices 216 of the pillar of slices in accordance with memory control information 174 it receives from the controller 86. The controller 86 (e.g., a processing module, a CPU, etc.) generates the memory control information 174 based on distributed storage information (e.g., user information (e.g., user ID, distributed storage permissions, data access permission, etc.), vault information (e.g., virtual memory assigned to user, user group, etc.), etc.). Similarly, when retrieving slices, the DST execution unit receives, via interface 169, a slice retrieval request. The memory 88 retrieves the slice in accordance with memory control information 174 it receives from the controller 86. The memory 88 outputs the slice 100, via the interface 169, to a requesting entity.

Figure 25:
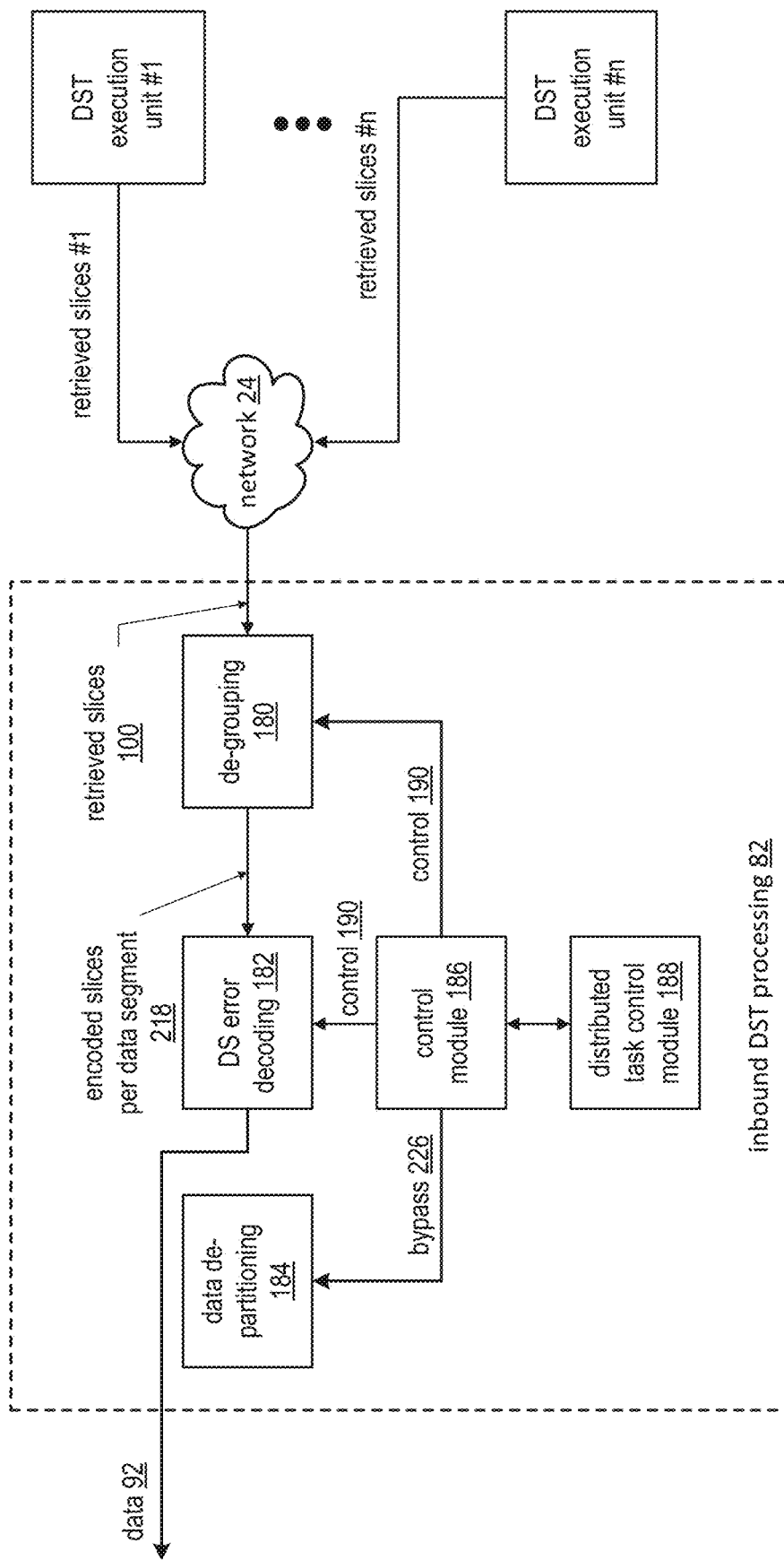
FIG. 25 is a schematic block diagram of an example of operation of inbound distributed storage and/or task (DST) processing for retrieving dispersed error encoded data in accordance with the present invention.

FIG. 25 is a schematic block diagram of an example of operation of an inbound distributed storage and/or task (DST) processing section 82 for retrieving dispersed error encoded data 92. The inbound DST processing section 82 includes a de-grouping module 180, a dispersed storage (DS) error decoding module 182, a data de-partitioning module 184, a control module 186, and a distributed task control module 188. Note that the control module 186 and/or the distributed task control module 188 may be separate modules from corresponding ones of an outbound DST processing section or may be the same modules.

In an example of operation, the inbound DST processing section 82 is retrieving stored data 92 from the DST execution units (i.e., the DSTN module). In this example, the DST execution units output encoded data slices corresponding to data retrieval requests from the distributed task control module 188. The de-grouping module 180 receives pillars of slices 100 and de-groups them in accordance with control information 190 from the control module 186 to produce sets of encoded data slices 218. The DS error decoding module 182 decodes, in accordance with the DS error encoding parameters received as control information 190 from the control module 186, each set of encoded data slices 218 to produce data segments, which are aggregated into retrieved data 92. The data de-partitioning module 184 is by-passed in this operational mode via a bypass signal 226 of control information 190 from the control module 186.

Figure 26:
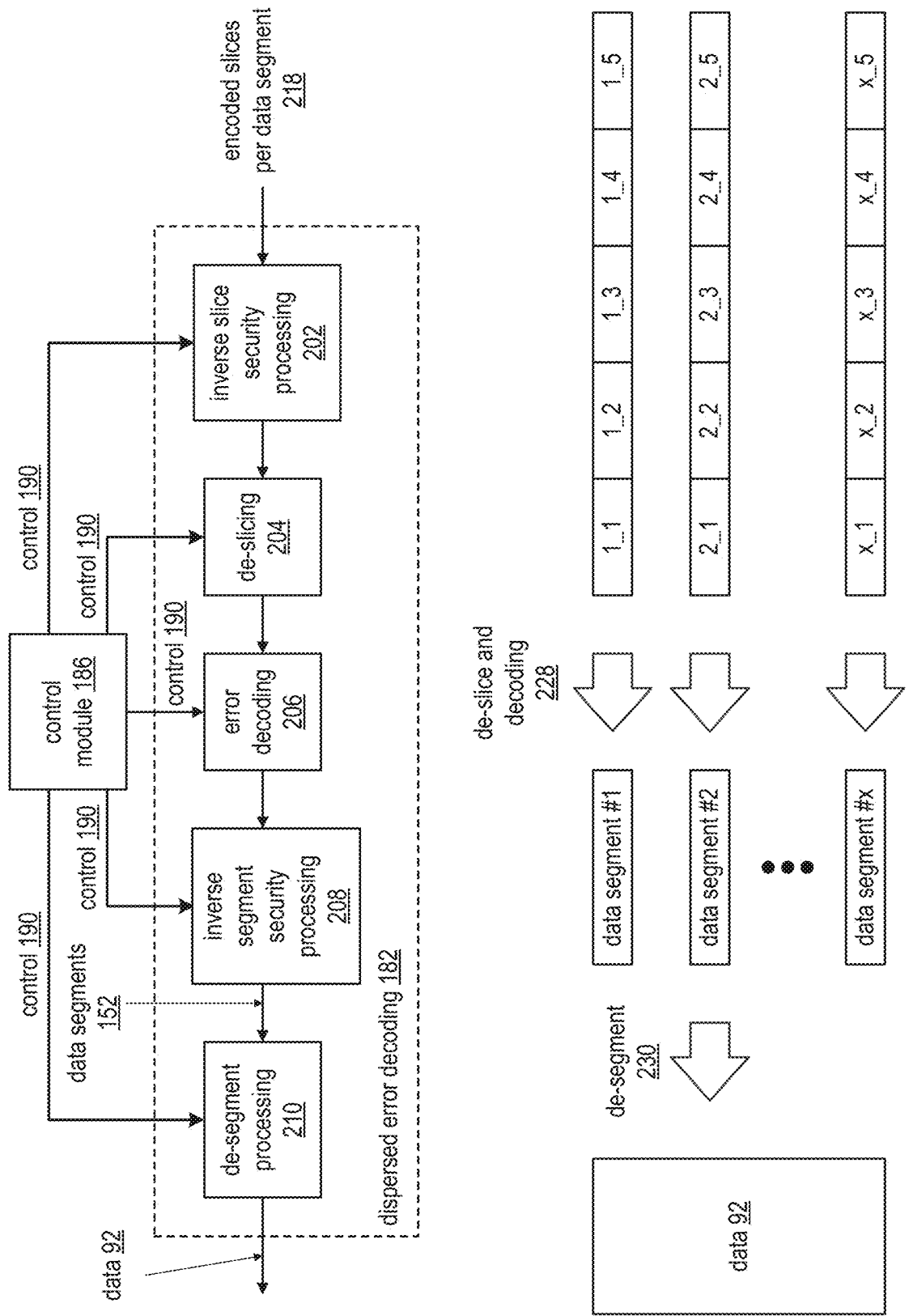
FIG. 26 is a schematic block diagram of an example of a dispersed error decoding for the example of FIG. 25 in accordance with the present invention.

FIG. 26 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, and a de-segmenting processing module 210. The dispersed error decoding module 182 is operable to de-slice and decode encoded slices per data segment 218 utilizing a de-slicing and decoding function 228 to produce a plurality of data segments that are de-segmented utilizing a de-segment function 230 to recover data 92.

In an example of operation, the inverse per slice security processing module 202, when enabled by the control module 186 via control information 190, unsecures each encoded data slice 218 based on slice de-security information (e.g., the compliment of the slice security information discussed with reference to FIG. 6) received as control information 190 from the control module 186. The slice de-security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 218, it decrypts each verified encoded data slice, and decompresses each decrypted encoded data slice to produce slice encoded data. When the inverse per slice security processing module 202 is not enabled, it passes the encoded data slices 218 as the sliced encoded data or is bypassed such that the retrieved encoded data slices 218 are provided as the sliced encoded data.

The de-slicing module 204 de-slices the sliced encoded data into encoded data segments in accordance with a pillar width of the error correction encoding parameters received as control information 190 from a control module 186. For example, if the pillar width is five, the de-slicing module de-slices a set of five encoded data slices into an encoded data segment. Alternatively, the encoded data segment may include just three encoded data slices (e.g., when the decode threshold is 3).

The error decoding module 206 decodes the encoded data segments in accordance with error correction decoding parameters received as control information 190 from the control module 186 to produce secure data segments. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments based on segment security information received as control information 190 from the control module 186. The segment security information includes data decompression, decryption, de-watermarking, integrity check (e.g., CRC, etc.) verification, and/or any other type of digital security. For example, when the inverse segment security processing module is enabled, it verifies integrity information (e.g., a CRC value) of each secure data segment, it decrypts each verified secured data segment, and decompresses each decrypted secure data segment to produce a data segment 152. When the inverse segment security processing module 208 is not enabled, it passes the decoded data segment 152 as the data segment or is bypassed. The de-segmenting processing module 210 aggregates the data segments 152 into the data 92 in accordance with control information 190 from the control module 186.

Figure 27:
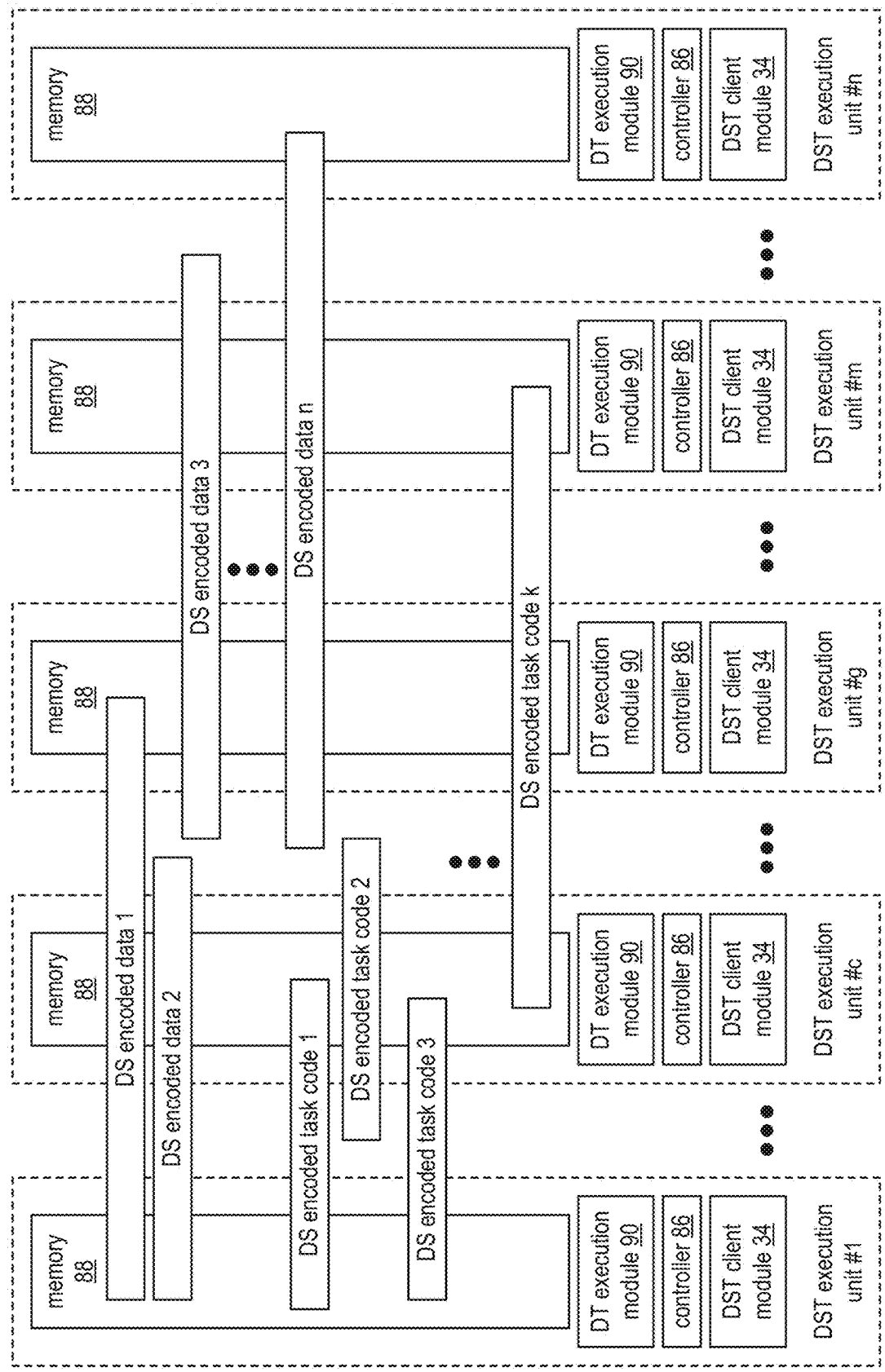
FIG. 27 is a schematic block diagram of an example of a distributed storage and task processing network (DSTN) module storing a plurality of data and a plurality of task codes in accordance with the present invention.

FIG. 27 is a schematic block diagram of an example of a distributed storage and task processing network (DSTN) module that includes a plurality of distributed storage and task (DST) execution units (#1 through #n, where, for example, n is an integer greater than or equal to three). Each of the DST execution units includes a DST client module 34, a controller 86, one or more DT (distributed task) execution modules 90, and memory 88.

In this example, the DSTN module stores, in the memory of the DST execution units, a plurality of DS (dispersed storage) encoded data (e.g., 1 through n, where n is an integer greater than or equal to two) and stores a plurality of DS encoded task codes (e.g., 1 through k, where k is an integer greater than or equal to two). The DS encoded data may be encoded in accordance with one or more examples described with reference to FIGS. 3-19 (e.g., organized in slice groupings) or encoded in accordance with one or more examples described with reference to FIGS. 20-26 (e.g., organized in pillar groups). The data that is encoded into the DS encoded data may be of any size and/or of any content. For example, the data may be one or more digital books, a copy of a company's emails, a large-scale Internet search, a video security file, one or more entertainment video files (e.g., television programs, movies, etc.), data files, and/or any other large amount of data (e.g., greater than a few Terra-Bytes).

The tasks that are encoded into the DS encoded task code may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. The tasks may be encoded into the DS encoded task code in accordance with one or more examples described with reference to FIGS. 3-19 (e.g., organized in slice groupings) or encoded in accordance with one or more examples described with reference to FIGS. 20-26 (e.g., organized in pillar groups).

In an example of operation, a DST client module of a user device or of a DST processing unit issues a DST request to the DSTN module. The DST request may include a request to retrieve stored data, or a portion thereof, may include a request to store data that is included with the DST request, may include a request to perform one or more tasks on stored data, may include a request to perform one or more tasks on data included with the DST request, etc. In the cases where the DST request includes a request to store data or to retrieve data, the client module and/or the DSTN module processes the request as previously discussed with reference to one or more of FIGS. 3-19 (e.g., slice groupings) and/or 20-26 (e.g., pillar groupings). In the case where the DST request includes a request to perform one or more tasks on data included with the DST request, the DST client module and/or the DSTN module process the DST request as previously discussed with reference to one or more of FIGS. 3-19.

In the case where the DST request includes a request to perform one or more tasks on stored data, the DST client module and/or the DSTN module processes the DST request as will be described with reference to one or more of FIGS. 28-39. In general, the DST client module identifies data and one or more tasks for the DSTN module to execute upon the identified data. The DST request may be for a one-time execution of the task or for an on-going execution of the task. As an example of the latter, as a company generates daily emails, the DST request may be to daily search new emails for inappropriate content and, if found, record the content, the email sender(s), the email recipient(s), email routing information, notify human resources of the identified email, etc.

Figure 28:
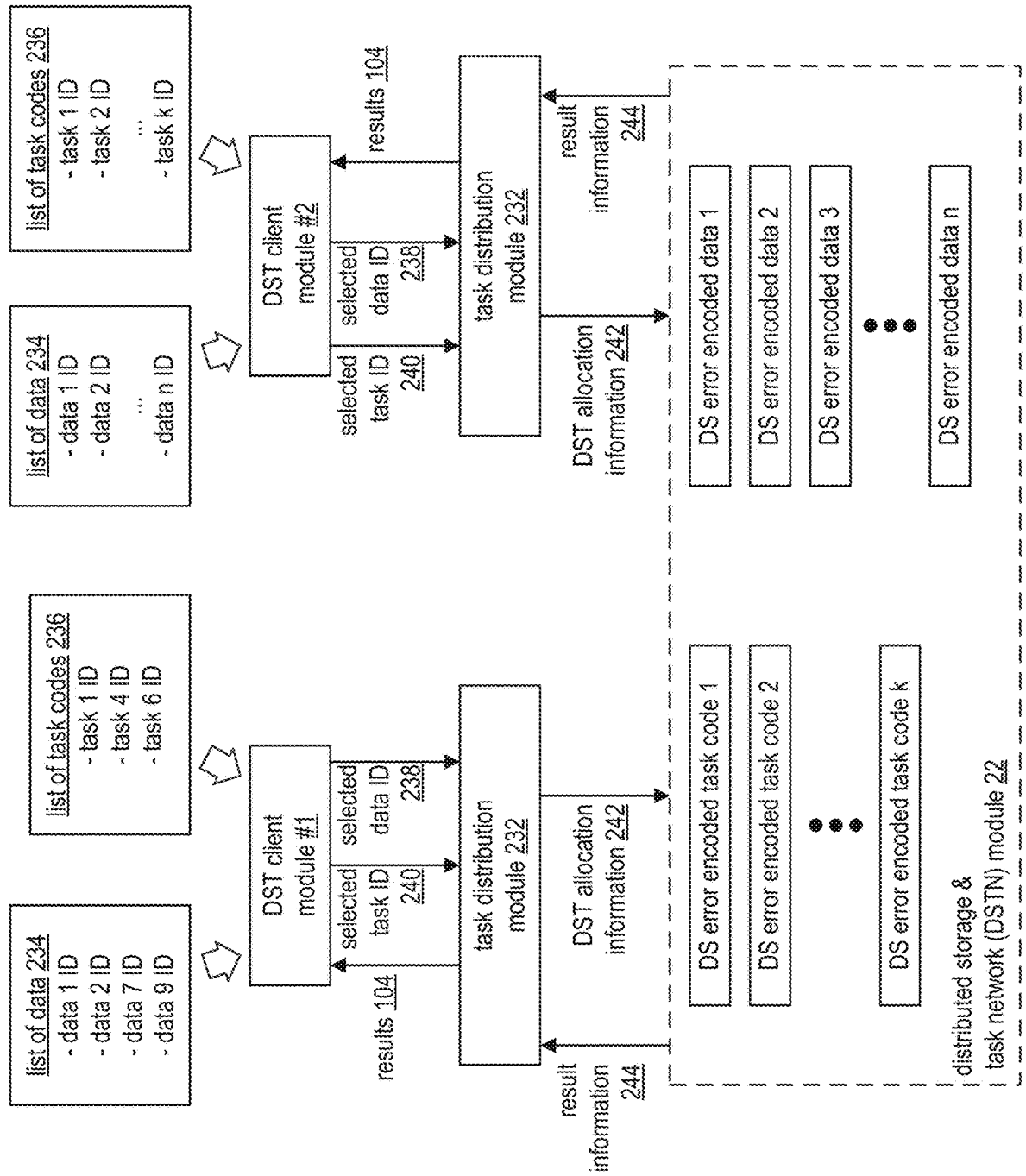
FIG. 28 is a schematic block diagram of an example of the distributed computing system performing tasks on stored data in accordance with the present invention.

FIG. 28 is a schematic block diagram of an example of a distributed computing system performing tasks on stored data. In this example, two distributed storage and task (DST) client modules 1-2 are shown: the first may be associated with a user device and the second may be associated with a DST processing unit or a high priority user device (e.g., high priority clearance user, system administrator, etc.). Each DST client module includes a list of stored data 234 and a list of tasks codes 236. The list of stored data 234 includes one or more entries of data identifying information, where each entry identifies data stored in the DSTN module 22. The data identifying information (e.g., data ID) includes one or more of a data file name, a data file directory listing, DSTN addressing information of the data, a data object identifier, etc. The list of tasks 236 includes one or more entries of task code identifying information, when each entry identifies task codes stored in the DSTN module 22. The task code identifying information (e.g., task ID) includes one or more of a task file name, a task file directory listing, DSTN addressing information of the task, another type of identifier to identify the task, etc.

As shown, the list of data 234 and the list of tasks 236 are each smaller in number of entries for the first DST client module than the corresponding lists of the second DST client module. This may occur because the user device associated with the first DST client module has fewer privileges in the distributed computing system than the device associated with the second DST client module. Alternatively, this may occur because the user device associated with the first DST client module serves fewer users than the device associated with the second DST client module and is restricted by the distributed computing system accordingly. As yet another alternative, this may occur through no restraints by the distributed computing system, it just occurred because the operator of the user device associated with the first DST client module has selected fewer data and/or fewer tasks than the operator of the device associated with the second DST client module.

In an example of operation, the first DST client module selects one or more data entries 238 and one or more tasks 240 from its respective lists (e.g., selected data ID and selected task ID). The first DST client module sends its selections to a task distribution module 232. The task distribution module 232 may be within a stand-alone device of the distributed computing system, may be within the user device that contains the first DST client module, or may be within the DSTN module 22.

Regardless of the task distributions modules location, it generates DST allocation information 242 from the selected task ID 240 and the selected data ID 238. The DST allocation information 242 includes data partitioning information, task execution information, and/or intermediate result information. The task distribution module 232 sends the DST allocation information 242 to the DSTN module 22. Note that one or more examples of the DST allocation information will be discussed with reference to one or more of FIGS. 29-39.

The DSTN module 22 interprets the DST allocation information 242 to identify the stored DS encoded data (e.g., DS error encoded data 2) and to identify the stored DS error encoded task code (e.g., DS error encoded task code 1). In addition, the DSTN module 22 interprets the DST allocation information 242 to determine how the data is to be partitioned and how the task is to be partitioned. The DSTN module 22 also determines whether the selected DS error encoded data 238 needs to be converted from pillar grouping to slice grouping. If so, the DSTN module 22 converts the selected DS error encoded data into slice groupings and stores the slice grouping DS error encoded data by overwriting the pillar grouping DS error encoded data or by storing it in a different location in the memory of the DSTN module 22 (i.e., does not overwrite the pillar grouping DS encoded data).

The DSTN module 22 partitions the data and the task as indicated in the DST allocation information 242 and sends the portions to selected DST execution units of the DSTN module 22. Each of the selected DST execution units performs its partial task(s) on its slice groupings to produce partial results. The DSTN module 22 collects the partial results from the selected DST execution units and provides them, as result information 244, to the task distribution module. The result information 244 may be the collected partial results, one or more final results as produced by the DSTN module 22 from processing the partial results in accordance with the DST allocation information 242, or one or more intermediate results as produced by the DSTN module 22 from processing the partial results in accordance with the DST allocation information 242.

The task distribution module 232 receives the result information 244 and provides one or more final results 104 therefrom to the first DST client module. The final result(s) 104 may be result information 244 or a result(s) of the task distribution module's processing of the result information 244.

In concurrence with processing the selected task of the first DST client module, the distributed computing system may process the selected task(s) of the second DST client module on the selected data(s) of the second DST client module. Alternatively, the distributed computing system may process the second DST client module's request subsequent to, or preceding, that of the first DST client module. Regardless of the ordering and/or parallel processing of the DST client module requests, the second DST client module provides its selected data 238 and selected task 240 to a task distribution module 232. If the task distribution module 232 is a separate device of the distributed computing system or within the DSTN module, the task distribution modules 232 coupled to the first and second DST client modules may be the same module. The task distribution module 232 processes the request of the second DST client module in a similar manner as it processed the request of the first DST client module.

Figure 29:
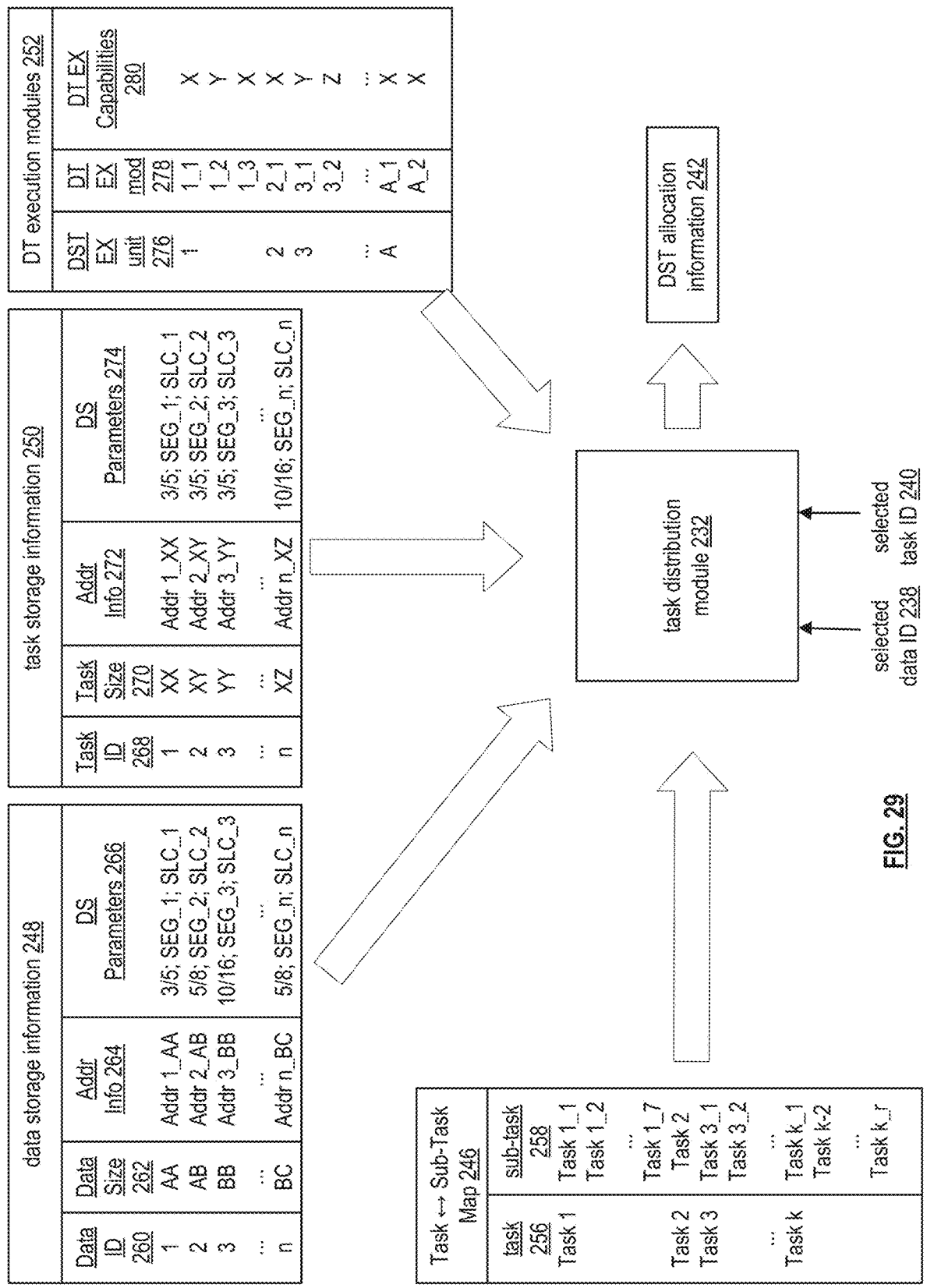
FIG. 29 is a schematic block diagram of an embodiment of a task distribution module facilitating the example of FIG. 28 in accordance with the present invention.

FIG. 29 is a schematic block diagram of an embodiment of a task distribution module 232 facilitating the example of FIG. 28. The task distribution module 232 includes a plurality of tables it uses to generate distributed storage and task (DST) allocation information 242 for selected data and selected tasks received from a DST client module. The tables include data storage information 248, task storage information 250, distributed task (DT) execution module information 252, and task ⇔ sub-task mapping information 246.

The data storage information table 248 includes a data identification (ID) field 260, a data size field 262, an addressing information field 264, distributed storage (DS) information 266, and may further include other information regarding the data, how it is stored, and/or how it can be processed. For example, DS encoded data #1 has a data ID of 1, a data size of AA (e.g., a byte size of a few terra-bytes or more), addressing information of Addr_1_AA, and DS parameters of ⅗; SEG_1; and SLC_1. In this example, the addressing information may be a virtual address corresponding to the virtual address of the first storage word (e.g., one or more bytes) of the data and information on how to calculate the other addresses, may be a range of virtual addresses for the storage words of the data, physical addresses of the first storage word or the storage words of the data, may be a list of slice names of the encoded data slices of the data, etc. The DS parameters may include identity of an error encoding scheme, decode threshold/pillar width (e.g., ⅗ for the first data entry), segment security information (e.g., SEG_1), per slice security information (e.g., SLC_1), and/or any other information regarding how the data was encoded into data slices.

The task storage information table 250 includes a task identification (ID) field 268, a task size field 270, an addressing information field 272, distributed storage (DS) information 274, and may further include other information regarding the task, how it is stored, and/or how it can be used to process data. For example, DS encoded task #2 has a task ID of 2, a task size of XY, addressing information of Addr_2_XY, and DS parameters of ⅗; SEG_2; and SLC_2. In this example, the addressing information may be a virtual address corresponding to the virtual address of the first storage word (e.g., one or more bytes) of the task and information on how to calculate the other addresses, may be a range of virtual addresses for the storage words of the task, physical addresses of the first storage word or the storage words of the task, may be a list of slices names of the encoded slices of the task code, etc. The DS parameters may include identity of an error encoding scheme, decode threshold/pillar width (e.g., ⅗ for the first data entry), segment security information (e.g., SEG_2), per slice security information (e.g., SLC_2), and/or any other information regarding how the task was encoded into encoded task slices. Note that the segment and/or the per-slice security information include a type of encryption (if enabled), a type of compression (if enabled), watermarking information (if enabled), and/or an integrity check scheme (if enabled).

The task ⇔ sub-task mapping information table 246 includes a task field 256 and a sub-task field 258. The task field 256 identifies a task stored in the memory of a distributed storage and task network (DSTN) module and the corresponding sub-task fields 258 indicates whether the task includes sub-tasks and, if so, how many and if any of the sub-tasks are ordered. In this example, the task ⇔ sub-task mapping information table 246 includes an entry for each task stored in memory of the DSTN module (e.g., task 1 through task k). In particular, this example indicates that task 1 includes 7 sub-tasks; task 2 does not include sub-tasks, and task k includes r number of sub-tasks (where r is an integer greater than or equal to two).

The DT execution module table 252 includes a DST execution unit ID field 276, a DT execution module ID field 278, and a DT execution module capabilities field 280. The DST execution unit ID field 276 includes the identity of DST units in the DSTN module. The DT execution module ID field 278 includes the identity of each DT execution unit in each DST unit. For example, DST unit 1 includes three DT executions modules (e.g., 1_1, 1_2, and 1_3). The DT execution capabilities field 280 includes identity of the capabilities of the corresponding DT execution unit. For example, DT execution module 1_1 includes capabilities X, where X includes one or more of MIPS capabilities, processing resources (e.g., quantity and capability of microprocessors, CPUs, digital signal processors, co-processor, microcontrollers, arithmetic logic circuitry, and/or and other analog and/or digital processing circuitry), availability of the processing resources, memory information (e.g., type, size, availability, etc.), and/or any information germane to executing one or more tasks.

From these tables, the task distribution module 232 generates the DST allocation information 242 to indicate where the data is stored, how to partition the data, where the task is stored, how to partition the task, which DT execution units should perform which partial task on which data partitions, where and how intermediate results are to be stored, etc. If multiple tasks are being performed on the same data or different data, the task distribution module factors such information into its generation of the DST allocation information.

Figure 30:
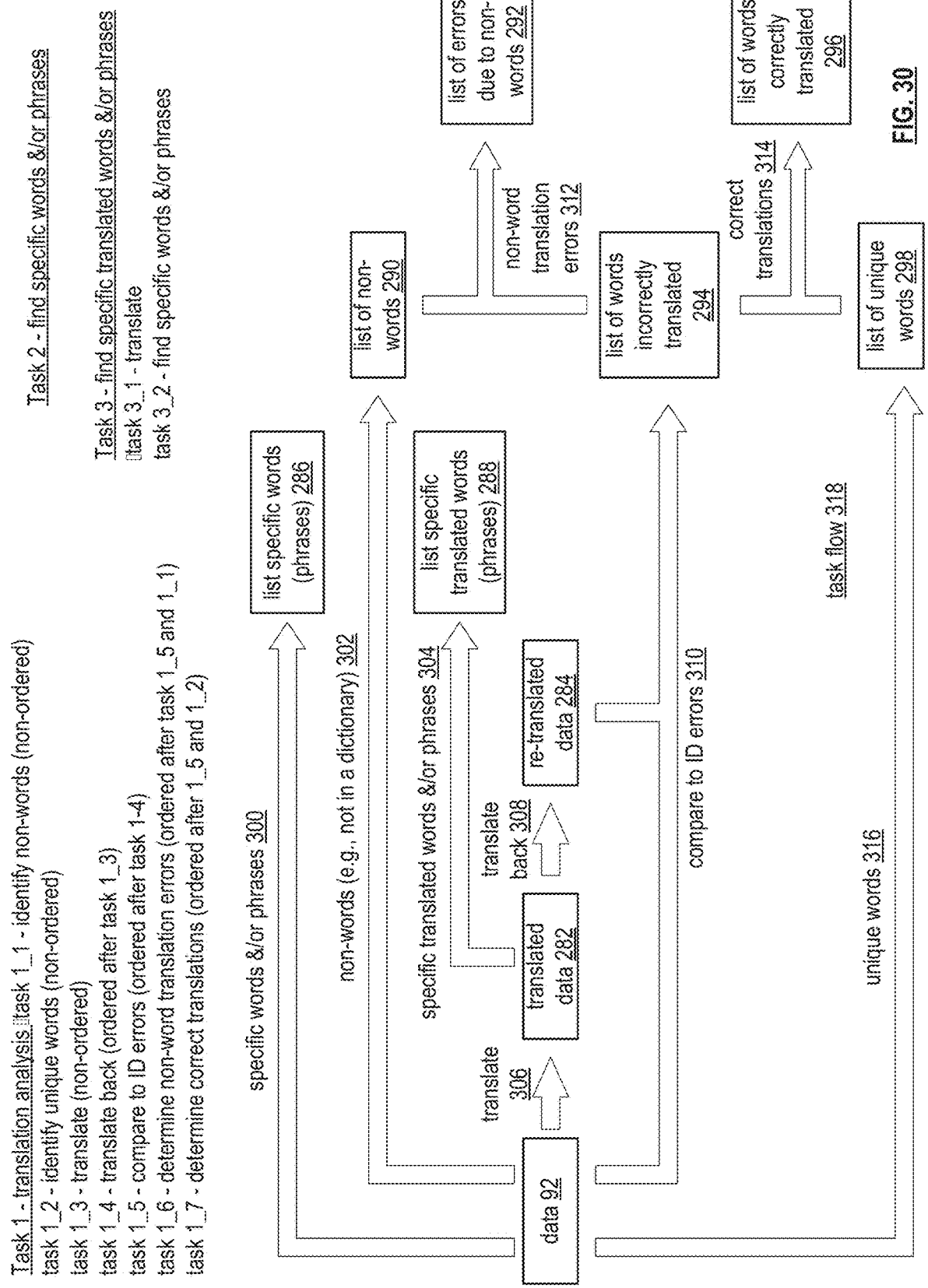
FIG. 30 is a diagram of a specific example of the distributed computing system performing tasks on stored data in accordance with the present invention.

FIG. 30 is a diagram of a specific example of a distributed computing system performing tasks on stored data as a task flow 318. In this example, selected data 92 is data 2 and selected tasks are tasks 1, 2, and 3. Task 1 corresponds to analyzing translation of data from one language to another (e.g., human language or computer language); task 2 corresponds to finding specific words and/or phrases in the data; and task 3 corresponds to finding specific translated words or/or phrases in translated data.

In this example, task 1 includes 7 sub-tasks: task 1_1—identify non-words (non-ordered); task 1_2—identify unique words (non-ordered); task 1_3—translate (non-ordered); task 1_4—translate back (ordered after task 1_3); task 1_5—compare to ID errors (ordered after task 1-4); task 1_6—determine non-word translation errors (ordered after task 1_5 and 1_1); and task 1_7—determine correct translations (ordered after 1_5 and 1_2). The sub-task further indicates whether they are an ordered task (i.e., are dependent on the outcome of another task) or non-order (i.e., are independent of the outcome of another task). Task 2 does not include sub-tasks and task 3 includes two sub-tasks: task 3_1 translate; and task 3_2 find specific word or phrase in translated data.

In general, the three tasks collectively are selected to analyze data for translation accuracies, translation errors, translation anomalies, occurrence of specific words or phrases in the data, and occurrence of specific words or phrases on the translated data. Graphically, the data 92 is translated 306 into translated data 282; is analyzed for specific words and/or phrases 300 to produce a list of specific words and/or phrases 286; is analyzed for non-words 302 (e.g., not in a reference dictionary) to produce a list of non-words 290; and is analyzed for unique words 316 included in the data 92 (i.e., how many different words are included in the data) to produce a list of unique words 298. Each of these tasks is independent of each other and can therefore be processed in parallel if desired.

The translated data 282 is analyzed (e.g., sub-task 3_2) for specific translated words and/or phrases 304 to produce a list of specific translated words and/or phrases. The translated data 282 is translated back 308 (e.g., sub-task 1_4) into the language of the original data to produce re-translated data 284. These two tasks are dependent on the translate task (e.g., task 1_3) and thus must be ordered after the translation task, which may be in a pipelined ordering or a serial ordering. The re-translated data 284 is then compared 310 with the original data 92 to find words and/or phrases that did not translate (one way and/or the other) properly to produce a list of incorrectly translated words 294. As such, the comparing task (e.g., sub-task 1_5) 310 is ordered after the translation 306 and re-translation tasks 308 (e.g., sub-tasks 1_3 and 1_4).

The list of words incorrectly translated 294 is compared 312 to the list of non-words 290 to identify words that were not properly translated because the words are non-words to produce a list of errors due to non-words 292. In addition, the list of words incorrectly translated 294 is compared 314 to the list of unique words 298 to identify unique words that were properly translated to produce a list of correctly translated words 296. The comparison may also identify unique words that were not properly translated to produce a list of unique words that were not properly translated. Note that each list of words (e.g., specific words and/or phrases, non-words, unique words, translated words and/or phrases, etc.,) may include the word and/or phrase, how many times it is used, where in the data it is used, and/or any other information requested regarding a word and/or phrase.

Figure 31:
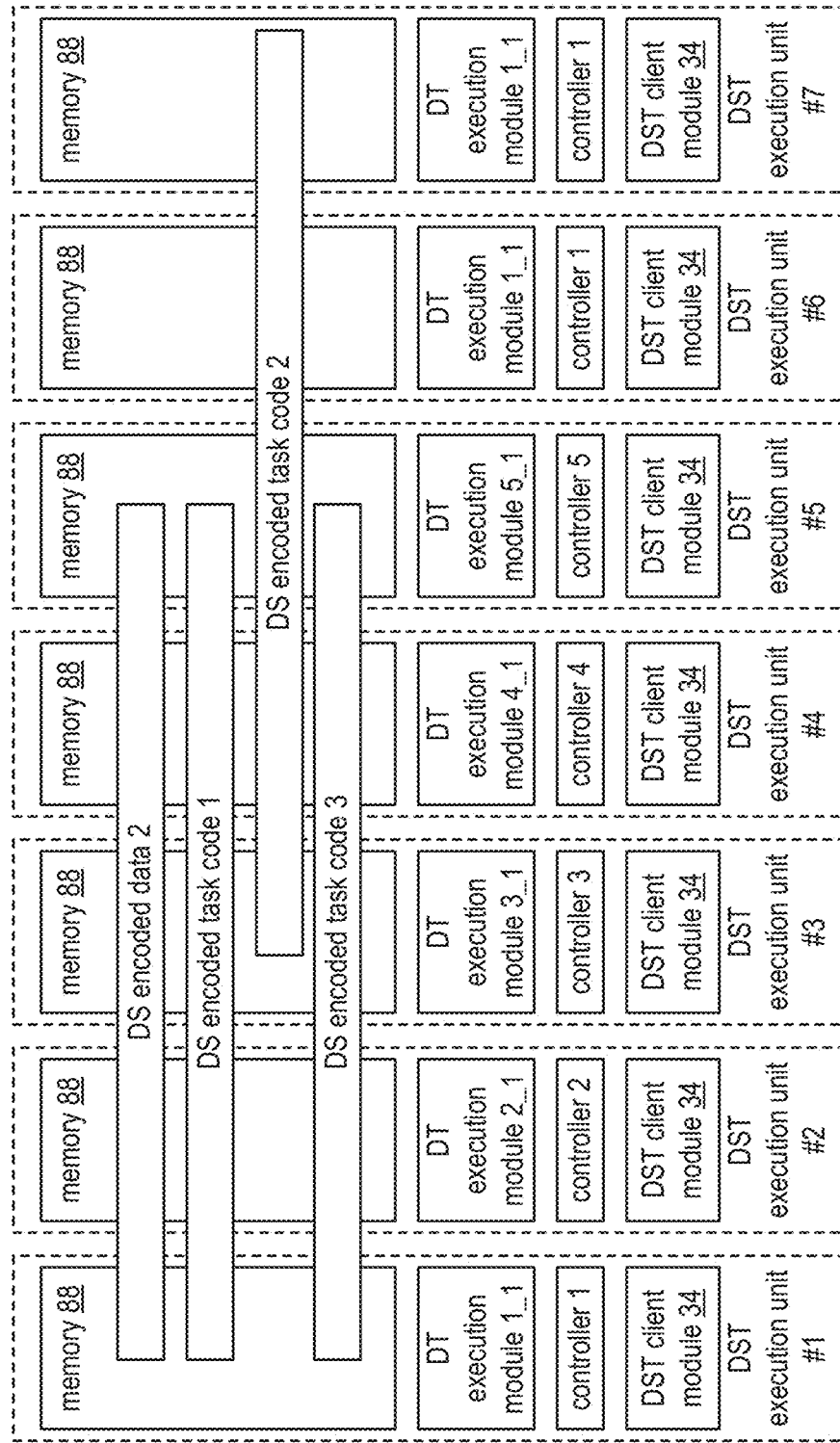
FIG. 31 is a schematic block diagram of an example of a distributed storage and task processing network (DSTN) module storing data and task codes for the example of FIG. 30 in accordance with the present invention.

FIG. 31 is a schematic block diagram of an example of a distributed storage and task processing network (DSTN) module storing data and task codes for the example of FIG. 30. As shown, DS encoded data 2 is stored as encoded data slices across the memory (e.g., stored in memories 88) of DST execution units 1-5; the DS encoded task code 1 (of task 1) and DS encoded task 3 are stored as encoded task slices across the memory of DST execution units 1-5; and DS encoded task code 2 (of task 2) is stored as encoded task slices across the memory of DST execution units 3-7. As indicated in the data storage information table and the task storage information table of FIG. 29, the respective data/task has DS parameters of ⅗ for their decode threshold/pillar width; hence spanning the memory of five DST execution units.

FIG. 32 is a diagram of an example of distributed storage and task (DST) allocation information 242 for the example of FIG. 30. The DST allocation information 242 includes data partitioning information 320, task execution information 322, and intermediate result information 324. The data partitioning information 320 includes the data identifier (ID), the number of partitions to split the data into, address information for each data partition, and whether the DS encoded data has to be transformed from pillar grouping to slice grouping. The task execution information 322 includes tabular information having a task identification field 326, a task ordering field 328, a data partition field ID 330, and a set of DT execution modules 332 to use for the distributed task processing per data partition. The intermediate result information 324 includes tabular information having a name ID field 334, an ID of the DST execution unit assigned to process the corresponding intermediate result 336, a scratch pad storage field 338, and an intermediate result storage field 340.

Continuing with the example of FIG. 30, where tasks 1-3 are to be distributedly performed on data 2, the data partitioning information includes the ID of data 2. In addition, the task distribution module determines whether the DS encoded data 2 is in the proper format for distributed computing (e.g., was stored as slice groupings). If not, the task distribution module indicates that the DS encoded data 2 format needs to be changed from the pillar grouping format to the slice grouping format, which will be done the by DSTN module. In addition, the task distribution module determines the number of partitions to divide the data into (e.g., 2_1 through 2_z) and addressing information for each partition.

The task distribution module generates an entry in the task execution information section for each sub-task to be performed. For example, task 1_1 (e.g., identify non-words on the data) has no task ordering (i.e., is independent of the results of other sub-tasks), is to be performed on data partitions 2_1 through 2_zby DT execution modules 1_1, 2_1, 3_1, 4_1, and 5_1. For instance, DT execution modules 1_1, 2_1, 3_1, 4_1, and 5_1 search for non-words in data partitions 2_1 through 2_zto produce task 1_1 intermediate results (R1-1, which is a list of non-words). Task 1_2 (e.g., identify unique words) has similar task execution information as task 1_1 to produce task 1_2 intermediate results (R1-2, which is the list of unique words).

Task 1_3 (e.g., translate) includes task execution information as being non-ordered (i.e., is independent), having DT execution modules 1_1, 2_1, 3_1, 4_1, and 5_1 translate data partitions 2_1 through 2_4 and having DT execution modules 1_2, 2_2, 3_2, 4_2, and 5_2 translate data partitions 2_5 through 2_zto produce task 1_3 intermediate results (R1-3, which is the translated data). In this example, the data partitions are grouped, where different sets of DT execution modules perform a distributed sub-task (or task) on each data partition group, which allows for further parallel processing.

Task 1_4 (e.g., translate back) is ordered after task 1_3 and is to be executed on task 1_3's intermediate result (e.g., R1-3_1) (e.g., the translated data). DT execution modules 1_1, 2_1, 3_1, 4_1, and 5_1 are allocated to translate back task 1_3 intermediate result partitions R1-3_1 through R1-3_4 and DT execution modules 1_2, 2_2, 6_1, 7_1, and 7_2 are allocated to translate back task 1_3 intermediate result partitions R1-3_5 through R1-3_z to produce task 1_4 intermediate results (R1-4, which is the translated back data).

Task 1_5 (e.g., compare data and translated data to identify translation errors) is ordered after task 1_4 and is to be executed on task 1_4's intermediate results (R4-1) and on the data. DT execution modules 1_1, 2_1, 3_1, 4_1, and 5_1 are allocated to compare the data partitions (2_1 through 2_z) with partitions of task 1-4 intermediate results partitions R1-4_1 through R1-4_z to produce task 1_5 intermediate results (R1-5, which is the list words translated incorrectly).

Task 1_6 (e.g., determine non-word translation errors) is ordered after tasks 1_1 and 1_5 and is to be executed on tasks 1_1's and 1_5's intermediate results (R1-1 and R1-5). DT execution modules 1_1, 2_1, 3_1, 4_1, and 5_1 are allocated to compare the partitions of task 1_1 intermediate results (R1-1_1 through R1-1_z) with partitions of task 1-5 intermediate results partitions (R1-5_1 through R1-5_z) to produce task 1_6 intermediate results (R1-6, which is the list translation errors due to non-words).

Task 1_7 (e.g., determine words correctly translated) is ordered after tasks 1_2 and 1_5 and is to be executed on tasks 1_2's and 1_5's intermediate results (R1-1 and R1-5). DT execution modules 1_2, 2_2, 3_2, 4_2, and 5_2 are allocated to compare the partitions of task 1_2 intermediate results (R1-2_1 through R1-2_z) with partitions of task 1-5 intermediate results partitions (R1-5_1 through R1-5_z) to produce task 1_7 intermediate results (R1-7, which is the list of correctly translated words).

Task 2 (e.g., find specific words and/or phrases) has no task ordering (i.e., is independent of the results of other sub-tasks), is to be performed on data partitions 2_1 through 2_zby DT execution modules 3_1, 4_1, 5_1, 6_1, and 7_1. For instance, DT execution modules 3_1, 4_1, 5_1, 6_1, and 7_1 search for specific words and/or phrases in data partitions 2_1 through 2_zto produce task 2 intermediate results (R2, which is a list of specific words and/or phrases).

Task 3_2 (e.g., find specific translated words and/or phrases) is ordered after task 1_3 (e.g., translate) is to be performed on partitions R1-3_1 through R1-3_z by DT execution modules 1_2, 2_2, 3_2, 4_2, and 5_2. For instance, DT execution modules 1_2, 2_2, 3_2, 4_2, and 5_2 search for specific translated words and/or phrases in the partitions of the translated data (R1-3_1 through R1-3_z) to produce task 3_2 intermediate results (R3-2, which is a list of specific translated words and/or phrases).

For each task, the intermediate result information indicates which DST unit is responsible for overseeing execution of the task and, if needed, processing the partial results generated by the set of allocated DT execution units. In addition, the intermediate result information indicates a scratch pad memory for the task and where the corresponding intermediate results are to be stored. For example, for intermediate result R1-1 (the intermediate result of task 1_1), DST unit 1 is responsible for overseeing execution of the task 1_1 and coordinates storage of the intermediate result as encoded intermediate result slices stored in memory of DST execution units 1-5. In general, the scratch pad is for storing non-DS encoded intermediate results and the intermediate result storage is for storing DS encoded intermediate results.

FIGS. 33-38 are schematic block diagrams of the distributed storage and task network (DSTN) module performing the example of FIG. 30. In FIG. 33, the DSTN module accesses the data 92 and partitions it into a plurality of partitions 1-z in accordance with distributed storage and task network (DST) allocation information. For each data partition, the DSTN identifies a set of its DT (distributed task) execution modules 90 to perform the task (e.g., identify non-words (i.e., not in a reference dictionary) within the data partition) in accordance with the DST allocation information. From data partition to data partition, the set of DT execution modules 90 may be the same, different, or a combination thereof (e.g., some data partitions use the same set while other data partitions use different sets).

For the first data partition, the first set of DT execution modules (e.g., 1_1, 2_1, 3_1, 4_1, and 5_1 per the DST allocation information of FIG. 32) executes task 1_1 to produce a first partial result 102 of non-words found in the first data partition. The second set of DT execution modules (e.g., 1_1, 2_1, 3_1, 4_1, and 5_1 per the DST allocation information of FIG. 32) executes task 1_1 to produce a second partial result 102 of non-words found in the second data partition. The sets of DT execution modules (as per the DST allocation information) perform task 1_1 on the data partitions until the "z" set of DT execution modules performs task 1_1 on the "zth" data partition to produce a "zth" partial result 102 of non-words found in the "zth" data partition.

As indicated in the DST allocation information of FIG. 32, DST execution unit 1 is assigned to process the first through "zth" partial results to produce the first intermediate result (R1-1), which is a list of non-words found in the data. For instance, each set of DT execution modules 90 stores its respective partial result in the scratchpad memory of DST execution unit 1 (which is identified in the DST allocation or may be determined by DST execution unit 1). A processing module of DST execution 1 is engaged to aggregate the first through "zth" partial results to produce the first intermediate result (e.g., R1_1). The processing module stores the first intermediate result as non-DS error encoded data in the scratchpad memory or in another section of memory of DST execution unit 1.

DST execution unit 1 engages its DST client module to slice grouping based DS error encode the first intermediate result (e.g., the list of non-words). To begin the encoding, the DST client module determines whether the list of non-words is of a sufficient size to partition (e.g., greater than a Terra-Byte). If yes, it partitions the first intermediate result (R1-1) into a plurality of partitions (e.g., R1-1_1 through R1-1_m). If the first intermediate result is not of sufficient size to partition, it is not partitioned.

For each partition of the first intermediate result, or for the first intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5).

In FIG. 34, the DSTN module is performing task 1_2 (e.g., find unique words) on the data 92. To begin, the DSTN module accesses the data 92 and partitions it into a plurality of partitions 1-z in accordance with the DST allocation information or it may use the data partitions of task 1_1 if the partitioning is the same. For each data partition, the DSTN identifies a set of its DT execution modules to perform task 1_2 in accordance with the DST allocation information. From data partition to data partition, the set of DT execution modules may be the same, different, or a combination thereof. For the data partitions, the allocated set of DT execution modules executes task 1_2 to produce a partial results (e.g., 1$^{st}$ through "zth") of unique words found in the data partitions.

As indicated in the DST allocation information of FIG. 32, DST execution unit 1 is assigned to process the first through "zth" partial results 102 of task 1_2 to produce the second intermediate result (R1-2), which is a list of unique words found in the data 92. The processing module of DST execution 1 is engaged to aggregate the first through "zth" partial results of unique words to produce the second intermediate result. The processing module stores the second intermediate result as non-DS error encoded data in the scratchpad memory or in another section of memory of DST execution unit 1.

DST execution unit 1 engages its DST client module to slice grouping based DS error encode the second intermediate result (e.g., the list of non-words). To begin the encoding, the DST client module determines whether the list of unique words is of a sufficient size to partition (e.g., greater than a Terra-Byte). If yes, it partitions the second intermediate result (R1-2) into a plurality of partitions (e.g., R1-2_1 through R1-2_m). If the second intermediate result is not of sufficient size to partition, it is not partitioned.

For each partition of the second intermediate result, or for the second intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5).

In FIG. 35, the DSTN module is performing task 1_3 (e.g., translate) on the data 92. To begin, the DSTN module accesses the data 92 and partitions it into a plurality of partitions 1-z in accordance with the DST allocation information or it may use the data partitions of task 1_1 if the partitioning is the same. For each data partition, the DSTN identifies a set of its DT execution modules to perform task 1_3 in accordance with the DST allocation information (e.g., DT execution modules 1_1, 2_1, 3_1, 4_1, and 5_1 translate data partitions 2_1 through 2_4 and DT execution modules 1_2, 2_2, 3_2, 4_2, and 5_2 translate data partitions 2_5 through 2_z). For the data partitions, the allocated set of DT execution modules 90 executes task 1_3 to produce partial results 102 (e.g., 1$^{st}$ through "zth") of translated data.

As indicated in the DST allocation information of FIG. 32, DST execution unit 2 is assigned to process the first through "zth" partial results of task 1_3 to produce the third intermediate result (R1-3), which is translated data. The processing module of DST execution 2 is engaged to aggregate the first through "zth" partial results of translated data to produce the third intermediate result. The processing module stores the third intermediate result as non-DS error encoded data in the scratchpad memory or in another section of memory of DST execution unit 2.

DST execution unit 2 engages its DST client module to slice grouping based DS error encode the third intermediate result (e.g., translated data). To begin the encoding, the DST client module partitions the third intermediate result (R1-3) into a plurality of partitions (e.g., R1-3_1 through R1-3_y). For each partition of the third intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 2-6 per the DST allocation information).

As is further shown in FIG. 35, the DSTN module is performing task 1_4 (e.g., retranslate) on the translated data of the third intermediate result. To begin, the DSTN module accesses the translated data (from the scratchpad memory or from the intermediate result memory and decodes it) and partitions it into a plurality of partitions in accordance with the DST allocation information. For each partition of the third intermediate result, the DSTN identifies a set of its DT execution modules 90 to perform task 1_4 in accordance with the DST allocation information (e.g., DT execution modules 1_1, 2_1, 3_1, 4_1, and 5_1 are allocated to translate back partitions R1-3_1 through R1-3_4 and DT execution modules 1_2, 2_2, 6_1, 7_1, and 7_2 are allocated to translate back partitions R1-3_5 through R1-3_z). For the partitions, the allocated set of DT execution modules executes task 1_4 to produce partial results 102 (e.g., 1$^{st}$ through "zth") of re-translated data.

As indicated in the DST allocation information of FIG. 32, DST execution unit 3 is assigned to process the first through "zth" partial results of task 1_4 to produce the fourth intermediate result (R1-4), which is retranslated data. The processing module of DST execution 3 is engaged to aggregate the first through "zth" partial results of retranslated data to produce the fourth intermediate result. The processing module stores the fourth intermediate result as non-DS error encoded data in the scratchpad memory or in another section of memory of DST execution unit 3.

DST execution unit 3 engages its DST client module to slice grouping based DS error encode the fourth intermediate result (e.g., retranslated data). To begin the encoding, the DST client module partitions the fourth intermediate result (R1-4) into a plurality of partitions (e.g., R1-4_1 through R1-4_z). For each partition of the fourth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

Figure 36:
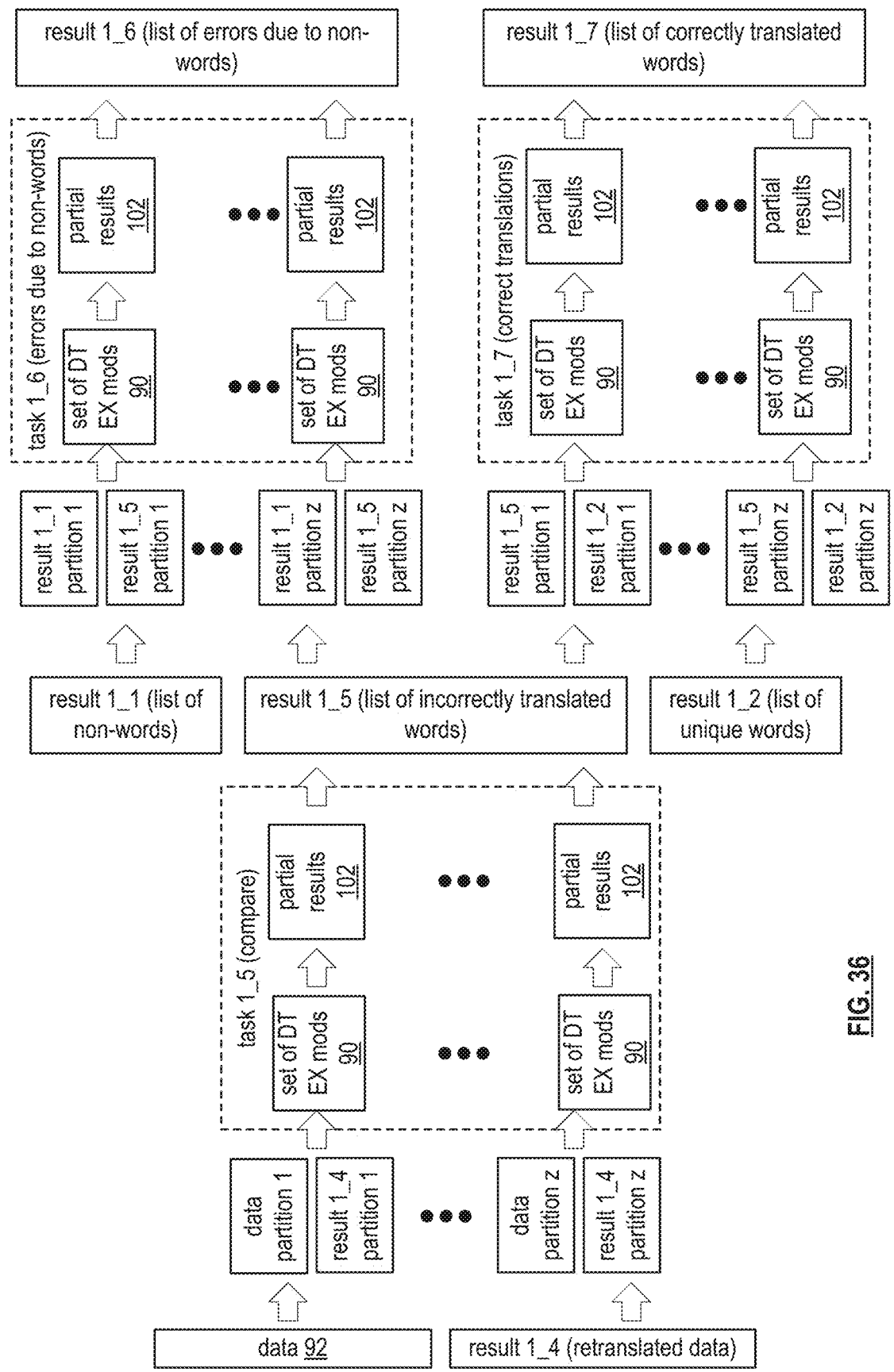

In FIG. 36, a distributed storage and task network (DSTN) module is performing task 1_5 (e.g., compare) on data 92 and retranslated data of FIG. 35. To begin, the DSTN module accesses the data 92 and partitions it into a plurality of partitions in accordance with the DST allocation information or it may use the data partitions of task 1_1 if the partitioning is the same. The DSTN module also accesses the retranslated data from the scratchpad memory, or from the intermediate result memory and decodes it, and partitions it into a plurality of partitions in accordance with the DST allocation information. The number of partitions of the retranslated data corresponds to the number of partitions of the data.

For each pair of partitions (e.g., data partition 1 and retranslated data partition 1), the DSTN identifies a set of its DT execution modules 90 to perform task 1_5 in accordance with the DST allocation information (e.g., DT execution modules 1_1, 2_1, 3_1, 4_1, and 5_1). For each pair of partitions, the allocated set of DT execution modules executes task 1_5 to produce partial results 102 (e.g., 1$^{st}$ through "zth") of a list of incorrectly translated words and/or phrases.

As indicated in the DST allocation information of FIG. 32, DST execution unit 1 is assigned to process the first through "zth" partial results of task 1_5 to produce the fifth intermediate result (R1-5), which is the list of incorrectly translated words and/or phrases. In particular, the processing module of DST execution 1 is engaged to aggregate the first through "zth" partial results of the list of incorrectly translated words and/or phrases to produce the fifth intermediate result. The processing module stores the fifth intermediate result as non-DS error encoded data in the scratchpad memory or in another section of memory of DST execution unit 1.

DST execution unit 1 engages its DST client module to slice grouping based DS error encode the fifth intermediate result. To begin the encoding, the DST client module partitions the fifth intermediate result (R1-5) into a plurality of partitions (e.g., R1-5_1 through R1-5_z). For each partition of the fifth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5 per the DST allocation information).

As is further shown in FIG. 36, the DSTN module is performing task 1_6 (e.g., translation errors due to non-words) on the list of incorrectly translated words and/or phrases (e.g., the fifth intermediate result R1-5) and the list of non-words (e.g., the first intermediate result R1-1). To begin, the DSTN module accesses the lists and partitions them into a corresponding number of partitions.

For each pair of partitions (e.g., partition R1-1_1 and partition R1-5_1), the DSTN identifies a set of its DT execution modules 90 to perform task 1_6 in accordance with the DST allocation information (e.g., DT execution modules 1_1, 2_1, 3_1, 4_1, and 5_1). For each pair of partitions, the allocated set of DT execution modules executes task 1_6 to produce partial results 102 (e.g., 1$^{st}$ through "zth") of a list of incorrectly translated words and/or phrases due to non-words.

As indicated in the DST allocation information of FIG. 32, DST execution unit 2 is assigned to process the first through "zth" partial results of task 1_6 to produce the sixth intermediate result (R1-6), which is the list of incorrectly translated words and/or phrases due to non-words. In particular, the processing module of DST execution 2 is engaged to aggregate the first through "zth" partial results of the list of incorrectly translated words and/or phrases due to non-words to produce the sixth intermediate result. The processing module stores the sixth intermediate result as non-DS error encoded data in the scratchpad memory or in another section of memory of DST execution unit 2.

DST execution unit 2 engages its DST client module to slice grouping based DS error encode the sixth intermediate result. To begin the encoding, the DST client module partitions the sixth intermediate result (R1-6) into a plurality of partitions (e.g., R1-6_1 through R1-6_z). For each partition of the sixth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 2-6 per the DST allocation information).

As is still further shown in FIG. 36, the DSTN module is performing task 1_7 (e.g., correctly translated words and/or phrases) on the list of incorrectly translated words and/or phrases (e.g., the fifth intermediate result R1-5) and the list of unique words (e.g., the second intermediate result R1-2). To begin, the DSTN module accesses the lists and partitions them into a corresponding number of partitions.

For each pair of partitions (e.g., partition R1-2_1 and partition R1-5_1), the DSTN identifies a set of its DT execution modules 90 to perform task 1_7 in accordance with the DST allocation information (e.g., DT execution modules 1_2, 2_2, 3_2, 4_2, and 5_2). For each pair of partitions, the allocated set of DT execution modules executes task 1_7 to produce partial results 102 (e.g., 1$^{st}$ through "zth") of a list of correctly translated words and/or phrases.

As indicated in the DST allocation information of FIG. 32, DST execution unit 3 is assigned to process the first through "zth" partial results of task 1_7 to produce the seventh intermediate result (R1-7), which is the list of correctly translated words and/or phrases. In particular, the processing module of DST execution 3 is engaged to aggregate the first through "zth" partial results of the list of correctly translated words and/or phrases to produce the seventh intermediate result. The processing module stores the seventh intermediate result as non-DS error encoded data in the scratchpad memory or in another section of memory of DST execution unit 3.

DST execution unit 3 engages its DST client module to slice grouping based DS error encode the seventh intermediate result. To begin the encoding, the DST client module partitions the seventh intermediate result (R1-7) into a plurality of partitions (e.g., R1-7_1 through R1-7_z). For each partition of the seventh intermediate result, the DST client module uses the DS error encoding parameters of the data (e.g., DS parameters of data 2, which includes ⅗ decode threshold/pillar width ratio) to produce slice groupings. The slice groupings are stored in the intermediate result memory (e.g., allocated memory in the memories of DST execution units 3-7 per the DST allocation information).

In FIG. 37, the distributed storage and task network (DSTN) module is performing task 2 (e.g., find specific words and/or phrases) on the data 92. To begin, the DSTN module accesses the data and partitions it into a plurality of partitions 1-z in accordance with the DST allocation information or it may use the data partitions of task 1_1 if the partitioning is the same. For each data partition, the DSTN identifies a set of its DT execution modules 90 to perform task 2 in accordance with the DST allocation information. From data partition to data partition, the set of DT execution modules may be the same, different, or a combination thereof. For the data partitions, the allocated set of DT execution modules executes task 2 to produce partial results 102 (e.g., 1$^{st}$ through "zth") of specific words and/or phrases found in the data partitions.

As indicated in the DST allocation information of FIG. 32, DST execution unit 7 is assigned to process the first through "zth" partial results of task 2 to produce task 2 intermediate result (R2), which is a list of specific words and/or phrases found in the data. The processing module of DST execution 7 is engaged to aggregate the first through "zth" partial results of specific words and/or phrases to produce the task 2 intermediate result. The processing module stores the task 2 intermediate result as non-DS error encoded data in the scratchpad memory or in another section of memory of DST execution unit 7.

DST execution unit 7 engages its DST client module to slice grouping based DS error encode the task 2 intermediate result. To begin the encoding, the DST client module determines whether the list of specific words and/or phrases is of a sufficient size to partition (e.g., greater than a Terra-Byte). If yes, it partitions the task 2 intermediate result (R2) into a plurality of partitions (e.g., R2_1 through R2_m). If the task 2 intermediate result is not of sufficient size to partition, it is not partitioned.

For each partition of the task 2 intermediate result, or for the task 2 intermediate results, the DST client module uses the DS error encoding parameters of the data (e.g., DS parameters of data 2, which includes ⅗ decode threshold/pillar width ratio) to produce slice groupings. The slice groupings are stored in the intermediate result memory (e.g., allocated memory in the memories of DST execution units 1-4, and 7).

In FIG. 38, the distributed storage and task network (DSTN) module is performing task 3 (e.g., find specific translated words and/or phrases) on the translated data (R1-3). To begin, the DSTN module accesses the translated data (from the scratchpad memory or from the intermediate result memory and decodes it) and partitions it into a plurality of partitions in accordance with the DST allocation information. For each partition, the DSTN identifies a set of its DT execution modules to perform task 3 in accordance with the DST allocation information. From partition to partition, the set of DT execution modules may be the same, different, or a combination thereof. For the partitions, the allocated set of DT execution modules 90 executes task 3 to produce partial results 102 (e.g., 1$^{st}$ through "zth") of specific translated words and/or phrases found in the data partitions.

As indicated in the DST allocation information of FIG. 32, DST execution unit 5 is assigned to process the first through "zth" partial results of task 3 to produce task 3 intermediate result (R3), which is a list of specific translated words and/or phrases found in the translated data. In particular, the processing module of DST execution 5 is engaged to aggregate the first through "zth" partial results of specific translated words and/or phrases to produce the task 3 intermediate result. The processing module stores the task 3 intermediate result as non-DS error encoded data in the scratchpad memory or in another section of memory of DST execution unit 7.

DST execution unit 5 engages its DST client module to slice grouping based DS error encode the task 3 intermediate result. To begin the encoding, the DST client module determines whether the list of specific translated words and/or phrases is of a sufficient size to partition (e.g., greater than a Terra-Byte). If yes, it partitions the task 3 intermediate result (R3) into a plurality of partitions (e.g., R3_1 through R3_m). If the task 3 intermediate result is not of sufficient size to partition, it is not partitioned.

For each partition of the task 3 intermediate result, or for the task 3 intermediate results, the DST client module uses the DS error encoding parameters of the data (e.g., DS parameters of data 2, which includes ⅗ decode threshold/pillar width ratio) to produce slice groupings. The slice groupings are stored in the intermediate result memory (e.g., allocated memory in the memories of DST execution units 1-4, 5, and 7).

FIG. 39 is a diagram of an example of combining result information into final results 104 for the example of FIG. 30. In this example, the result information includes the list of specific words and/or phrases found in the data (task 2 intermediate result), the list of specific translated words and/or phrases found in the data (task 3 intermediate result), the list of non-words found in the data (task 1 first intermediate result R1-1), the list of unique words found in the data (task 1 second intermediate result R1-2), the list of translation errors due to non-words (task 1 sixth intermediate result R1-6), and the list of correctly translated words and/or phrases (task 1 seventh intermediate result R1-7). The task distribution module provides the result information to the requesting DST client module as the results 104.

Referring next to FIGS. 9 and 10, various embodiments for de-duplicating data in a distributed storage system will be discussed. In some embodiments, a requester submits a stream of data to a distributed storage (DS) processing unit. The DS processing unit segments the stream into segments of a certain size, which may be determined as a preferred segment size for a group of processing units storing data to the same de-dupe system. If security is required, then convergent all or nothing transformation (AONT) or convergent encryption can be applied to the individual segments prior to slicing. This enables deduplication between data streams containing at least one contiguous segment worth of identical data. De-duplication may be performed either as an intermediate step prior to storage on ds units, or the ds units themselves may perform the de-duplication by checking whether or not data having the same "data tag" exists for the segment (or for the slices). When a DS unit receives a slice for which the data tag is already known, instead of storing the slice it stores a reference to where the unique copy of the slice exists within the de-duped system. For security purposes, knowledge of the data tag may be sufficient to access the given data. This enables one ds unit to access the de-duped data on another ds unit, even if the ds unit would not otherwise have access.

Figure 40A:
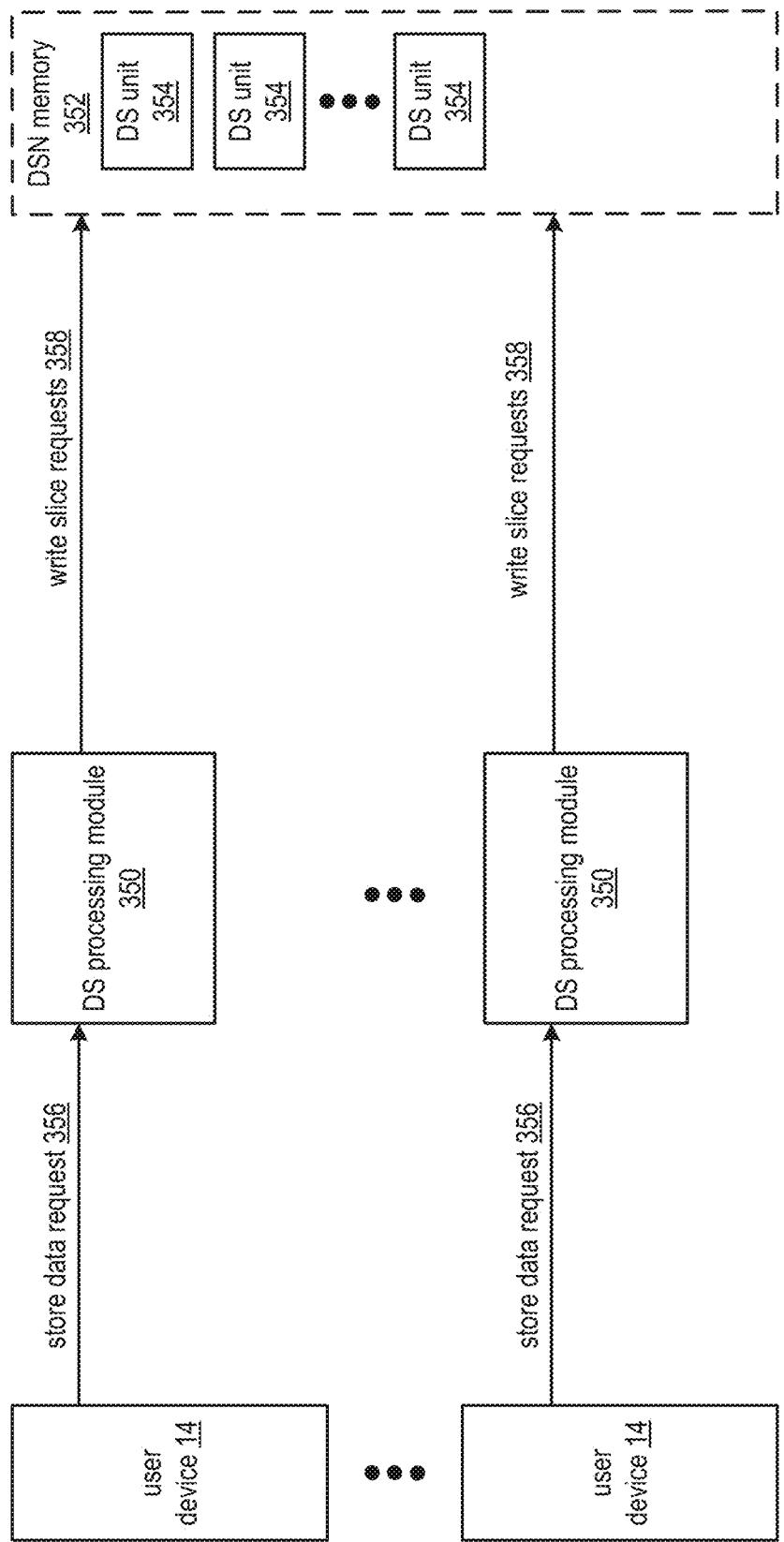
FIG. 40A is a schematic block diagram of an embodiment of a dispersed storage system in accordance with the present invention.

FIG. 40A is a schematic block diagram of an embodiment of a dispersed storage system that includes a plurality of user devices 14 of FIG. 1, a plurality of dispersed storage (DS) processing modules 350, and a dispersed storage network (DSN) memory 352. The DSN memory 352 includes a plurality of DS units 354. The DS units 354 may be organized into one or more sets of DS units 354. Each DS unit 354 of the one or more sets of DS units may be implemented utilizing one or more of a storage node, a dispersed storage unit, the distributed storage and task (DST) execution unit 36 of FIG. 1, a storage server, a storage unit, a storage module, a memory device, a memory, a user device, a DST processing unit, and a DST processing module. Each DS processing module 350 of the plurality of DS processing modules may be implemented by at least one of a server, a computer, a DS unit, a user device, a processing module, a DS processing unit, a DST processing module, and the DST processing unit 16 of FIG. 1.

The system functions to store data in the DSN memory 352 in accordance with a data de-duplication approach. In an example of operation of the data de-duplication approach, a first user device 14 issues a first store data request 356 to a first DS processing module 350 to store data in the DSN memory 352, where the first store data request 356 includes the data and a data identifier (ID) of one or more data IDs associated with the data. As an example of utilization of another data ID, a second user device 14 sends a second store data request 356 to a second DS processing module 350, where the second store data request 356 includes other data (e.g., that is identical to the data from the first user device 14) and another data ID associated with the other data.

Having received the first store data request 356 from the first user device 14, the first DS processing module 350 partitions the data to produce a plurality of data segments in accordance with a data segmentation approach. For a data segment of the plurality of data segments, the first DS processing module 350 encrypts the data segment to produce an encrypted data segment utilizing at least one of convergent encryption or convergent all or nothing transformation (AONT) encryption. Alternatively, or in addition to, the first DS processing module 350 selects one of the convergent encryption and the convergent AONT encryption based on one or more of a security requirement, a retrieval requirement, a performance requirement, a lookup, a query, receiving an indicator, and a predetermination. When utilizing convergent encryption, the first DS processing module 350 applies a deterministic function to the data segment to generate a deterministic key and stores metadata associated with the data segment that includes the deterministic key. The storing may include encrypting the deterministic key using a public key of the first user device 14. The storing may further include storing the metadata in at least one of a local memory of the first DS processing module 350, a local memory of the first user device 14, and in the DSN memory 352 as a set of encoded metadata slices.

When storing the metadata in the DSN memory 352, the first DS processing module 350 encodes the metadata using a dispersed storage error coding function to produce the set of encoded metadata slices, generates a set of slice names associated with metadata of the data ID, generates a set of write slice requests that includes the set of encoded metadata slices and the set of slice names, and outputs the set of write slice requests to the DSN memory 352. When utilizing convergent AONT encryption, the first DS processing module 350 generates a random key, performs a deterministic function on the encrypted data to produce a digest, masks the random key using the digest to produce a masked key, and appends the masked key to the encrypted data to produce a secure package as an updated encrypted data segment.

The first DS processing module 350 generates a data tag based on the data segment. The generating includes at least one of applying a deterministic function to the data segment and applying the deterministic function to the encrypted data segment. The deterministic function may include at least one of a hashing function, a hash-based message authentication code (HMAC) function, a mask generating function (MGF), and a sponge function. The first DS processing module 350 encodes the encrypted data segment using the dispersed storage error coding function to produce a set of encoded data slices. The first DS processing module 350 generates a set of slice names for the set of encoded data slices to correspond to one or more of the data ID, the data tag, a user device ID, and a vault ID associated with the user device. For example, the first DS processing module 350 generates a source name based on a vault ID associated with the user device and generates the set of slice names to include the source name in accordance with dispersed storage error coding parameters. The first DS processing module 350 generates a set of write slice requests 358 that includes the set of encoded data slices, the data tag, and the set of slice names. The first DS processing module 350 outputs the set of write slice requests 358 to a set of DS units 354 of the DSN memory 352.

For each DS unit 354 of the set of DS units 354, the DS unit 354 receives a corresponding write slice request 358 of the set of write slice requests and determines whether a received encoded data slice is duplicated within the DSN memory 352 based on the data tag of the write slice request 358. The determining may be based on one or more of comparing the data tag to a data tag list associated with the DSN memory 352, initiating a query, generating another data tag for an encoded data slice that was not previously associated with a data tag, and receiving a query result.

When the DS unit 354 determines that the encoded data slice is not duplicated within the DSN memory 352, the DS unit 354 stores the encoded data slice locally, stores metadata locally (e.g., including a local storage location associated with storage of the encoded data slice), and updates the data tag list associated with the DSN memory 352 to include a location indicator for the encoded data slice corresponding to the data tag and slice name associated with the encoded data slice. When the DS unit 354 determines that the encoded data slice is duplicated within the DSN memory 352, the DS unit 354 stores the metadata locally, where the metadata includes another storage location associated with storage of another encoded data slice that is a duplicate of the received encoded data slice.

An example of retrieval of the data, a retrieving user device 14 must have previously stored the data such that metadata is stored associated with a data ID used by the retrieving user device and recovery of the deterministic key requires decrypting the deterministic key recovered from the metadata using a private key associated with the user device. In an example of operation when the retrieving user device has not previously stored the data, the data is only recoverable when the data was stored utilizing the convergent AONT encryption approach since the random key is recovered by de-appending a recovered secure package.

Figure 40B:
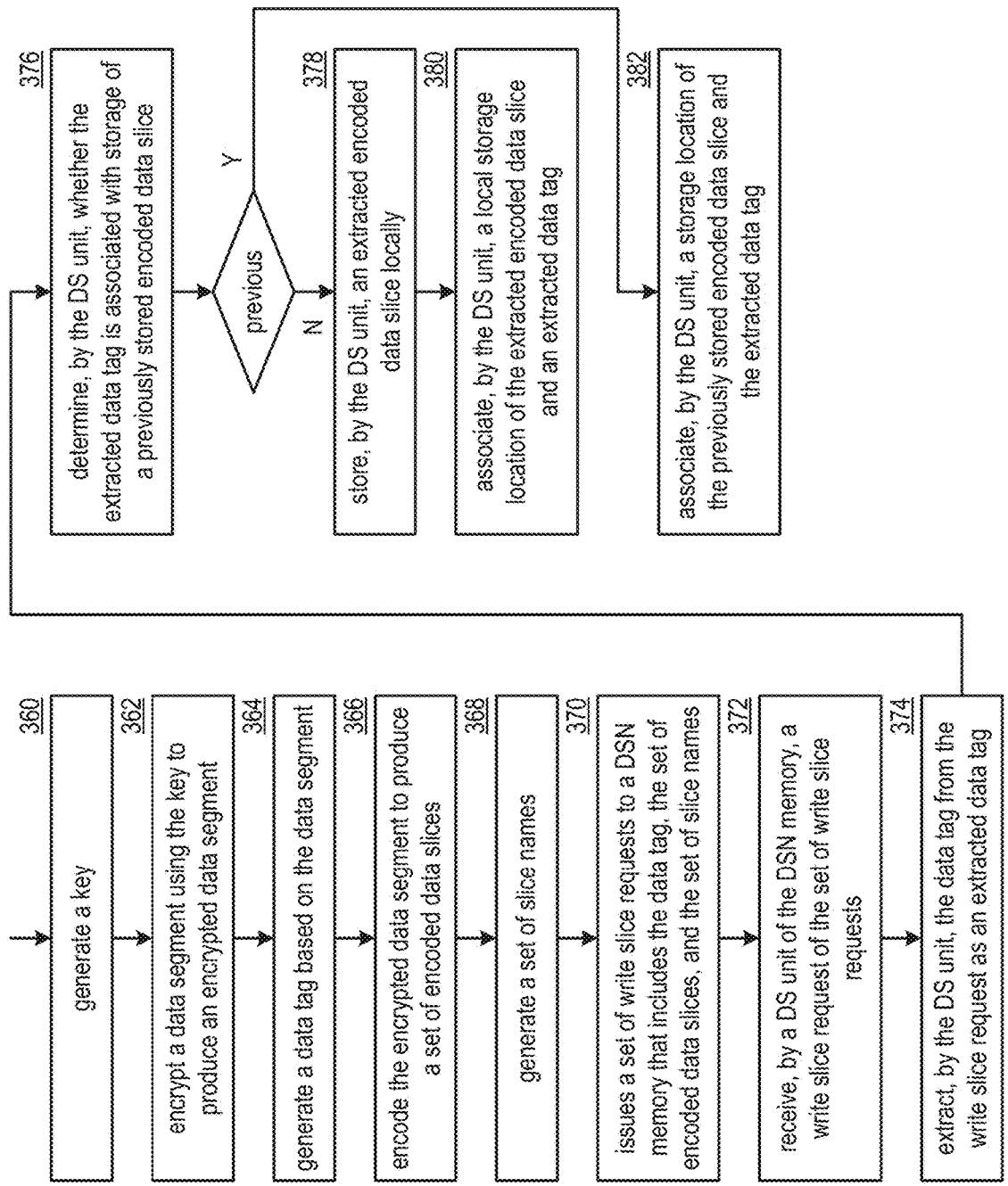
FIG. 40B is a flowchart illustrating an example of storing data in accordance with the present invention.

FIG. 40B is a flowchart illustrating an example of storing data. The method begins at step 360 where a processing module (e.g., of a dispersed storage processing module) generates a key. The generating includes at least one of performing a deterministic function on data for storage to produce the key and generating a random key when utilizing an all or nothing transformation (AONT) approach for storing the key in a subsequent step. The method continues at step 362 where the processing module encrypts a data segment of the data using the key to produce an encrypted data segment. The method continues at step 364 where the processing module generates a data tag based on the data segment. The generating includes performing a deterministic function on one or more of the key and the encrypted data segment. The method continues at step 366 where the processing module encodes the encrypted data segment using a dispersed storage error coding function to produce a set of encoded data slices.

The encoding may further include obfuscating the key to produce at least one of an encrypted key and a masked key. When producing the encrypted key, the processing module encrypts the key with a public key associated with a requesting entity to produce the encrypted key. When producing the master key, the processing module performs a deterministic function on the encrypted data segment to produce a digest, masks the key using the digest (e.g., performing an exclusive OR function on the key and the digest) to produce the masked key which is appended to the encrypted data segment. The method continues at step 368 where the processing module generates a set of slice names. The generating may be based on one or more of a data identifier of the data, a vault identifier, a user device identifier, and the data tag.

The method continues at step 370 where the processing module issues a set of write slice requests to a dispersed storage network (DSN) memory that includes the data tag, the set of encoded data slices, and a set of slice names. When not utilizing the AONT approach, the processing module stores the encrypted key in the DSN memory as metadata associated with the data (e.g., issues a set of write slice requests to the DSN memory that includes a set of encrypted key slices generated by encoding the encrypted key using the dispersed storage error coding function).

The method continues at step 372 where a dispersed storage (DS) unit of the DSN memory receives a write slice request of the set of write slice requests. The method continues at step 374 where the DS unit extracts the data tag from the write slice request as an extracted data tag. The method continues at step 376 where the DS unit determines whether the extracted data tag is associated with storage of a previously stored encoded data slice. The determining includes one or more of comparing the extracted data tag to a data tag list, initiating a query, and accessing a hierarchical dispersed index that includes a plurality of data tags associated with a plurality of data IDs and DSN storage location addresses. The method branches to step 382 when the extracted data tag is associated with storage of the previously stored encoded data slice. The method continues to step 378 when the extracted data tag is not associated with storage of the previously stored encoded data slice.

The method continues at step 378 where the DS unit stores an extracted encoded data slice locally when the extracted data tag is not associated with storage of the previously stored encoded data slice. The storing may further include storing metadata associated with the extracted encoded data slice when the metadata is received with the write slice request. The method continues at step 380 where the DS unit associates a local storage location of the extracted encoded data slice and an extracted data tag. The associating includes storing association information locally and outputting the association information to other DS units of the DSN memory. The method continues at step 382 where the DS unit associates a storage location of the previously stored encoded data slice and the extracted data tag when the extracted data tag is associated with storage of the previously stored encoded data slice. The associating includes storing association information locally.

Figure 41:
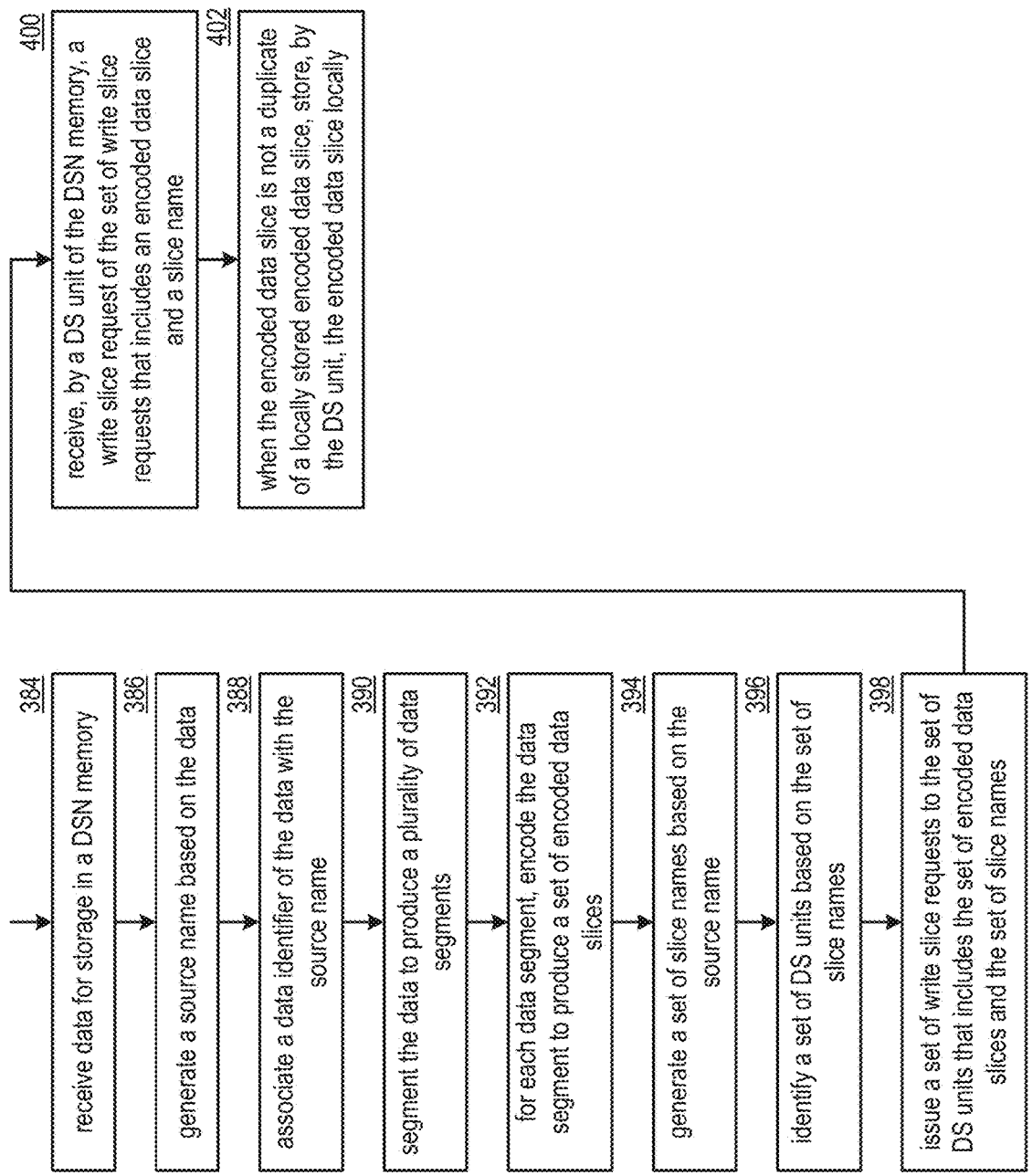
FIG. 41 is a flowchart illustrating another example of storing data in accordance with the present invention.

FIG. 41 is a flowchart illustrating another example of storing data. The method begins at step 384 where a processing module (e.g., of a dispersed storage processing module) receives data for storage in a dispersed storage network (DSN) memory. In addition, the processing module may receive one or more of a data identifier of the data, a data size indicator, a data type indicator, a requesting entity identifier, a vault identifier, and a source name associated with the data. The method continues at step 386 where the processing module generates a source name based on the data. The generating includes performing a deterministic function on a portion of the data to produce an object number utilized within an object number field of the source name. The source name includes the object number field, a vault ID field, and a generation field. The method continues at step 388 where the processing module associates the data identifier of the data with the source name. The associating includes updating one or more of an entry of a dispersed hierarchical index, a directory, and a list, to include the source name and the data ID. The dispersed hierarchical index includes a plurality of index nodes arranged in a virtual pyramid from a root node down to leaf nodes, where each node includes links to neighboring nodes and an index key value utilized when searching the dispersed hierarchical index for a particular entry. The leaf nodes include one or more DSN addresses (e.g., source names, slice names) of data objects stored in the DSN memory.

The method continues at step 390 where the processing module divides the data to produce a plurality of data segments in accordance with a data segmentation approach (e.g., fixed segment size, verbal segment sizes). The method continues at step 392 where the processing module, for each data segment, encodes the data segment using a dispersed storage error coding function to produce a set of encoded data slices.

The method continues at step 394 where the processing module generates a set of slice names based on the source name and a segment number of the data segment, where each slice name includes a corresponding pillar index field entry, the source name, and the segment number. The method continues at step 396 where the processing module identifies a set of dispersed storage (DS) units based on the set of slice names. The identifying includes at least one of a lookup based on a slice name address range of the set of slices, a query, and receiving DS unit identity information. The method continues at step 398 where the processing module issues a set of write slice requests to the set of DS units that includes the set of encoded data slices in the set of slice names. The issuing includes generating the set of write slice requests and outputting the set of write slice requests to the set of DS units.

The method continues at step 400 where a DS unit of the DSN memory receives a write slice request of the set of write slice requests that includes an encoded data slice and a slice name. When the encoded data slice is not a duplicate of a locally stored encoded data slice, the method continues at step 402 where the DS unit stores the encoded data slice locally. The storing includes determining whether the encoded data slice is substantially the same as a locally stored encoded data slice (e.g., referencing a list, performing a comparison, initiating a query, receiving the response). The storing further includes storing metadata associated with the encoded data slice when the metadata is received and storing a slice name and a local storage location associated with storage of the encoded data slice.

Figure 42A:
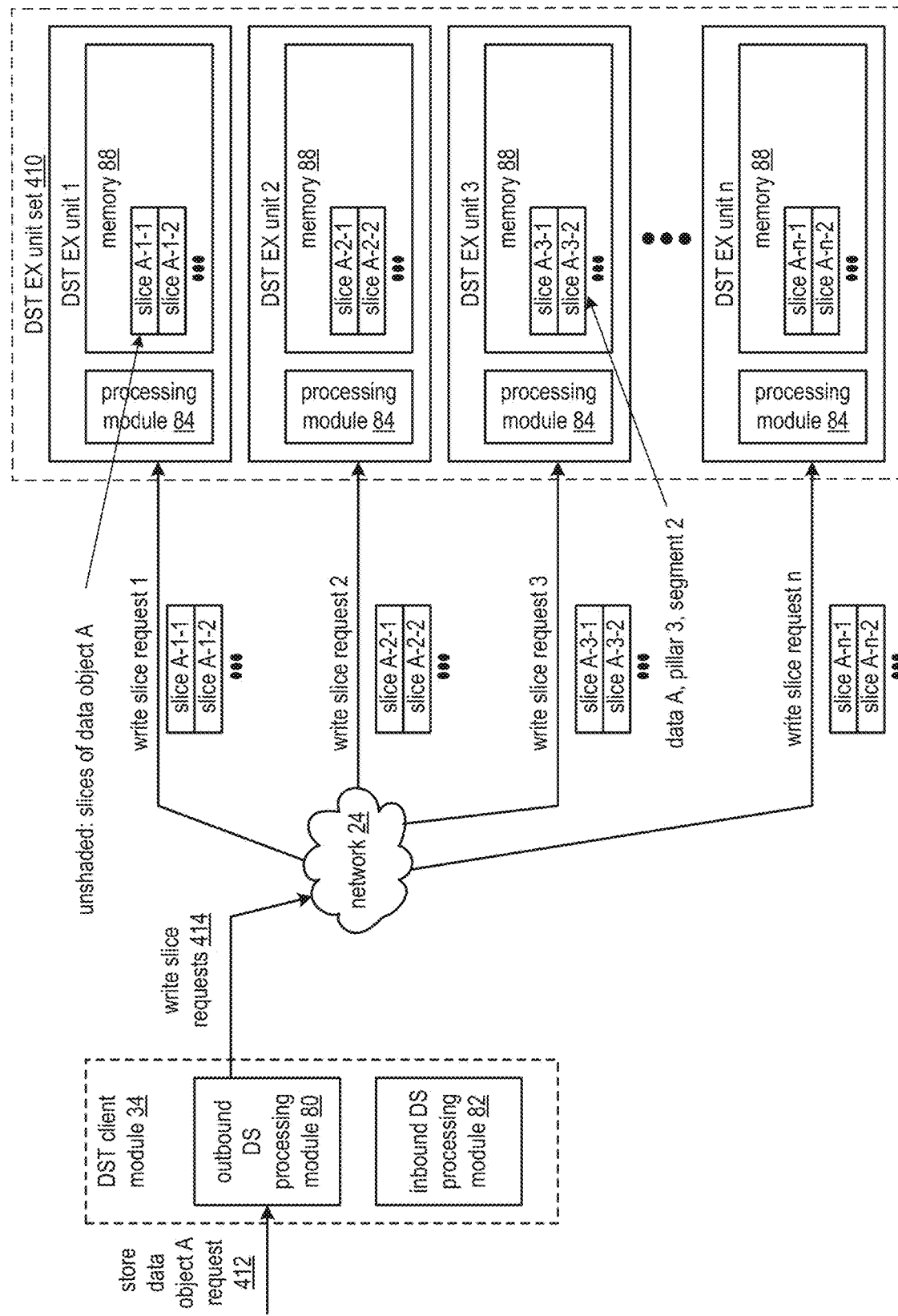
Figure 42B:
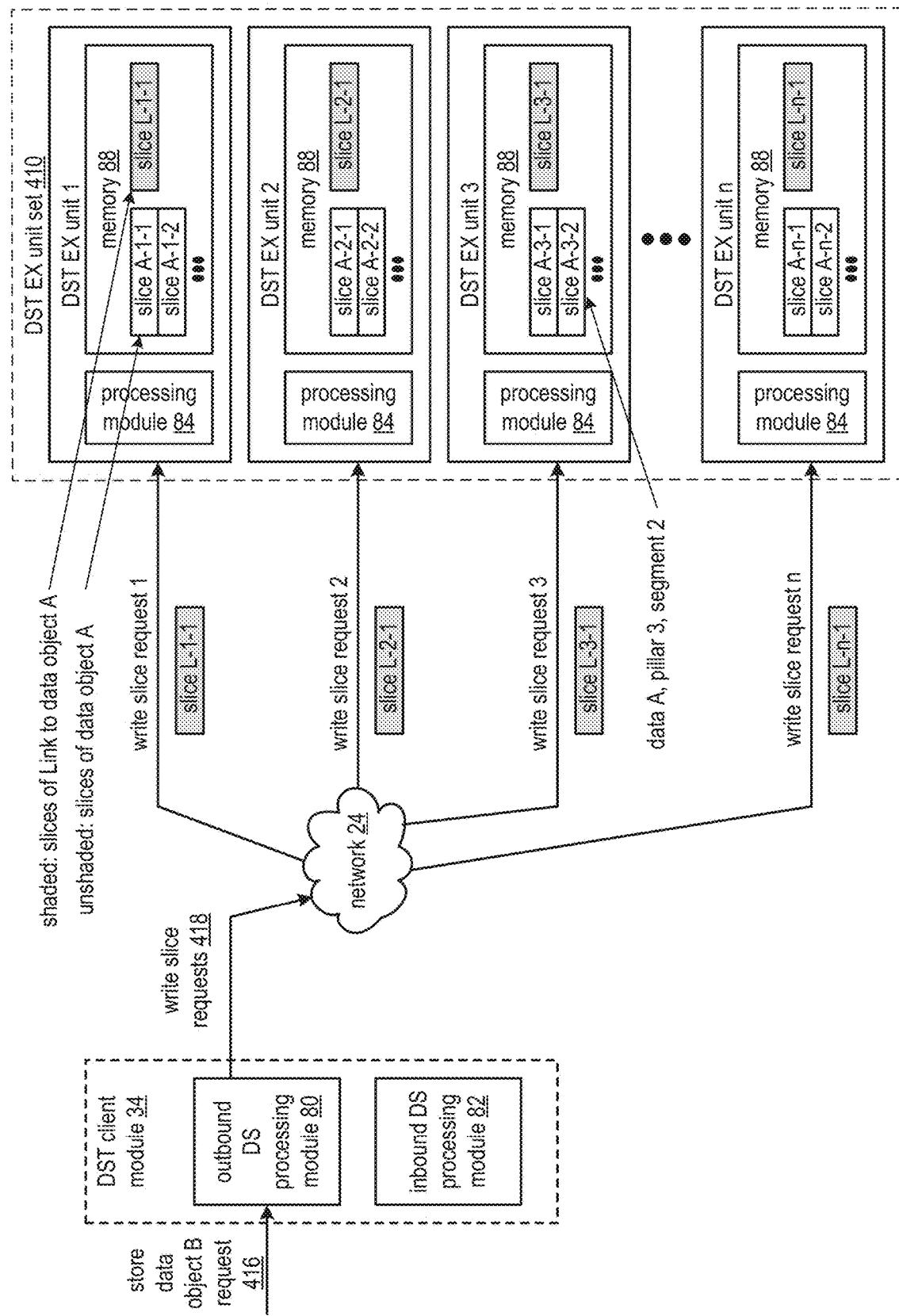
Figure 42D:
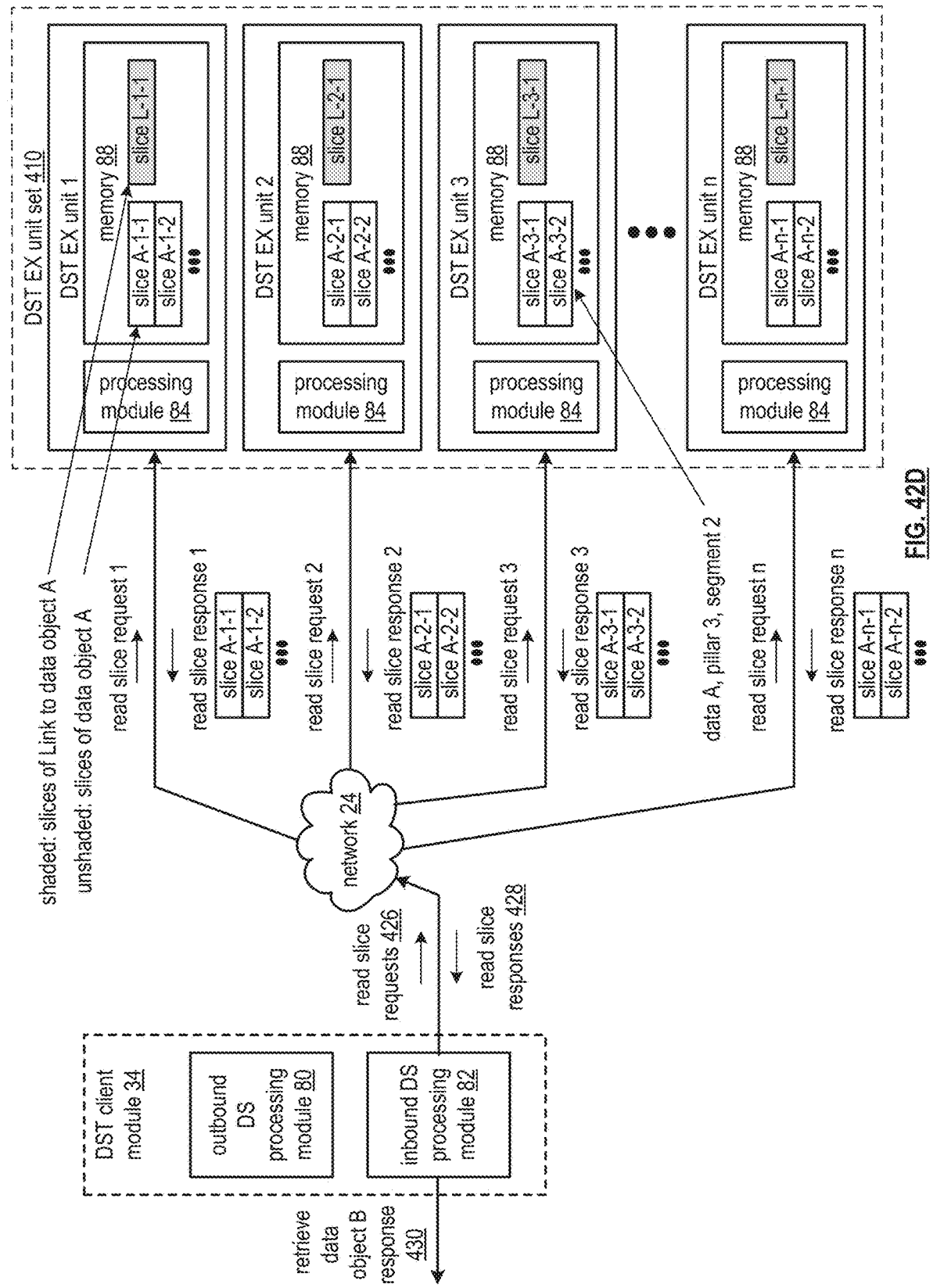

FIG. 42A-42D are schematic block diagrams of another embodiment of a dispersed storage system illustrating an example of storing and retrieving data. In particular, FIG. 42A-B illustrate the example of the storing of the data and FIGS. 42C-D illustrate the example of the retrieving of the data. The dispersed storage system provides a dispersed storage network (DSN) that includes memory of the DSN to facilitate storing and the retrieving of the data. In particular, dispersed storage system includes the distribute storage and task (DST) client module 34 of FIG. 1, the network 24 of FIG. 1, and a DST execution unit set 410. The DST client module 34 includes the outbound dispersed storage (DS) processing module 80 of FIG. 3 and the inbound DS processing module 82 of FIG. 3. The DST execution unit set 410 provides at least a portion of the memory of the DSN and includes a set of DST execution units 1-*n*. Each DST execution unit may be implemented utilizing the DST execution unit 36 of FIG. 1. Each DST execution unit includes the processing module 84 of FIG. 3 and the memory 88 of FIG. 3. Each of the outbound DS processing module 80, the inbound DS processing module 82, and the processing module 84 may include further modules. For example, the outbound DS processing module 80, the inbound DS processing module 82, and the processing module 84 provide a first module, a second module, a third module, and a fourth module to facilitate the storing and the retrieving of the data.

FIG. 42A illustrates initial steps of the storing of the data. In an example of operation of the storing of the data, the first module, when operable within the outbound DS processing module 80, causes the outbound DS processing module 80 to receive data for storage. For example, the outbound DS processing module 80 receives a store data object A request 412 from a first requesting entity, where the store data object A request 412 includes one or more of a data object A (e.g., hereafter interchangeably described as either data object A or the data) and a data identifier (ID) that the first requesting entity associates with data object A.

Having received the data for storage, the outbound DS processing module 80 generates a DSN source name for the data. As a specific example, the outbound DS processing module 80 obtains a vault identifier, generates a random number, and combines the vault identifier and the random number to produce the DSN source name. As a specific example of the obtaining of the vault identifier, the outbound DS processing module 80 accesses a system registry based on an identifier of at least one of the first requesting entity, the data object A, and a group affiliation to extract the vault identifier. As another specific example of the obtaining the vault identifier, the outbound DS processing module 80 extracts the vault identifier from the store data object A request 412. As a specific example of the generating of the random number, the outbound DS processing module 80 generates the random number to produce a unique object number associated with the receiving of the data object A for storage. As a specific example of the combining of the vault identifier and the random number to produce the DSN source name, the outbound DS processing module 80 generates the DSN source name to include one or more of a vault identifier, a generation number (e.g., a current generation number of a plurality of chronologically sequenced generation numbers), and the object number.

Having generated the DSN source name for the data (e.g., data object A), the second module, when operable within the outbound DS processing module 80, causes the outbound DS processing module 80 to determine whether substantially identical data to the data has been previously stored in the memory of the DSN. The determining whether the substantially identical data to the data has been previously stored in the memory of the DSN includes steps to identify the substantially identical data without regards to one or more of storage location, ownership, kind of storage, DSN source names, and data identifiers. The steps to identify the substantially identical data are discussed in greater detail with reference to FIG. 42B.

When the substantially identical data has not yet previously stored in the memory of the DSN, the fourth module, when operable within the outbound DS processing module 80, causes the outbound DS processing module 80 to dispersed storage error encode the data to produce a plurality of sets of encoded data slices. For example, the outbound DS processing module 80 divides the data object A into a plurality of data segments (e.g., 1, 2, etc.), and for each data segment, encodes the data segment using a dispersed storage error encoding function to produce a corresponding set of encoded data slices of the plurality of sets of encoded data slices. For instance, a first data segment is encoded to produce a first set of encoded data slices that includes encoded data slices A-1-1, A-2-1, A-3-1, through A-n-1.

Having produced the plurality of sets of encoded data slices, the outbound DS processing module 80 outputs the plurality of sets of encoded data slices to the memory of the DSN for storage. As a specific example, the outbound DS processing module 80 generates a plurality of sets of slice names based on the DSN source name (e.g., each slice name includes the DSN source name), generates one or more sets of write slice requests 414 that includes the plurality of sets of slice names and the plurality of sets of encoded data slices, and sends, via the network 24, the one or more sets of write slice requests 414 (e.g., write slice requests 1-*n*) to the set of DST execution units 1-*n*. Each processing module 84 of each DST execution unit receives a corresponding write slice request, extracts one or more corresponding encoded data slices, and stores the one or more corresponding encoded data slices in the memory 88. For instance, the processing module 84 of the DST execution unit 2 receives write slice request 2, extracts encoded data slices A-2-1, A-2-2, etc., and stores the encoded data slices A-2-1, A-2-2, etc., in the memory 88 of the DST execution unit 2.

Having output the plurality of sets of encoded data slices to the memory of the DSN for storage, the outbound DS processing module 80 creates an entry in a data tag list or a dispersed hierarchical index regarding the data. As a specific example, the outbound DS processing module 80 obtains a data tag (e.g., a value produced from performing a deterministic function on data object A) from a corresponding step of the identifying the substantially identical data, generates the entry to include the data tag and the DSN source name, and updates the data tag list (e.g., stored locally, stored in the memory of the DSN) to include the entry. As another specific example, alternatively, or in addition to, the outbound DS processing module 80 obtains the data tag from the corresponding step of the identifying the substantially identical data, generates the entry to include the data tag and the DSN source name, and updates the dispersed hierarchical index (e.g., stored in the memory of the DSN) to include the entry, where the entry is subsequently searchable utilizing the data tag.

FIG. 42B illustrates further steps of the storing of the data. In an example of operation of the storing of the data, the first module, when operable within the outbound DS processing module 80, causes the outbound DS processing module 80 to receive data for storage. For example, the outbound DS processing module 80 receives a store data object B request 416 from a second requesting entity, where the store data object B request 416 includes a data object B and a data identifier indicating data object B from a perspective of the second requesting entity.

Having received the data for storage, the outbound DS processing module 80 generates a DSN source name for the data (e.g., different than the DSN source name associated with data object A). As a specific example, the outbound DS processing module 80 obtains a vault identifier associated with the second requesting entity, generates another random number, and combines the vault identifier associated with the second requesting entity and the other random number to produce the DSN source name for data object B.

Having generated the DSN source name for the data (e.g., data object B), the second module, when operable within the outbound DS processing module 80, causes the outbound DS processing module 80 to determine whether substantially identical data to the data has been previously stored in the memory of the DSN. The determining whether the substantially identical data to the data has been previously stored in the memory of the DSN includes the steps to identify the substantially identical data. The steps to identify the substantially identical data are carried out in accordance with one or more approaches. The one or more approaches include at least one of utilizing a data tag list approach, utilizing a dispersed hierarchical index approach, and utilizing a direct comparison approach.

As a specific example of determining whether the substantially identical data to the data has been previously stored in the memory of the DSN utilizing the data tag list approach, the outbound DS processing module 80 generates a data tag for the data of the store data object B request 416. For instance, the outbound DS processing module 80 performs a mask generating deterministic function on the data object B to produce the data tag. Having generated the data tag, the outbound DS processing module 80 accesses a data tag list to determine whether the previously stored data has a substantially identical data tag. For instance, the outbound DS processing module 80 identifies the data tag from storing data object A from the data tag list as the substantially identical data tag when data tag from data object B is substantially the same as the data tag from storing data object A. The outbound DS processing module 80 indicates that the previously stored data has the substantially identical data tag when the identifying the data tag from storing data object A is substantially the same as the data tag generated from a data object B. When the previously stored data (e.g., data object A) has the substantially identical data tag, the outbound DS processing module 80 indicates that the substantially identical data has been stored.

As a specific example of determining whether the substantially identical data to the data has been previously stored in the memory of the DSN utilizing the dispersed hierarchical index approach, the outbound DS processing module 80 generates the data tag for data object B and accesses a dispersed hierarchical index using the data tag of data object B. For example, the outbound DS processing module 80 identifies a dispersed hierarchical index associated with data tags (e.g., based on a list of dispersed hierarchical indexes and associated DSN source names of a root index node of each dispersed hierarchical index) and accesses the identified dispersed hierarchical index (e.g., accessing the memory of the DSN using a corresponding DSN source name of a corresponding root index node of the identified dispersed hierarchical index), searches the identified dispersed hierarchical index using the data tag of data object B as an index key to determine whether an entry in the dispersed hierarchical index is indexed by the data tag (e.g., finding an index node that includes the data tag). When the entry in the dispersed hierarchical index is indexed by the data tag, the outbound DS processing module 80 indicates that the substantially identical data has been stored.

As a specific example of determining whether the substantially identical data to the data has been previously stored in the memory of the DSN utilizing the direct comparison approach, the outbound DS processing module 80 performs a data comparison function between the data (e.g., data object B) and stored data in the memory of the DSN to determine whether the substantially identical data (e.g., data object A) has been previously stored in the memory of the DSN. For example, the outbound DS processing module 80 recovers data from the memory of the DSN and compares the recovered data to the data. The outbound DS processing module 80 indicates that the substantially identical data to the data has been previously stored in the memory of the DSN when the comparing indicates that at least a portion of the stored data is substantially the same as the data.

Having determined whether the substantially identical data (e.g., data object A), to the data (e.g., data object B), has been previously stored in the memory of the DSN, the third module, when operable within the outbound DS processing module 80, causes the outbound DS processing module 80 to, when the substantially identical data has been previously stored in the memory of the DSN, generate an object linking file that links the data to the substantially identical data. As a specific example of generating the object linking file, the outbound DS processing module 80 generates a file that includes a DSN address of the substantially identical data (e.g., the DSN source name utilize to store the data object A) and labels the file with the DSN source name (e.g., of data object B). As an example of generating the file, the outbound DS processing module 80 generates the data tag (e.g., obtains from a previous step, regenerates), accesses, based on the data tag, the data tag list to identify an entry associated with the substantially identical data, and receives the DSN address of the substantially identical data (e.g., of data object A) from the identified entry.

Having generated the object linking file, the outbound DS processing module 80 dispersed storage error encodes the object linking file to produce a set of encoded link file slices. Having produced the set of encoded link file slices, the outbound DS processing module 80 outputs the set of encoded link file slices for storage in the memory of the DSN. For example, the outbound DS processing module 80 generates a set of slice names (e.g., L-1-1, L-2-1, L-3-1, through L-n-1) based on the DSN source name, generates a set of write slice requests 418 that includes the set of slice names and the set of encoded link file slices, and sends the write slice requests 418 (e.g., write slice requests 1-*n*) to the set of DST execution units 1-*n*. Each processing module 84 of each DST execution unit 1-*n* receives a corresponding write slice request, extracts a corresponding encoded link file slice, and stores the corresponding encoded link file slice in the memory 88 of the DST execution unit. Alternatively, or in addition to, the outbound DS processing module 80 updates at least one of the data tag list and the dispersed hierarchical index to associate the data tag with the DSN source name, i.e., identifying the DSN source name as associated with a request to store data object B that is substantially the same as data object A. as such, the updated data tag list and/or the updated dispersed hierarchical index associates the data tag with the DSN source name of stored data object A and the data ID of data object B.

FIG. 42C illustrates steps of the retrieving of the data. In an example of operation of the retrieving of the data, the inbound DS processing module 82 receives a retrieve data object B request 420 from a requesting entity, where the retrieve data object B request 420 includes a data identifier (ID) associated with data object B from a perspective of the requesting entity. Having received the retrieve data object B request 420, the inbound DS processing module 82 obtains a DSN source name based on the data ID associated with data object B. As a specific example, the inbound DS processing module 82 accesses a dispersed hierarchical index utilizing the data ID to recover the DSN source name. As another specific example, the inbound DS processing module 82 accesses a DSN directory utilizing the data ID to recover the DSN source name.

Having obtained the DSN source name, the inbound DS processing module 82 recovers an interim data object from the memory of the DSN. As a specific example, the inbound DS processing module 82 generates at least one set of slice names based on the DSN source name (e.g., each slice name includes the DSN source name), generates at least one set of read slice requests 422 that includes the at least one set of slice names, sends the at least one set of read slice requests 422 (e.g., that includes read slice requests 1-*n*) to the set of DST execution units 1-*n*, receives read slice responses 424 (e.g., one or more of read slice responses 1-*n* issued by the set of DST execution units 1-*n*), and decodes encoded slices of the read slice responses 424 to produce the interim data object. For example, the inbound DS processing module 82 decodes encoded slices L-1-1, L-2-1, L-3-1, through L-n-1 to produce the interim data object. The example of operation continues as is discussed in greater detail with reference to FIG. 42D.

FIG. 42D illustrates further steps of the retrieving of the data. In the example of operation of the retrieving of the data, the inbound DS processing module 82 determines whether the recovered interim data object includes location information, where the location information includes a DSN source name of substantially identical data (e.g., of data object A) to the requested data (e.g., data object B). For example, the inbound DS processing module 82 indicates that the recovered interim data object includes location information when detecting a format of the interim data object to include the DSN source name of the substantially identical data. When the recovered interim data object does not include the location information (e.g., the recovered interim data object includes a first data segment of data object A), the inbound DS processing module 82 recovers further data segments of data object A by issuing further read slice requests 426 to the set of DST execution units 1-*n*, receives read slice responses 428 that includes encoded data slices, and decodes sets of encoded data slices to reproduce the substantially identical data (e.g., data object A).

When the recovered interim data object includes the location information, the inbound DS processing module 82 recovers the requested data object from the memory of the DSN utilizing the location information. As a specific example, the inbound DS processing module 82 extracts the DSN source name of the substantially identical data from the interim data object, generates a plurality of sets of slice names to include the DSN source name of the substantially identical data, generates one or more sets of read slice requests 426 that includes the plurality of sets of slice names, sends the one or more sets of read slice requests 426 (e.g., as read slice requests 1-*n*) to the set of DST execution units 1-*n*, receives read slice responses 428 (e.g., that includes one or more of read slice responses 1-*n*), and decodes encoded data slices of the received read slice responses 428 using the dispersed storage error coding function to reproduce the requested data object. For example, the inbound DS processing module 82 receives encoded data slices of the first data segment (e.g., slices A-1-1, A-2-1, A-3-1, through A-n-1) and decodes at least a decode threshold number of the received encoded data slices of the first data segment to reproduce the first data segment.

Having recovered the requested data object, the inbound DS processing module 82 outputs a retrieve data object B response 430 to the requesting entity. As a specific example, the inbound DS processing module 82 generates the retrieve data object B response 430 including the requested data object and outputs the retrieve data object B response 430 to the requesting entity.

Figure 42E:
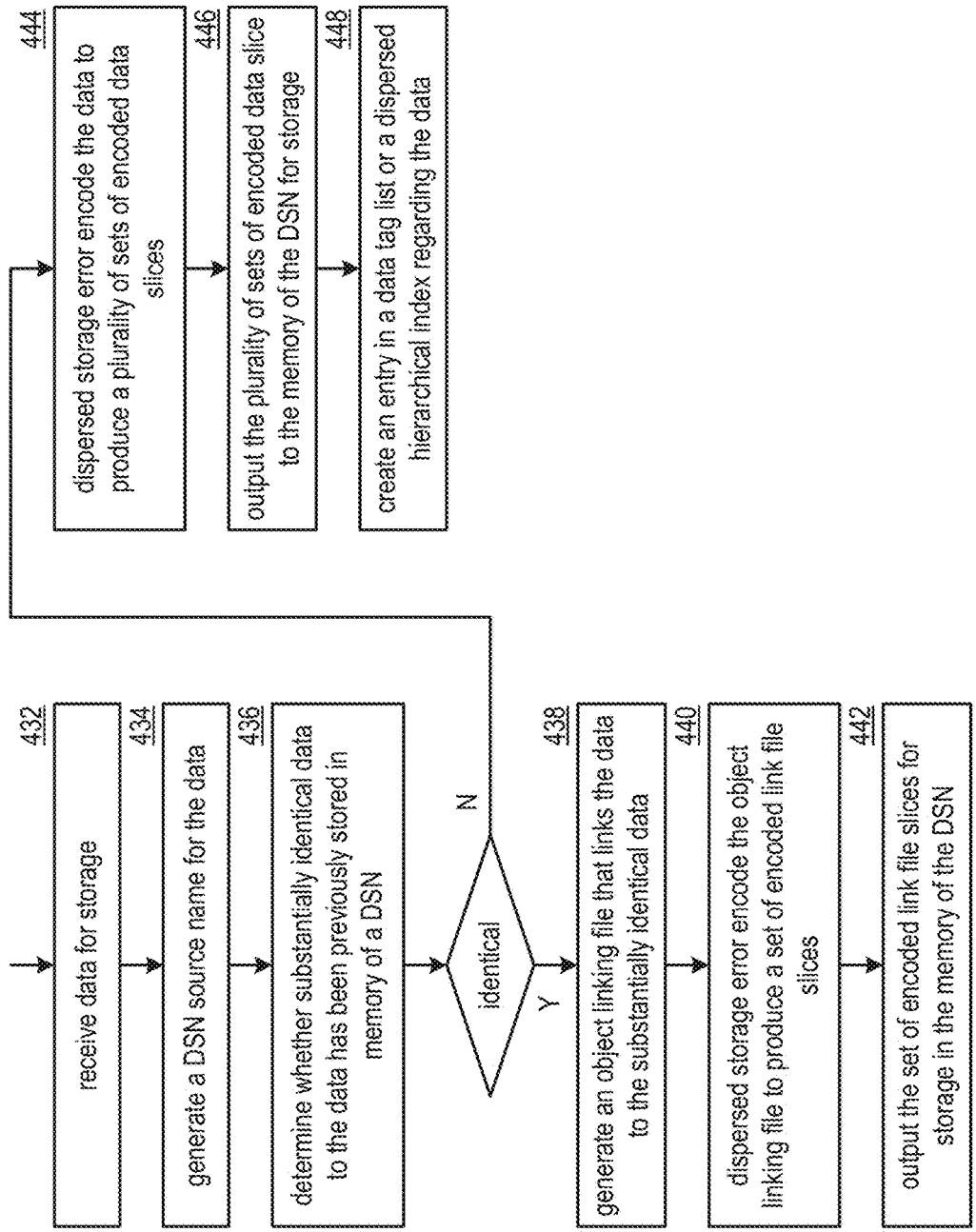
FIG. 42E is a flowchart illustrating an example of storing data in accordance with the present invention.

FIG. 42E is a flowchart illustrating an example of storing data. The method begins at step 432 where a processing module (e.g., a distributed storage and task (DST) client module of a dispersed storage network (DSN)) receives data for storage. For example, the processing module receives a store data object request from a requesting entity, where the request includes the data and an identifier of the data. The method continues at step 434 where the processing module generates a DSN source name for the data. As a specific example, the processing module obtains a vault identifier, generates a random number, and combines the vault identifier and the random number to produce the DSN source name. For instance, the processing module utilizes an identifier of the requesting entity to access a system registry to retrieve the vault identifier, generates the random number to produce a unique object number for this store data object request, obtains a current generation number associated with the vault identifier, and combines the vault identifier, the current generation number, and the unique object number to produce the DSN source name.

The method continues at step 436 where the processing module determines whether substantially identical data to the data has been previously stored in memory of the DSN. As a specific example, the processing module generates a data tag, accesses a data tag list to determine whether the previously stored data has a substantially identical data tag, and when the previously stored data has the substantially identical data tag, indicate that the substantially identical data has been stored. For instance, the processing module performs a hash-based message authentication code deterministic function on the data to produce the data tag and indicates that the substantially identical data has been stored when the data tag matches a stored data tag of the data tag list.

As another specific example of determining whether the substantially identical data to the data has been previously stored in the memory of the DSN, the processing module generates the data tag, accesses a dispersed hierarchical index using the data tag, and when an entry in the dispersed hierarchical index is indexed by the data tag, indicates that the substantially identical data has been stored. For instance, the processing module indicates that the substantially identical data has been stored when the data tag matches an entry of a leaf node of the dispersed hierarchical index.

As another specific example of determining whether the substantially identical data to the data has been previously stored in the memory of the DSN, the processing module performs a data comparison function between the data and stored data in the memory of the DSN to determine whether the substantially identical data has been previously stored in the memory of the DSN. For instance, the processing module indicates that the substantially identical data has been stored when the processing module detects that the stored data in the memory of the DSN matches the data.

The method branches to step 444 when the substantially identical data to the data has not been previously stored in the memory of the DSN. The method continues to step 438 when the substantially identical data to the data has been previously stored in the memory of the DSN. When the substantially identical data has been previously stored in the memory of the DSN, the method continues at step 438 where the processing module generates an object linking file that links the data to the substantially identical data. As a specific example, the processing module generates a file that includes a DSN address of the substantially identical data and labels the file with the DSN source name such that the file is to be stored in the memory of the DSN at the DSN source name location. In an instance, the processing module generates the data tag, accesses, based on the data tag, the data tag list to identify an entry associated with the substantially identical data, and retrieves the DSN address of the substantially identical data from the identified entry. In another instance, the processing module generates the data tag, searches based on the data tag, the dispersed hierarchical index to identify an entry (e.g., the leaf node matching the data tag) associated with the substantially identical data, and retrieves the DSN address of the substantially identical data from the identified entry.

The method continues at step 440 where the processing module dispersed storage error encodes the object linking file to produce a set of encoded link file slices. The method continues at step 442 where the processing module outputs the set of encoded link file slices for storage in the memory of the DSN. As a specific example, the processing module generates a set of slice names based on the DSN source name (e.g., each slice name includes the DSN source name), generates a set of write slice requests that includes the set of slice names and the set of encoded link file slices, sends the set of write slice requests to the memory of the DSN. Alternatively, or in addition to, the processing module updates at least one of the data tag list and the dispersed hierarchical index to associate the data tag associated with the data and the DSN source name. For instance, the processing module associates the data tag with the DSN source name and the DSN address of the substantially identical data.

When the substantially identical data has not been previously stored in the memory of the DSN, the method continues at step 444 where the processing module dispersed storage error encodes the data to produce a plurality of sets of encoded data slices. The method continues at step 446 where the processing module outputs the plurality of sets of encoded data slices to the memory of the DSN for storage. For example, the processing module generates a plurality of sets of slice names based on the DSN source name (e.g., each slice name includes the DSN source name), generates one or more sets of write slice requests that includes the plurality of sets of slice names and the plurality of sets of encoded data slices, and sends the one or more sets of write slice requests to the memory of the DSN. The method continues at step 448 where the processing module creates an entry in the data tag list or the dispersed hierarchical index regarding the data. For example, the processing module generates the entry to associate the data tag and the DSN source name (e.g., which, for this first storage operation is the DSN address of the substantially identical data for subsequent store data requests of substantially the same data).

Figure 42F:
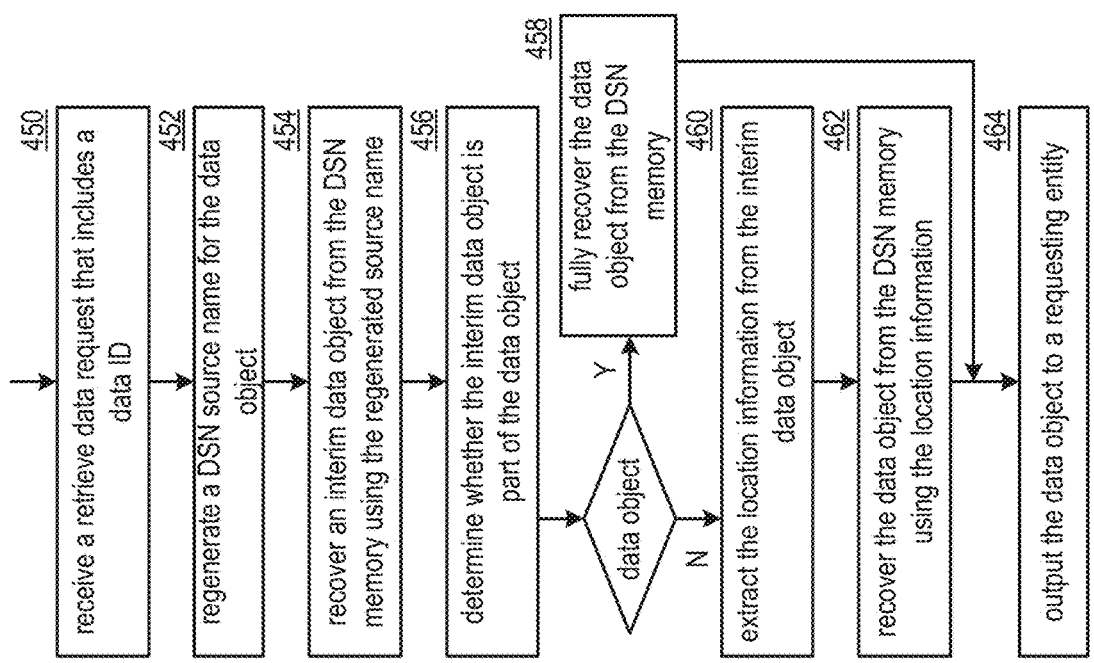
FIG. 42F is a flowchart illustrating an example of retrieving data in accordance with the present invention.

FIG. 42F is a flowchart illustrating an example of retrieving data. The method begins at step 450 where a processing module (e.g., a distributed storage and task (DST) client module of a dispersed storage network (DSN)) receives the retrieve data request that includes a data ID associated with a data object (e.g., the data ID is associated with at least one previous store data request of a plurality of stored data requests). The method continues at step 452 where the processing module regenerates a DSN source name for the data object based on the received data ID. The DSN source name includes at least one of the DSN source name for the data object utilized during storage of the data object and another source name of one or more other DSN source names utilized by other requesting entities for the same data object.

The regenerating includes one or more of performing a lookup in one or more of a dispersed hierarchical index, a DSN directory, and a data tag list using the data ID of the request that is associated with the regenerated DSN source name. The method continues at step 454 where the processing module recovers an interim data object from memory of the DSN using the regenerated source name. The recovering includes generating a set of slice names using the regenerated DSN source name, issuing a set of read slice requests to the memory of the DSN that includes the set of slice names, receiving at least a decode threshold number of encoded slices, and decoding the at least a decode threshold number of encoded slices using a dispersed storage error coding function to produce the interim data object (e.g., either a first data segment of the requested data object or an object linking file associated with the requested data object).

The method continues at step 456 where the processing module determines whether the interim data object is part of the requesting data object. The determining includes identifying a format of the interim data object as the first data segment of the requested data object or as the data object linking file. The processing module identifies the interim data object as part of the requested data object when the interim data object includes the first data segment. The method branches to step 460 when the interim data object is not part of the data object. The method continues to step 458 when the interim data object is part of the data object.

The method continues at step 458 where the processing module fully recovers the data object from the DSN memory when the interim data object is part of the data object. The fully recovering includes recovering remaining data segments of a plurality of data segments of the data object. For example, for each data segment, the processing module issues a set of read slice requests that includes a set of slice names corresponding to the data segment based on the regenerated source name and receiving slices for decoding to reproduce the data object. The method branches to step 464.

The method continues at step 460 where the processing module extracts location information (e.g., a DSN source name of substantially identical data which is the requested data object) from the interim data object when the interim data object is not part of the data object. The method continues at step 462 where the processing module recovers the data object from the DSN memory using the location information. The recovering includes generating a plurality of sets of slice names using the DSN source name of the substantially identical data, issuing a plurality of sets of read slice requests to the memory of the DSN that includes the plurality of sets of slice names, receiving encoded data slices, and decoding the encoded data slices using the dispersed storage error coding function to recover the requested data object. The method continues at step 464 where the processing module outputs the recovered data object to the requesting entity.

Figure 43:
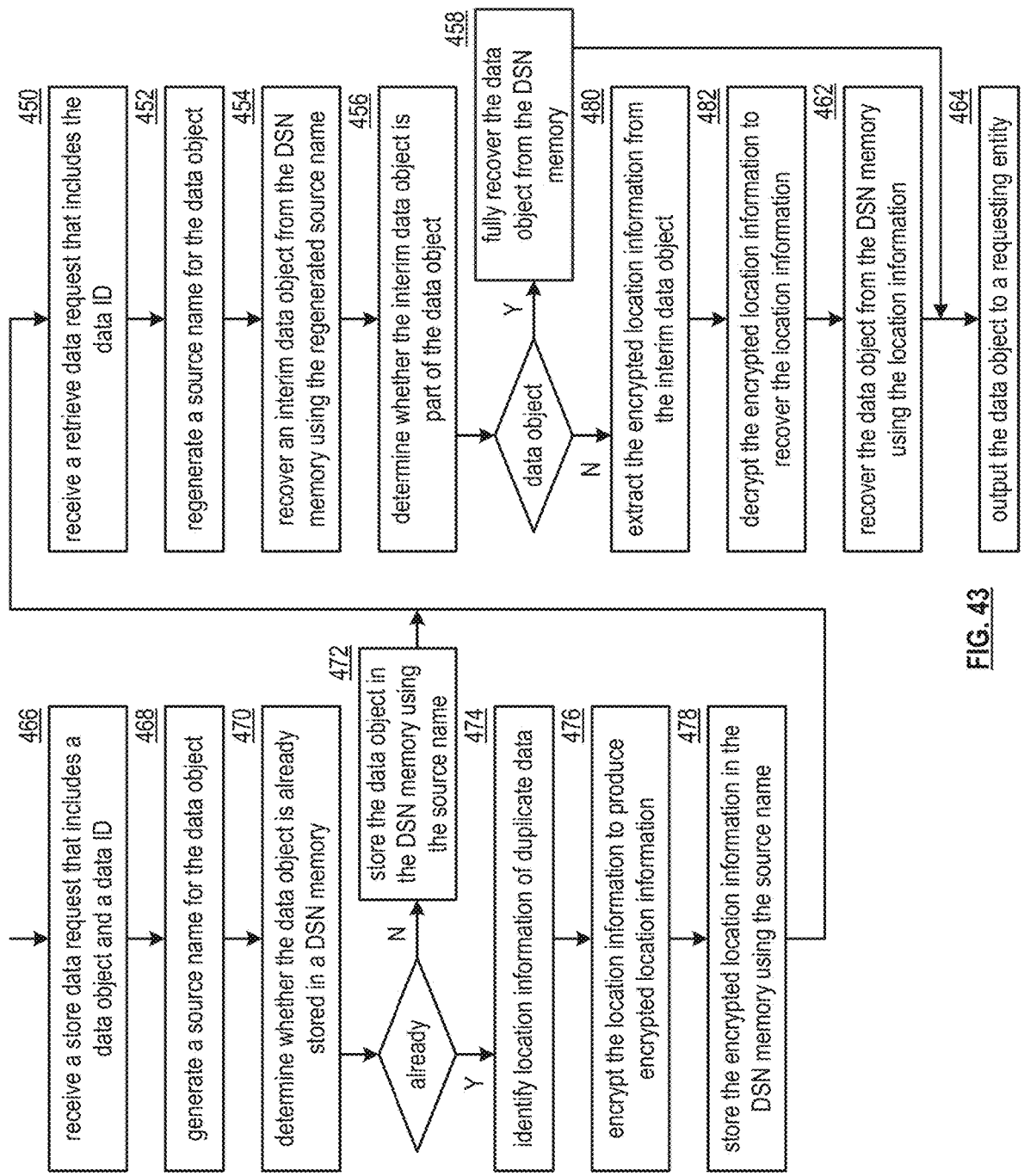
FIG. 43 is a flowchart illustrating another example of accessing data in accordance with the present invention.

FIG. 43 is a flowchart illustrating another example of accessing data, which include similar steps to FIG. 42F. The method begins at step 466 where a processing module (e.g., of a dispersed storage (DS) processing module) receives a store data request that includes a data object and a data identifier (ID) of the data object (e.g., a data ID associated with a requesting entity of the store data request and one of one or more data IDs associated with the data object). The method continues at step 468 where the processing module generates a source name (e.g., a dispersed storage network (DSN) source name) for the data object. The generating may be based on one or more of the data, the data ID, a requesting entity ID, and a vault ID. The processing module may store an association of the source name and the data ID in an entry of one or more of a dispersed hierarchical index, a DSN directory, and a list.

The method continues at step 470 where the processing module determines whether the data object is already stored in a DSN memory (e.g., memory of the DSN). The determining includes one or more of obtaining a data tag of the data (e.g., received, retrieved, generated based on performing a deterministic function on a portion of the data), comparing the data tag to a list of data tags, comparing the data object to data objects previously stored in the DSN memory, initiating a query, and receiving a query response. The method branches to step 474 when the data object is already stored in the DSN memory. The method continues to step 472 when the data object is not already stored in the DSN memory. The method continues at step 472 where the processing module stores the data object in the DSN memory using the source name when the data object is not already stored in the DSN memory. The storing includes generating a plurality of sets of slice names using the source name, encoding the data object using a dispersed storage error coding function to produce a plurality of sets of encoded data slices, and issuing one or more sets of write slice requests to the DSN memory that includes the plurality of sets of encoded data slices and the plurality of sets of slice names. The method branches to step 450 when receiving a retrieve data request.

The method continues at step 474 where the processing module identifies location information of duplicate data when the data object is already stored in the DSN memory. The identifying includes at least one of obtaining a source name corresponding to a storage location of the duplicate data and obtaining a plurality of sets of slice names corresponding to the storage location of the duplicate data. The method continues at step 476 where the processing module encrypts the location information to produce encrypted location information. The encrypting includes using a low entropy key associated with a storing entity of the request (e.g., a public key). Utilization of the low entropy key results in enabling only the requesting entity to subsequently retrieve the data has any copy using the source name. The method continues at step 478 where the processing module stores the encrypted location information as a link-object (e.g., an object linking file) in the DSN memory using the source name. The storing includes generating a set of slice names using the source name, encoding the link-object (e.g., encrypted location information) using the dispersed storage error coding function to produce a set of encoded link-object slices, and issuing a set of write slice requests to the DSN memory that includes the set of encoded link-object slices and the set of slice names.

When retrieving a data object, the method continues with steps 450-456 of FIG. 42F where the processing module receives a retrieve data request that includes the data ID, regenerates a source name for the data object, recovers an interim data object from the DSN memory using the regenerated source name, and determines whether the interim data object is part of the data object. When the interim data object is not part of the data object, the method branches to step 480. When the interim data object is part of the data object, the method continues to step 458 of FIG. 42F where the processing module fully recovers the data object from the DSN memory and then the method branches to step 464 of FIG. 42F where the processing module outputs the data object.

The method continues at step 480 where the processing module extracts the encrypted location information from the interim data object when the interim data object is not part of the data object. The method continues at step 482 where the processing module decrypts the encrypted location information using a key associated with the storing entity (e.g., a private key) to recover the location information. The method continues with steps 462-464 of FIG. 42F where the processing module recovers the data object from the DSN memory using the location information and outputs the data object to a requesting entity.

Figure 44:
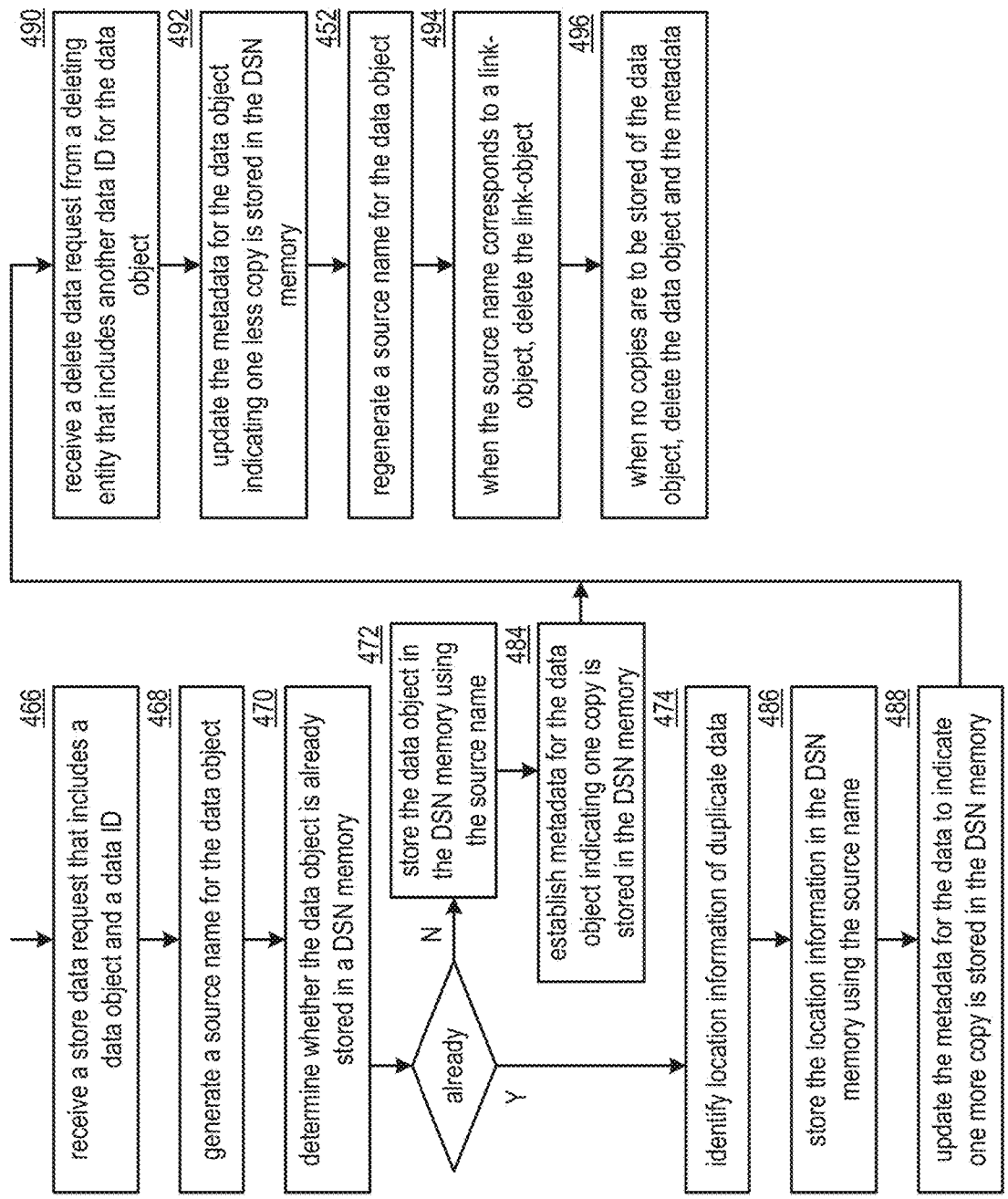
FIG. 44 is a flowchart illustrating an example of deleting data in accordance with the present invention.

FIG. 44 is a flowchart illustrating an example of deleting data, which includes similar steps to FIG. 43. The method begins with steps 466-470 of FIG. 43 where a processing module (e.g., of a dispersed storage (DS) processing module) receives a store data request that includes a data object and a data identifier (ID), generates a source name for the data object, and determines whether the data object is already stored in a dispersed storage network (DSN) memory. The method branches to step 474 of FIG. 43 when the data object is already stored in the DSN memory. The method continues to step 472 of FIG. 43 when the data object is not already stored in the DSN memory.

The method continues at step 472 of FIG. 43 where the processing module stores the data object in the DSN memory using the source name. The method continues at step 484 where the processing module establishes metadata for the data object indicating one copy is stored in the DSN memory. The establishing includes generating the metadata to indicate the one copy and storing the metadata in the DSN memory (e.g., encode the metadata to produce a set of metadata slices, output the metadata slices to the DSN memory for storage therein). The method branches to step 490 when the processing module receives a delete data request.

The method continues with step 474 of FIG. 43 where the processing module identifies location information of duplicate data. The method continues at step 486 where the processing module stores the location information in the DSN memory using the source name. The method continues at step 488 where the processing module updates the metadata for the data to indicate one more copy is stored in the DSN memory. The updating includes recovering the metadata, incrementing a copy count by one to produce updated metadata, and storing the updated metadata in the DSN memory (e.g., encode the updated metadata to produce a set of updated metadata slices, output the updated metadata slices to the DSN memory for storage therein). The method continues to step 490 when the processing module receives the delete data request.

When receiving the delete data request, the method continues at step 490 where the processing module receives a delete data request from a deleting entity that includes another data ID for the data object (e.g., one or more data IDs associated with the data object includes the other data ID). The method continues at step 492 where the processing module updates the metadata for the data object indicating one less is stored in the DSN memory. The updating includes recovering the metadata from the DSN memory, decrementing the copy count by one to produce further updated metadata, and storing the further updated metadata in the DSN memory (e.g., encode the further updated metadata to produce a set of further updated metadata slices, output the further updated metadata slices to the DSN memory for storage therein). The method continues with step 452 of FIG. 43 where the processing module generates a source name for the data object.

When the source name corresponds to a link-object, the method continues at step 494 where the processing module deletes the link-object. The deleting includes the processing module determining whether the source name corresponds to the link-object by recovering an interim object from the DSN memory using the regenerated source name and identifying a format of the recovered interim object as the link-object. The deleting further includes issuing delete slice requests to the DSN memory using the regenerated source name (e.g., source name corresponding to the deleting entity).

When no copies are to be stored in the data object, the method continues at step 496 where the processing module deletes the data object and the metadata. The processing module determines that no copies are to be stored in the data object when the copy count is zero. The deleting includes one or more of issuing a delete slice request to the DSN memory using the regenerated source name (e.g., the source name of the data object) and when deletion is confirmed, updating one or more of a dispersed hierarchical index and a DSN directory to remove an entry corresponding to the data object.

Figure 45:
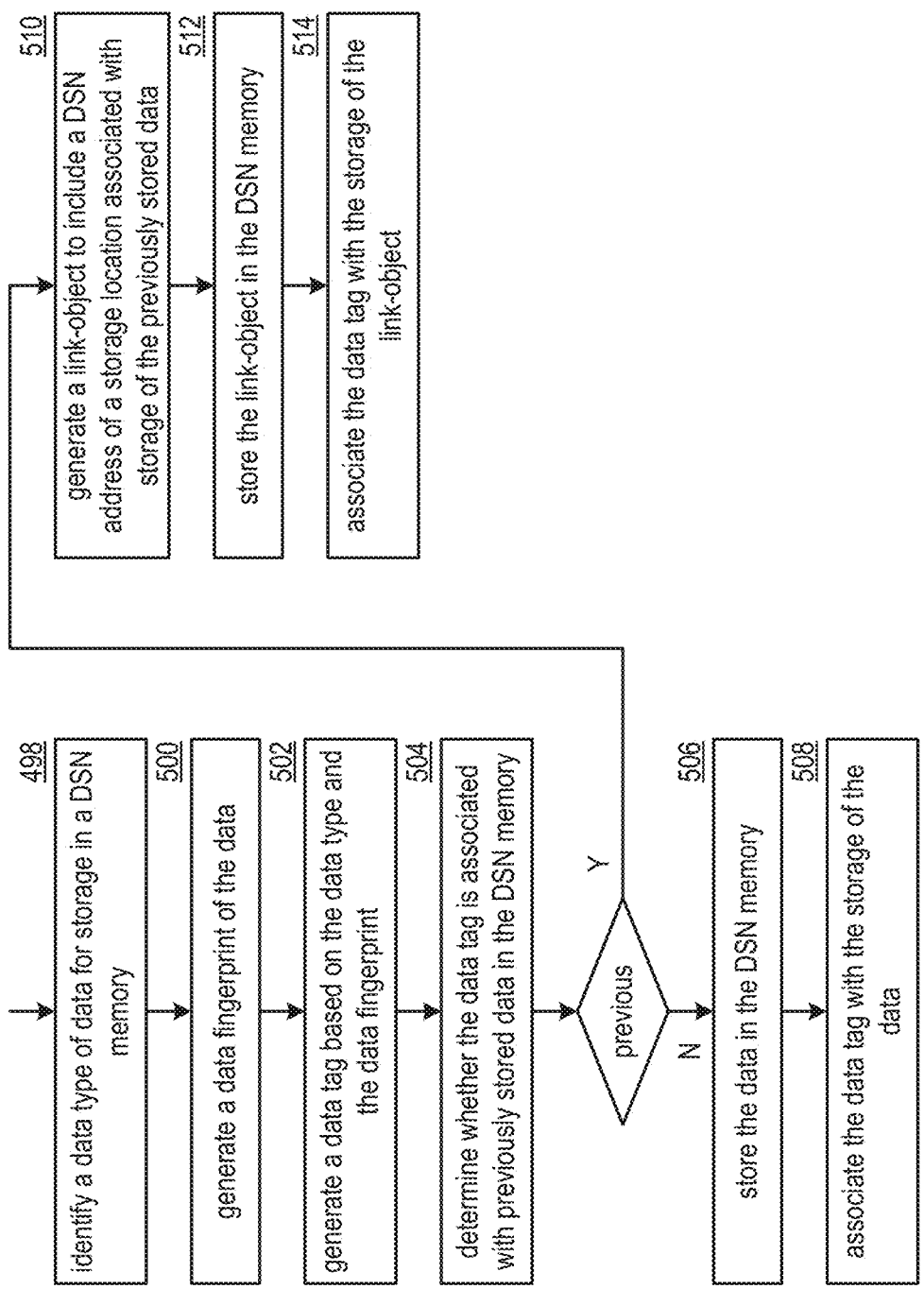
FIG. 45 is a flowchart illustrating another example of storing data in accordance with the present invention.

FIG. 45 is a flowchart illustrating another example of storing data. The method begins at step 498 where a processing module (e.g., of a dispersed storage (DS) processing module) identifies a data type of data for storage in a dispersed storage network (DSN) memory. The data includes at least one of a data object and a data segment of the data object. The identifying includes at least one of analyzing the data, comparing the data, receiving a data type, and performing a lookup. The data type includes at least one of audio, image, video, text, etc.

The method continues at step 500 where the processing module generates a data fingerprint of the data. The generating includes performing, on at least a portion of the data, at least one of a fingerprint algorithm and a deterministic function (e.g., a cyclic redundancy code, a hashing function, a mask generating function, a hash-based message authentication code function, and a sponge function). The method continues at step 502 where the processing module generates a data tag based on the data type and the data fingerprint. The generating includes performing a deterministic function on one or more of the data type and the data fingerprint.

The method continues at step 504 where the processing module determines whether the data tag is associated with previously stored data in the DSN memory. The determining includes at least one of comparing the data tag to a data tag list, initiating a query, receiving the response, accessing a dispersed hierarchical index that includes a plurality of data tags, and accessing a DSN directory that includes the plurality of data tags. For example, the processing module indicates that the data tag is associated with previously stored data in the DSN memory when the data tag matches another data tag of the data tag list. The method branches to step 506 when the data tag is not associated with previously stored data in the DSN memory. The method continues to step 510 when the data tag is associated with previously stored data in the DSN memory.

The method continues at step 506 where the processing module stores the data in the DSN memory when the data tag is not associated with previously stored data in the DSN memory. The storing includes one or more of encoding the data using a dispersed storage error coding function to produce slices, outputting the slices to the DSN memory for storage at a storage location of the data, and storing metadata that includes transformation information (e.g., an algorithm associated with creation of the data). The method continues at step 508 where the processing module associates the data tag with the storage of the data. The associating includes updating one or more of the data tag list, a hierarchical dispersed index, and a directory to include one or more of a data identifier (ID) of the data, a DSN address of the storage location of the data, and the data tag. Alternatively, or in addition to, the processing module outputs at least a portion of the data tag list to modules of the DSN memory. For example, the processing module outputs the data tag list to a DS unit of the DSN memory.

The method continues at step 510 where the processing module generates a link-object to include a DSN address of a storage location associated with storage of the previously stored data when the data tag is associated with previously stored data. The generating includes obtaining a source name as the DSN address corresponding to where the data object is stored in the DSN memory. The obtaining includes accessing at least one of the hierarchical dispersed index, the data tag list, and the directory based on at least one of the data tag and the data ID of the data object. The method continues at step 512 where the processing module stores the link-object in the DSN memory. The storing includes encoding the link-object using the dispersed storage error coding function to produce a set of link slices, outputting the set of link slices to the DSN memory for storage therein at a storage location of the link-object. Alternatively, or in addition to, the processing module stores metadata including the transformation information. The method continues at step 514 where the processing module associates the data tag with the storage of the link-object. The associating includes updating one or more of the data tag list, the dispersed hierarchical index, and the DSN directory to include one or more of the data ID of the data, a DSN address of the storage location of the link-object, and the data tag. Alternatively, or in addition to, the processing module outputs at least a portion of the data tag list to modules of the DSN memory. Retrieval of the data object is discussed with reference to FIG. 42F.

Figure 46:
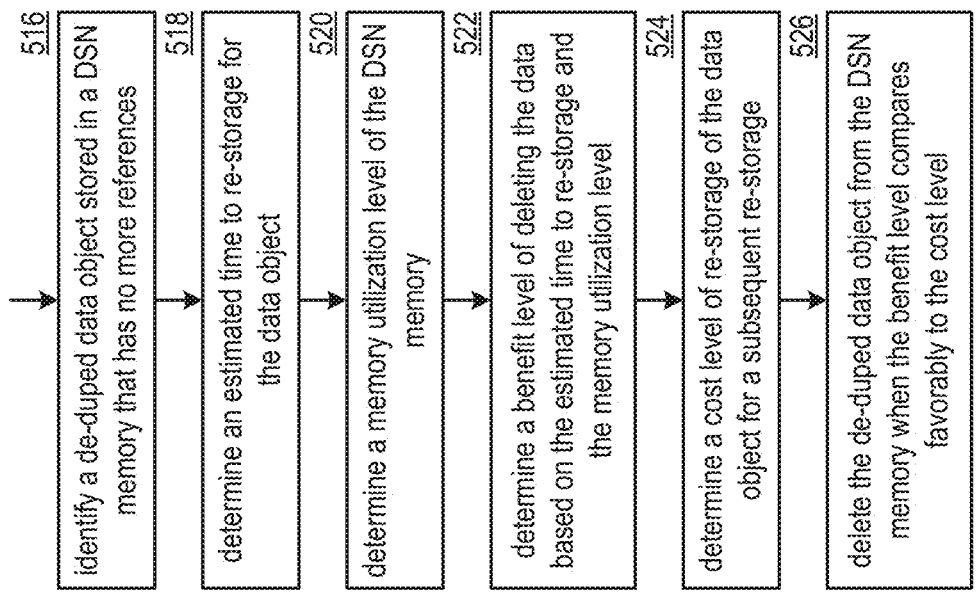
FIG. 46 is a flowchart illustrating another example of deleting data in accordance with the present invention.

FIG. 46 is a flowchart illustrating another example of deleting data. The method begins at step 516 where a processing module (e.g., of a dispersed storage (DS) processing module) identifies a de-duped data object stored in a dispersed storage network (DSN) memory that has no more references. The reference includes an association of data of a data ID of one or more data IDs stored in the DSN memory. The identifying includes at least one of accessing metadata associated with the data object to extract a copy count, retrieving a data tag list, accessing a dispersed hierarchical index, retrieving a DSN directory entry associated with the data object, and indicating there are no more references when the copy count is zero. The method continues at step 518 where the processing module determines an estimated time to re-storage for the data object. The re-storage includes storing of the data object when the data object does not currently exist in the DSN memory but was previously stored and deleted. The determining includes one or more of accessing a historical record of timestamps associated with previous storage of copies of the data object, estimating future time re-storage based on the historical record, and receiving the estimated time to re-storage.

The method continues at step 520 where the processing module determines a memory utilization level of the DSN memory. The determining includes at least one of issuing a query, receiving a response, performing a test, retrieving a performance metric file, and receiving an error message. The method continues at step 522 where the processing module determines a benefit level of deleting the data based on the estimated time to re-storage and the memory utilization level. The determining includes calculating an indication of benefit (e.g., reclaimed memory, cost of storage, performance, etc.) from freeing up memory of the system for the time until the data is likely to be re-stored.

The method continues at step 524 where the processing module determines a cost level of re-storage of the data object for a subsequent re-storage. The determining may be based on one or more of a size of the data object, network bandwidth availability, network bandwidth cost, and a storage capacity cost. The method continues at step 526 where the processing module deletes the de-duped data object from the DSN memory when the benefit level compares favorably to the cost level. The determining includes determining whether the benefit is greater than the cost and indicating to delete the de-duped data object when the benefit is greater than the cost.

Figure 47A:
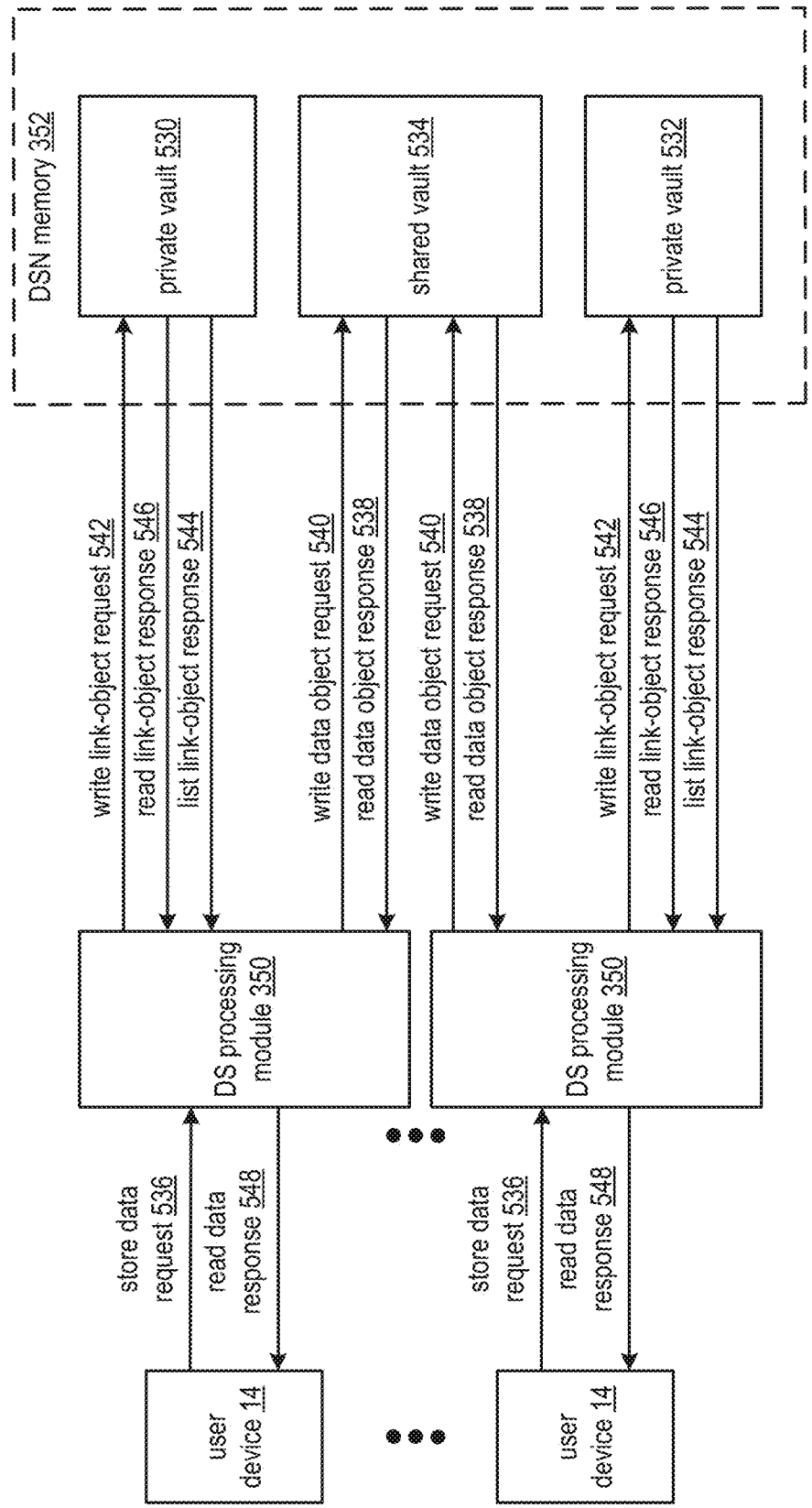
FIG. 47A is a schematic block diagram of another embodiment of a dispersed storage system in accordance with the present invention.

FIG. 47A is a schematic block diagram of another embodiment of a dispersed storage system that includes a plurality of user devices 14 of FIG. 1, a plurality of dispersed storage (DS) processing modules 350 of FIG. 40A, and the dispersed storage network (DSN) memory 352 of FIG. 40A. The DSN memory 352 includes storage facilities for at least one shared vault 534 and two or more private vaults 530-532. The storage facilities include a plurality of DS units. The DS units may be organized into one or more sets of DS units. Each DS unit of the one or more sets of DS units may be implemented utilizing one or more of the DS unit 354 of FIG. 40A, a storage node, a dispersed storage unit, a distributed storage and task (DST) execution unit, a storage server, a storage unit, a storage module, a memory device, a memory, a user device, a DST processing unit, and a DST processing module.

The system functions to access a data object in the shared vault 534 of the DSN memory 352 in accordance with a data de-duplication approach. The data de-duplication approach includes access controls with regards to the shared vault 534 and the two or more private vaults 530-532. Each user device 14 of the plurality of user devices may access the shared vault 534 to access de-duplicated data. Each user device 14 of the plurality of user devices is associated with a corresponding private vault of the two or more private vaults 530-532 and utilizes the corresponding private vault to access link-objects associated with data objects stored in the shared vault 534.

In an example of operation of the data de-duplication approach, when the accessing of the data object includes storing the data object, a user device 14 issues a store data request 536 to a DS processing module 350 to store the data object in the DSN memory 352, where the store data request 536 includes one or more of a received data object, data identifier (ID) of a plurality of data IDs associated with the data object, and a data tag (e.g., a result of performing a deterministic function on at least a portion of the data object). The DS processing module 350 determines whether the received data object matches a data object stored in the shared vault 534. The determining includes at least one of comparing the received data object to data objects stored in the shared vault, receiving a data tag associated with the received data object, generating the data tag associated with the received data object, and comparing the data tag associated with the received data object with a data tag list.

When the data object is not stored in the shared vault 534, the DS processing module 350 stores the data object in the shared vault 534 at a data object DSN address by issuing a write data object request 540 to the shared vault. The issuing includes encoding the received data object to produce slices and issuing write slice requests to the shared vault that includes the slices. The DS processing module 350 generates a link-object that includes the data object DSN address and the data ID. The DS processing module 350 stores the link-object in a corresponding private vault 530 associated with the user device 14. The storing includes issuing a write link-object request 542 to the corresponding private vault 530. The issuing includes encoding the link-object to produce link slices and issuing write slice requests to the corresponding private vault 530 that includes the link slices. When the data object is stored in the shared vault 534, the DS processing module 350 generates the link-object that includes the data object DSN address and the data ID and stores the link-object in the corresponding private vault 530 associated with the user device 14.

In another example of the data de-duplication approach, when the accessing of the data object includes retrieving the data object, another user device 14 (e.g., any user device of the plurality of user devices) issues a read data request to another DS processing module 350 (e.g., may include the DS processing module associated with storage of the data object) to retrieve the data object stored in the DSN memory 352, where the read data request includes another data ID associated with the data object. The other DS processing module 350 recovers a link-object associated with the data object from a private vault 532 that corresponds to the other user device 14. The recovering includes identifying a DSN address associated with the link-object by at least one of accessing a directory, accessing a hierarchical dispersed index, and performing a list procedure to receive a list link-object response 544 from the private vault 532 that includes the DSN address associated with the link-object. The recovering further includes issuing a read link-object request to the private vault 532 that corresponds to the other user device based on the DSN address associated with the link-object and receiving a read link-object response 546 that includes the link-object associated with the data object.

The other DS processing module 350 recovers the data object from the shared vault 534 using the data object DSN address extracted from the link-object. The recovering includes issuing a read data object request (e.g., issuing one or more sets of read slice requests) to the shared vault using the data object DSN address and receiving a read data object response 538 (e.g., decoding received slices) that includes the data object. The other DS processing module 350 issues a read data response 548 to the user device 14 that includes the data object.

Figure 47B:
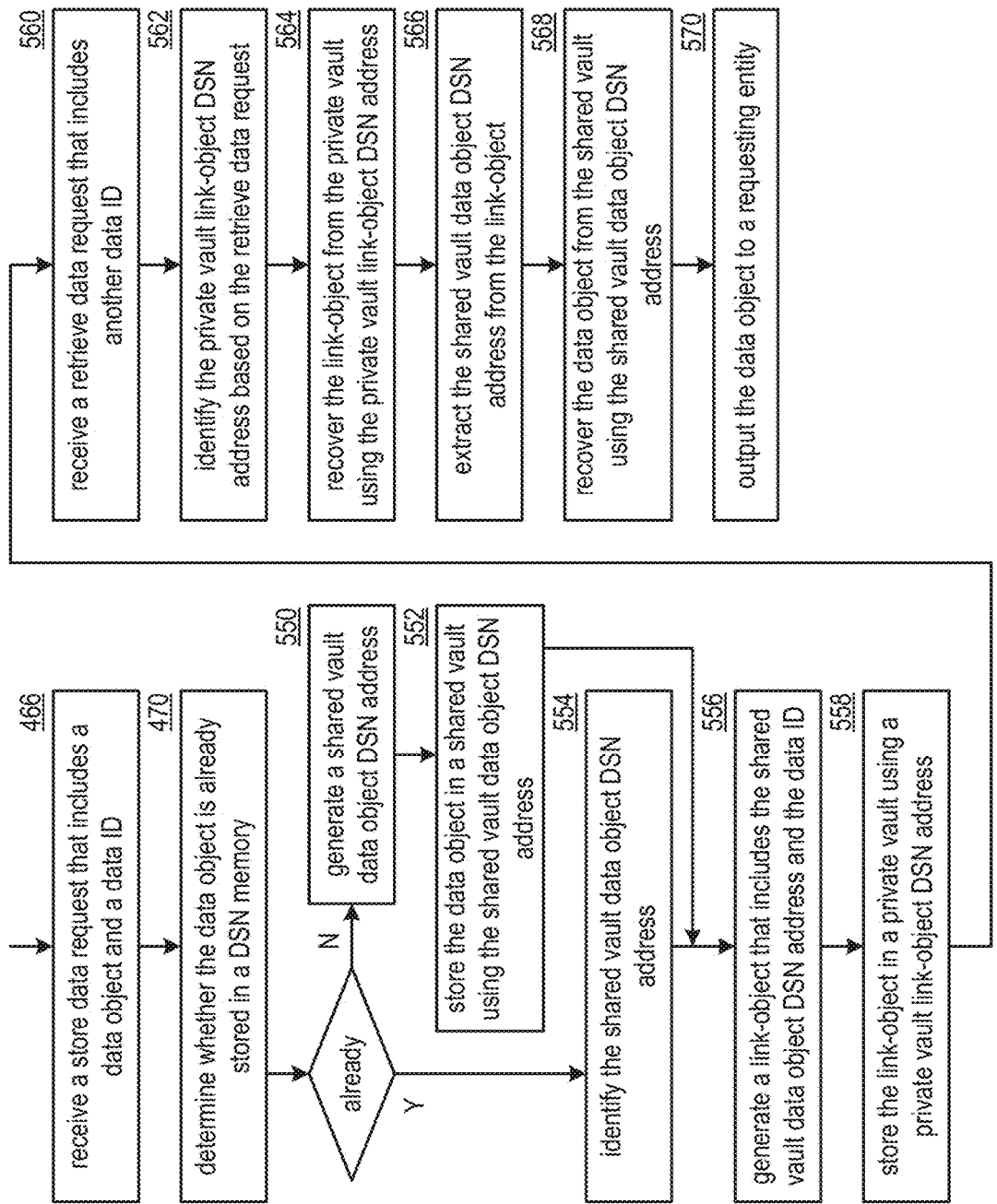
FIG. 47B is a flowchart illustrating another example of accessing data in accordance with the present invention.

FIG. 47B is a flowchart illustrating another example of accessing data, that includes similar steps to FIG. 43. The method begins with steps 466 and 470 of FIG. 43 where a processing module (e.g., of a dispersed storage (DS) processing module) receives a store data request that includes a data object and a data identifier (ID) and determines whether the data object is already stored in a dispersed storage network (DSN) memory. The method branches to step 554 when the data object is already stored in the DSN memory. The method continues to step 550 when the data object is not already stored in the DSN memory. The method continues at step 550 where the processing module generates a shared vault data object DSN address when the data object is not already stored in the DSN memory. The generating includes using a shared vault ID. The method continues at step 552 where the processing module stores the data object in a shared vault using the shared vault data object DSN address. The storing includes encoding the data object in a dispersed storage error coding function to produce a plurality of sets of encoded data slices, generating a plurality of sets of slice names based on the shared vault data object DSN address, and issuing one or more sets of write slice requests to the shared vault and the DSN memory that includes the plurality of sets of encoded data slices and the plurality of slice names based on the shared vault data object DSN address. The method branches to step 556.

The method continues at step 554 where the processing module identifies the shared vault data object DSN address when the data object is already stored in the DSN memory. The identifying includes at least one of accessing a list, accessing a hierarchical dispersed index, accessing a directory, initiating a query, matching a data tag, and receiving the shared vault data object DSN address. The method continues at step 556 where the processing module generates a link-object that includes one or more of the shared vault data object DSN address, the data ID, and a data tag associated with the data object.

The method continues at step 558 where the processing module stores the link-object in a private vault associated with a requesting entity associated with the store data request using a private vault link-object DSN address. The storing includes generating the private vault link-object DSN address based on one or more of a vault ID of the private vault associated with the requesting entity and the data ID, generating a set of link slice names using the private vault link-object DSN address, encoding the link-object using the dispersed storage error coding function to produce a set of link slices, and issuing a set of write slice requests to the private vault of the DSN memory that includes the set of link slices and the set of link slice names. The storing may further include recovering metadata associated with the data object, incrementing a copy count by one to produce updated metadata, and storing the updated metadata. The recovering and storing may include accessing one or more of a local memory and the shared vault of the DSN memory.

The method continues at step 560 where the processing module receives a retrieve data request that includes another data ID associated with the data object. The method continues at step 562 where the processing module identifies the private vault link-object DSN address based on the retrieved data request. The identifying may be based on one or more of a hierarchical dispersed index lookup, a directory lookup, issuing a list request to the private vault, receiving a list response from the private vault, and accessing a local list. The method continues at step 564 where the processing module recovers the link-object from the private vault using the private vault link-object DSN address. The recovering includes issuing a set of read slice requests to the private vault of the DSN memory and decoding received slices to reproduce the link-object.

The method continues at step 566 where the processing module extracts the shared vault data object DSN address from the link-object. The method continues at step 568 where the processing module recovers the data object from the shared vault using the shared vault data object DSN address. The recovering includes issuing one or more sets of read slice requests based on the shared vault data object DSN address, receiving slices, and decoding the slices using the dispersed storage error coding function to reproduce the data object. The method continues at step 570 where the processing module outputs the data object to a requesting entity associated with the retrieve data request.

Figure 48A:
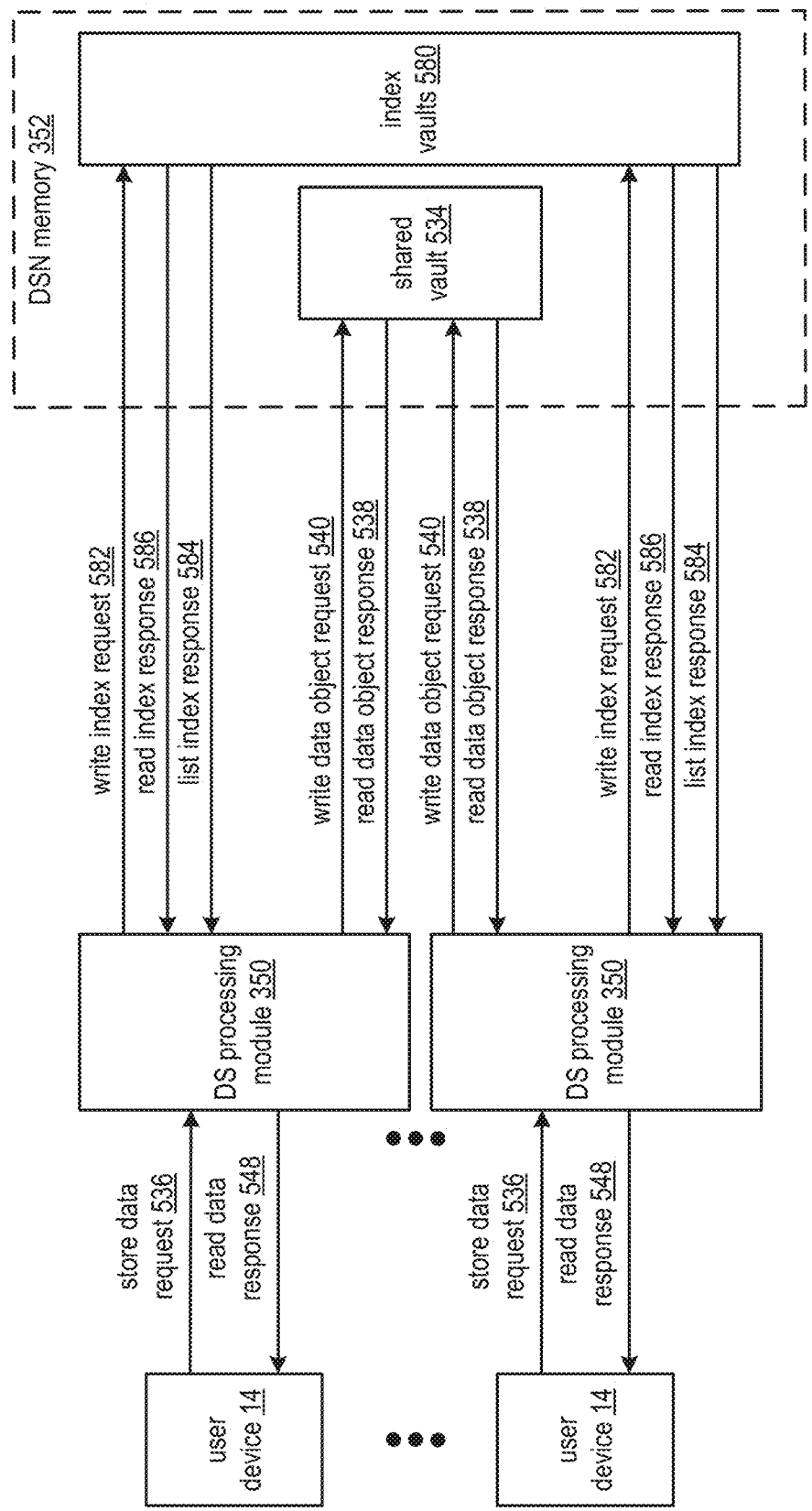
FIG. 48A is a schematic block diagram of another embodiment of a dispersed storage system in accordance with the present invention.

FIG. 48A is a schematic block diagram of another embodiment of a dispersed storage system that includes the plurality of user devices 14 of FIG. 47A, the plurality of dispersed storage (DS) processing modules 350 of FIG. 47A, and the dispersed storage network (DSN) memory 352 of FIG. 40A. The DSN memory 352 includes storage facilities for at least one the shared vault 534 of FIG. 47A and index vaults 580. The storage facilities include a plurality of DS units. The DS units may be organized into one or more sets of DS units. Each DS unit of the one or more sets of DS units may be implemented utilizing one or more of the DS unit 354 of FIG. 40A, a storage node, a dispersed storage unit, a distributed storage and task (DST) execution unit, a storage server, a storage unit, a storage module, a memory device, a memory, a user device, a DST processing unit, and a DST processing module.

The system functions to access a data object in the shared vault 534 of the DSN memory 352 in accordance with a data de-duplication approach. The data de-duplication approach includes access controls with regards to the at least one shared vault 534 and the index vaults 580. For example, each user device 14 of the plurality of user devices may access the shared vault 534 to access de-duplicated data. As another example, user device 14 of the plurality of user devices may access the index vaults 580 to access link-objects associated with data objects stored in the shared vault 534.

In an example of operation of the data de-duplication approach, when the accessing of the data object includes storing the data object, a user device 14 issues a store data request 536 to a DS processing module 350 to store the data object in the DSN memory 352, where the store data request 536 includes one or more of a received data object, a data identifier (ID) of a plurality of data IDs associated with the data object, and a data tag (e.g., a result of performing a deterministic function on at least a portion of the data object). The DS processing module 350 determines whether the received data object matches a data object stored in the shared vault 534. The determining includes at least one of comparing the received data object to data objects stored in the shared vault, obtaining a data tag associated with the received data object, generating the data tag associated with the received data object, and comparing the data tag associated with the received data object with a data tag list.

When the data object is not stored in the shared vault 534, the DS processing module 350 stores the data object in the shared vault 534 at a data object DSN address by issuing a write data object request 540 to the shared vault. The issuing includes encoding the received data object to produce slices and issuing write slice requests to the shared vault 534 that includes the slices. The DS processing module 350 utilizes a private credential of the user device 14 to update an entry of a private hierarchical dispersed index of the index vaults 580 associated with the user device 14 to include the data object DSN address and the data ID as an updated entry. The updating may include issuing a list index request to the private hierarchical dispersed index, receiving a list index response 584, and identifying the entry from the list index response. The updating further includes issuing a read index request to the private hierarchical dispersed index and receiving a read index response 586 that includes the entry. The updating still further includes issuing a write index request 582 to the private hierarchical dispersed index to include the updated entry. When the data object is stored in the shared vault 534, the DS processing module 350 utilizes the private credential of the user device to update the entry of the private hierarchical dispersed index of the index vaults associated with the user device to include the data object DSN address and the data ID as the updated entry.

In another example of the data de-duplication approach, when the accessing of the data object includes retrieving the data object, another user device 14 (e.g., any user device of the plurality of user devices) issues a read data request to another DS processing module 350 (e.g., may include the DS processing module associated with storage of the data object) to retrieve the data object stored in the shared vault 534 of the DSN memory 352, where the read data request includes another data ID associated with the data object (e.g., the other data ID may include the data ID). The other DS processing module 350 utilizes a private credential of the other user device 14 to access another private hierarchical dispersed index associated with the other user device using the other data ID to recover the data object DSN address. The recovering may include issuing a list index request to the other private hierarchical dispersed index, receiving a list index response 584, and identifying an entry from the list index response 584. The updating further includes issuing a read index request to the other private hierarchical dispersed index and receiving a read index response 586 that includes the entry that includes the data object DSN address.

The other DS processing module recovers the data object from the shared vault 534 using the data object DSN address extracted from the link-object. The recovering includes issuing a read data object request (e.g., issuing one or more sets of read slice requests) to the shared vault 534 using the data object DSN address and receiving a read data object response 538 (e.g., decoding received slices) that includes the data object. The other DS processing module 350 issues a read data response 548 to the user device 14 that includes the data object.

Figure 48B:
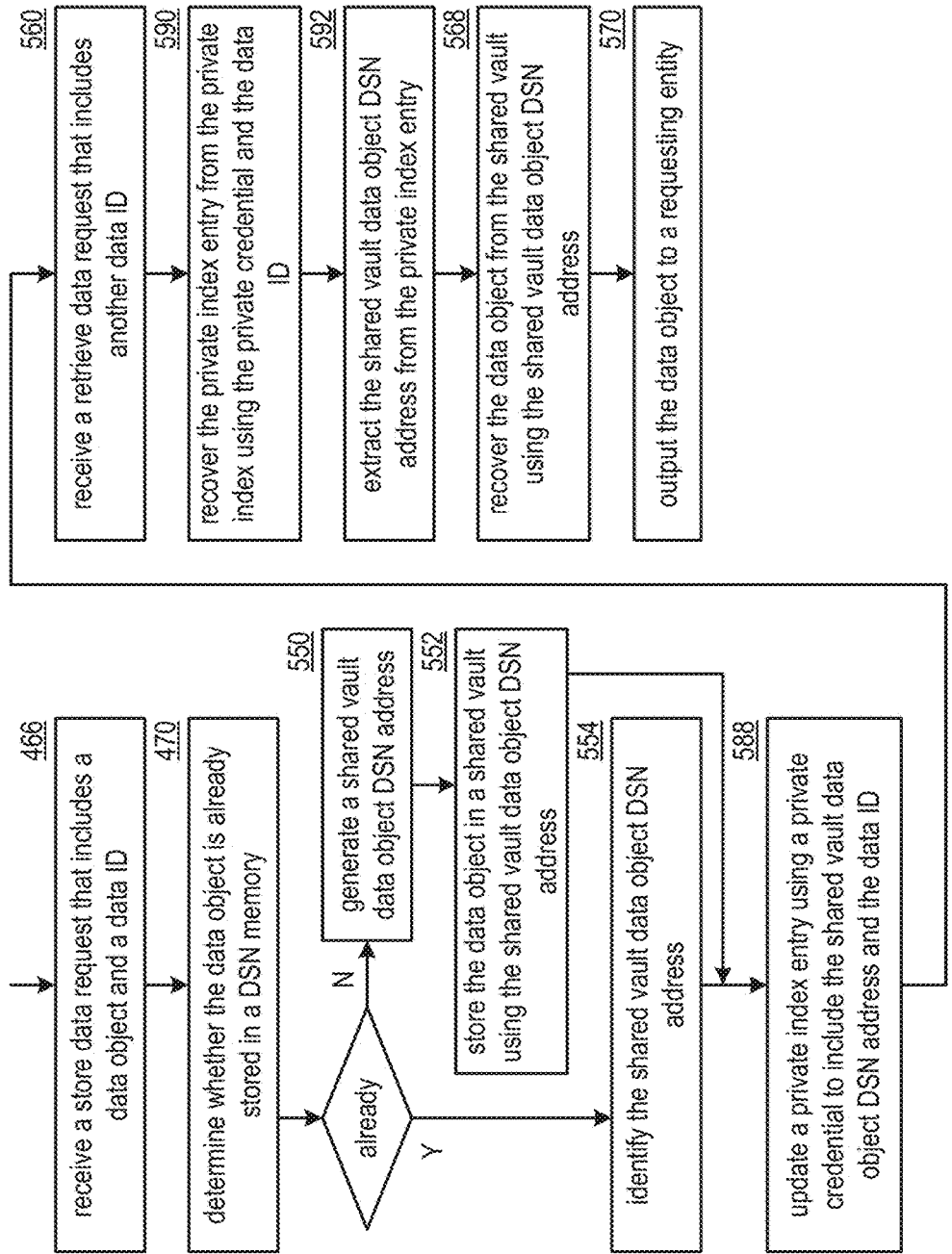
FIG. 48B is a flowchart illustrating another example of accessing data in accordance with the present invention.

FIG. 48B is a flowchart illustrating another example of accessing data, which include similar steps to FIGS. 43 and 47B. The method begins with steps 466 and 470 of FIG. 43 where a processing module (e.g., of a dispersed storage (DS) processing module) receives a store data request that includes a data object and a data identifier (ID) and determines whether the data object is already stored in a dispersed storage network (DSN) memory. The method branches to step 554 of FIG. 47B when the data object is already stored in the DSN memory. The method continues to step 550 of FIG. 47B when the data object is not already stored in the DSN memory. The method continues with steps 550 and 552 of FIG. 47B where the processing module generates a shared vault data object DSN address and stores the data object in a shared vault using the shared vault data object DSN address. The method branches to step 588.

The method continues with step 554 of FIG. 47B where the processing module identifies the shared vault data object DSN address when the data object is already stored in the DSN memory. The method continues at step 588 where the processing module updates a private index entry using a private credential to include one or more of the shared vault data object DSN address, the data ID, and a data tag associated with the data object. The updating includes one or more of accessing the private index using the private credential and updating an index node of the private index (e.g., retrieving slices, decoding slices to recover the index node, updating the index node, and encoding the updated index node to produce updated slices, and storing the updated slices in the private index). The updating may also include recovering metadata associated with storage of the data object in the shared vault, updating the metadata to increment a copy count by one, and storing the updated metadata in the DSN memory (e.g., in the shared vault).

When receiving a retrieve data request, the method continues with step 560 of FIG. 47B where the processing module receives a retrieve data request that includes another data ID. The method continues at step 590 where the processing module recovers the private index entry from the private index using the private credential and the data ID. The recovering includes accessing the private index using the private credential, identifying the index node of the private index, retrieving slices of the index node, decoding the slices to reproduce the index node, and extracting the private index entry. The method continues at step 592 where the processing module extracts the shared vault data object DSN address from the private index entry. The method continues with steps 568 and 570 of FIG. 47B where the processing module recovers the data object from the shared vault using the shared vault data object DSN address and outputs the data object to a requesting entity associated with the retrieve data request.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed embodiments. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed embodiments. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present embodiments may have also been described, at least in part, in terms of one or more embodiments. The described embodiments are used herein to illustrate aspects, features, concepts and examples. A physical embodiment of an apparatus, an article of manufacture, a machine, and/or a process may include one or more of the aspects, features, concepts, examples, etc., described with reference to one or more of the embodiments discussed herein. Further, from figure to figure, the embodiments may incorporate the same or similarly named functions, steps, modules, etc., that may use the same or different reference numbers and, as such, the functions, steps, modules, etc., may be the same or similar functions, steps, modules, etc., or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features have been expressly described herein, other combinations of these features and functions are likewise possible. The claimed invention is not limited by the particular examples disclosed herein and expressly incorporates these other combinations.

What is claimed is:

1. A method comprising:
receiving, at a computing device including a processor, first data to be stored in a memory accessible to the processor;
identifying a data type associated with the first data;
generating a fingerprint of at least a portion of the first data;
determining, based on both the data type and the fingerprint, whether the first data is a duplicate of previously stored data; and
storing an object-linking file in response to determining that the first data is a duplicate of the previously stored data, wherein at least a portion of the object-linking file is stored in a same memory location where at least a portion of the first data would have been stored if the first data had not been a duplicate of the previously stored data, and wherein storing the object-linking file includes;
encoding the object-linking file using an error coding function to produce a set of encoded data slices; and
storing the set of encoded data slices in the memory.

2. The method of claim 1, further comprising:
storing the first data in the memory in response to determining that the first data is not a duplicate of the previously stored data.

3. The method of claim 1, further comprising:
generating a first data tag based on both the data type and the fingerprint; and
associating the first data tag with the first data.

4. The method of claim 3, wherein associating the first data tag with the first data includes:
updating information included in one or more of a data tag list, a dispersed hierarchical index, or a distributed storage directory.

5. The method of claim 4, wherein the information includes:
one or more of a data identifier of the first data, an address of the first data, or the first data tag.

6. A storage module comprising:
one or more storage units;
a communications interface configured to receive first data to be stored in the one or more storage units;
a computing core configured to:
identify a data type associated with the first data;
generate a fingerprint of at least a portion of the first data;
determine, based on both the data type and the fingerprint, whether the first data is a duplicate of previously stored data in the one or more storage units; and
store an object-linking file in response to a determination indicating that the first data is a duplicate of previously stored data in the one or more storage units, wherein at least a portion of the object-linking file is stored in a same memory location where at least a portion of the first data would have been stored if the first data had not been a duplicate of the previously stored data, wherein storing the object-linking file includes:
encoding the object-linking file using an error coding function to produce a set of encoded data slices; and
storing the set of encoded data slices in the one or more storage units.

7. The storage module of claim 6, wherein the computing core is further configured to:
store the first data in the one or more storage units in response to determining that the first data is not a duplicate of the previously stored data.

8. The storage module of claim 6, wherein the computing core is further configured to:
generate a first data tag based on both the data type and the fingerprint; and
associate the first data tag with the first data.

9. The storage module of claim 8, wherein associating the first data tag with the first data includes:
updating information included in one or more of a data tag list, a dispersed hierarchical index, or a distributed storage directory.

10. The storage module of claim 9, wherein the information includes:
one or more of a data identifier of the first data, an address of the first data, or the first data tag.

11. A non-transitory computer readable medium tangibly embodying a program of instructions to be stored in a memory and executed by a processor, the computer readable medium comprising:
at least one instruction to receive, at a computing device including a processor, first data to be stored in a memory accessible to the processor;
at least one instruction to identify a data type associated with the first data;
at least one instruction to generate a fingerprint of at least a portion of the first data;
at least one instruction to determine, based on both the data type and the fingerprint, whether the first data is a duplicate of previously stored data; and
at least one instruction to store an object-linking file in response to a result of the determining indicating that the first data is a duplicate of the previously stored data, wherein at least a portion of the object-linking file is stored in a same memory location where a corresponding portion of the first data would have been stored if the first data had not been a duplicate of the previously stored data, and wherein storing the object-linking file includes encoding the object-linking file using an error coding function to produce a set of encoded data slices and storing the set of encoded data slices in the memory.

12. The non-transitory computer readable medium of claim 11, wherein at least one instruction to conditionally store includes:

at least one instruction to store the first data in the memory in response to determining that the first data is not a duplicate of the previously stored data.

13. The non-transitory computer readable medium of claim 11, further comprising:
  at least one instruction to generate a first data tag based on both the data type and the fingerprint; and
  at least one instruction to associate the first data tag with the first data.

14. The non-transitory computer readable medium of claim 13, wherein the at least one instruction to associate the first data tag with the first data includes:
  at least one instruction to update information included in one or more of a data tag list, a dispersed hierarchical index, or a distributed storage directory.

* * * * *